(12) United States Patent
Fan

(10) Patent No.: US 12,512,185 B2
(45) Date of Patent: Dec. 30, 2025

(54) DNA-BASED DATA STORAGE AND RETRIEVAL

(71) Applicant: NANJING GENSCRIPT BIOTECH CO., LTD., Nanjing (CN)

(72) Inventor: Long Fan, Nanjing (CN)

(73) Assignee: NANJING GENSCRIPT BIOTECH CO., LTD., Nanjing (CN)

( * ) Notice: Subject to any disclaimer, the term of this patent is extended or adjusted under 35 U.S.C. 154(b) by 1213 days.

(21) Appl. No.: 16/631,405

(22) PCT Filed: Jul. 25, 2018

(86) PCT No.: PCT/CN2018/097083
§ 371 (c)(1),
(2) Date: Jan. 15, 2020

(87) PCT Pub. No.: WO2019/020059
PCT Pub. Date: Jan. 31, 2019

(65) Prior Publication Data
US 2020/0211677 A1 Jul. 2, 2020

(30) Foreign Application Priority Data
Jul. 25, 2017 (CN) .......................... 201710611123.2

(51) Int. Cl.
*G16B 50/40* (2019.01)
*G06F 11/10* (2006.01)
*G16B 25/20* (2019.01)
*G16B 30/00* (2019.01)
*H03M 7/30* (2006.01)
*H03M 13/15* (2006.01)

(52) U.S. Cl.
CPC .......... *G16B 50/40* (2019.02); *G06F 11/1076* (2013.01); *G16B 25/20* (2019.02); *G16B 30/00* (2019.02); *H03M 7/3086* (2013.01); *H03M 7/70* (2013.01); *H03M 13/1515* (2013.01); *Y10S 977/704* (2013.01)

(58) Field of Classification Search
CPC ........ G16B 50/40; G16B 25/20; G16B 30/00; G06F 11/1076; H03M 7/3086; H03M 7/70; H03M 13/1515; Y10S 977/704
See application file for complete search history.

(56) References Cited

U.S. PATENT DOCUMENTS

2011/0295858 A1   12/2011   Ahn et al.

FOREIGN PATENT DOCUMENTS

| CN | 103093121 A | 5/2013 |
|---|---|---|
| CN | 105022935 A | 11/2014 |
| CN | 104850760 B | 12/2016 |
| CN | 106687966 A | 5/2017 |
| CN | 105760706 B | 5/2018 |
| EP | 1443449 A2 | 8/2004 |
| EP | 3173961 A1 | 5/2017 |
| WO | 2003025123 A2 | 3/2003 |
| WO | 2003052383 A2 | 6/2003 |
| WO | WO03052383 A2 | 6/2003 |
| WO | 2003052383 A3 | 8/2003 |
| WO | WO03052383 A3 | 8/2003 |
| WO | 2004/053766 A1 | 6/2004 |
| WO | 2004088585 A2 | 10/2004 |
| WO | 2004088585 A3 | 6/2005 |
| WO | 2007/137225 A2 | 11/2007 |
| WO | 2013178801 A2 | 12/2013 |
| WO | 2014/014991 A2 | 1/2014 |
| WO | 2013178801 A3 | 1/2014 |
| WO | WO2016020682 A1 | 2/2016 |
| WO | 2017011492 A1 | 1/2017 |

OTHER PUBLICATIONS

Ghoshdastider, Umesh, and Banani Saha. "GenomeCompress: a novel algorithm for DNA compression." (2005): 0973-6824. (Year: 2005).*
Grass, Robert N et al. "Robust chemical preservation of digital information on DNA in silica with error-correcting codes." Angewandte Chemie (International ed. in English) vol. 54,8 (2015): 2552-5. doi:10.1002/anie.201411378 (Year: 2015).*
Yazdi, S.M.H.T., Gabrys, R. & Milenkovic, O. Portable and Error-Free DNA-Based Data Storage. Sci Rep 7, 5011 (2017). https://doi.org/10.1038/s41598-017-05188-1 Jul. 10, 2017 (Year: 2017).*
Limbachiya, Dixita, and Manish K. Gupta. "Natural data storage: A review on sending information from now to then via nature." arXiv preprint arXiv:1505.04890 (2015). (Year: 2015).*
Yazdi, SM Hossein Tabatabaei, et al. "DNA-based storage: Trends and methods." IEEE Transactions on Molecular, Biological and Multi-Scale Communications 1.3 (2015): 230-248.*
International Search Report and Written Opinion, dated Oct. 31, 2018, for PCT Application No. PCT/CN2018/097083, filed Jul. 25, 2018, 6 pages.
Maurer, K. et al. (Dec. 20, 2006). "Electrochemically Generated Acid and Its Containment to 100 Micron Reaction Areas for the Production of DNA Microarrays," PLos One 1(1):e34, 7 pages.

(Continued)

*Primary Examiner* — Larry D Riggs, II
*Assistant Examiner* — Kettip Kriangchaivech
(74) *Attorney, Agent, or Firm* — MORRISON & FOERSTER LLP

(57) ABSTRACT

The present disclosure generally relates to DNA-based data storage. An exemplary method for storing input data on nucleic acid comprises: converting the input data into a set of nucleotide sequences and synthesizing a set of nucleic acids comprising the set of nucleotide sequences. The converting comprises a data processing step comprising converting the input data into a binary string, and a nucleotide encoding step comprising converting the binary string using a 5-bit transcoding framework to obtain the set of nucleotide sequences.

16 Claims, 13 Drawing Sheets
Specification includes a Sequence Listing.

(56) References Cited

OTHER PUBLICATIONS

Chun, J.Y. et al. (2015). "Passing Go with DNA Sequencing: Delivering Messages in a Covert Transgenic Channel," IEEE CS Security and Privacy Workshops, pp. 17-26.
Tornea, O. (2013). "Contributions to DNA Cryptography: Application to Text and Image Secure Transmission," HAL Open Science, 170 pages.
Delarue, M. (2007). "An Asymmetric Underlying Rule in the Assignment of Codons: Possible Clue to a Quick Early Evolution of the Genetic Code via Successive Binary Choices," RNA 13(2):161-169.

* cited by examiner

GenScript is your reliable partner for gene, peptide, protein, and antibody research, assisting in fundamental life sciences research, biopharmaceutical research, and early drug development. Since its establishment in 2002, GenScript has grown rapidly to become a global leader in biotechnology. The company's headquarters are located in New Jersey, USA, with subsidiaries in Europe, Japan, and China. GenScript is committed to providing the best research services to scientific institutions worldwide, having supplied life sciences research products and services to scientists in over 100 countries. We have established superior throughput and quality in biological research services, including gene synthesis, molecular biology services, peptide synthesis, custom antibodies, protein expression, antibody and protein engineering, as well as in vitro and in vivo pharmacodynamic studies, all with the goal of making research simpler. GenScript always adheres to the philosophy of "providing the best quality to customers and serving their interests." Based on this philosophy, our management system has been ISO9001:2008 certified, our products meet cGMP standards, and we have obtained AAALAC and OLAW certifications, striving to offer the best services to our customers. Additionally, we provide various business cooperation models tailored to different clients, including project-based models, dedicated full-time models, and strategic partnership alliances.

Converting the input data into a set of nucleotide sequences
902

A data processing step comprising converting the input data into a binary string
904

A nucleotide encoding step comprising converting the binary string using a 5-bit transcoding framework to obtain the set of nucleotide sequences
906

Synthesizing a set of nucleic acids comprising the set of nucleotide sequences
908

Obtaining a set of nucleotide sequences of a set of nucleic acids
952

Converting the set of nucleotide sequences into the output data
954

A nucleotide decoding step comprising converting the set of nucleotide sequences into a binary string using a 5-bit transcoding framework
956

A data processing step comprising converting binary string into the output data, thereby obtaining the output data
958

FIG. 9B

SEQUENCE LISTING

```
<160> NUMBER OF SEQ ID NOS: 415

<210> SEQ ID NO 1
<211> LENGTH: 87
<212> TYPE: DNA
<213> ORGANISM: Artificial Sequence
<220> FEATURE:
<223> OTHER INFORMATION: Synthetic Construct

<400> SEQUENCE: 1
ttccctaata gtggagtcga gtagagaaac tgactccctg aggacacatc atgcgctcga        60
cgtccatgtt gacgtgtgtc tcctcag                                            87

<210> SEQ ID NO 2
<211> LENGTH: 87
<212> TYPE: DNA
<213> ORGANISM: Artificial Sequence
<220> FEATURE:
<223> OTHER INFORMATION: Synthetic Construct

<400> SEQUENCE: 2
ttcctacgag agtacgtgtc ttattacgca tcatctttcg tcacttacgg tttagtccag        60
cgaactgagc gattccgtag agctcga                                            87

<210> SEQ ID NO 3
<211> LENGTH: 87
<212> TYPE: DNA
<213> ORGANISM: Artificial Sequence
<220> FEATURE:
<223> OTHER INFORMATION: Synthetic Construct

<400> SEQUENCE: 3
ttcctgatct tcgagcgagc ggacttcgag ttaacgttgt atctacgtct gtctggacct        60
```
gtcagacgac tgttgcagtg tcgtcct          87

<210> SEQ ID NO 4
<211> LENGTH: 87
<212> TYPE: DNA
<213> ORGANISM: Artificial Sequence
<220> FEATURE:
<223> OTHER INFORMATION: Synthetic Construct

<400> SEQUENCE: 4
ttcctgatgt agcacagcat cgatgtgtac ggatagttga tctcagagtg acctaatgag    60
tcgggagtcc caccaatcat ccagcga          87

<210> SEQ ID NO 5
<211> LENGTH: 87
<212> TYPE: DNA
<213> ORGANISM: Artificial Sequence
<220> FEATURE:
<223> OTHER INFORMATION: Synthetic Construct

<400> SEQUENCE: 5
ttcctaactt cgagtggagc gatgtatgga gctcctagat tctcaacacc aaatgtacta    60
actactctag tcttatgtat aaaccac          87

<210> SEQ ID NO 6
<211> LENGTH: 87
<212> TYPE: DNA
<213> ORGANISM: Artificial Sequence
<220> FEATURE:
<223> OTHER INFORMATION: Synthetic Construct

<400> SEQUENCE: 6
ttctacgctc gttgcaatcg attctctgtc atatatcgca ctatcctaga cagtctcgct    60
gctacaccgt gagatgtggt ctgaact          87

<210> SEQ ID NO 7
<211> LENGTH: 87
<212> TYPE: DNA
<213> ORGANISM: Artificial Sequence
<220> FEATURE:
<223> OTHER INFORMATION: Synthetic Construct

<400> SEQUENCE: 7
ttcctgcacg agagatctgt gggtcatatg cagtagatgg attgctgtgt ctctccagct    60
tctgctgagc tgtgttagtg tttcgga          87

<210> SEQ ID NO 8
<211> LENGTH: 87
<212> TYPE: DNA
<213> ORGANISM: Artificial Sequence
<220> FEATURE:
<223> OTHER INFORMATION: Synthetic Construct

<400> SEQUENCE: 8
ttcctacaga gactaagtac tccaatcgga atcgtccgag ctggacgctt ctgtatcata    60
gtcaagacgc agaatataga ccatgag          87

<210> SEQ ID NO 9
<211> LENGTH: 87
<212> TYPE: DNA
<213> ORGANISM: Artificial Sequence
<220> FEATURE:

<223> OTHER INFORMATION: Synthetic Construct

<400> SEQUENCE: 9
ttcctacgca tcgagtagtc agtcagcgag agatctacta ctcataaggg tcctgtctag    60
caggtcgact ctataaatat gccgagt    87

<210> SEQ ID NO 10
<211> LENGTH: 87
<212> TYPE: DNA
<213> ORGANISM: Artificial Sequence
<220> FEATURE:
<223> OTHER INFORMATION: Synthetic Construct

<400> SEQUENCE: 10
ttcttgtgcg caactttgtt acgacgcgtg gagccttact catgaataaa tcgaggtgtg    60
tagcactctt acgcggtagc tcgaagc    87

<210> SEQ ID NO 11
<211> LENGTH: 87
<212> TYPE: DNA
<213> ORGANISM: Artificial Sequence
<220> FEATURE:
<223> OTHER INFORMATION: Synthetic Construct

<400> SEQUENCE: 11
ttcctgacaa agaatccgaa ctctggagta ctagtggaga acacgctcta ttagcgccta    60
caggctaact tggcgtctgt agcttct    87

<210> SEQ ID NO 12
<211> LENGTH: 87
<212> TYPE: DNA
<213> ORGANISM: Artificial Sequence
<220> FEATURE:
<223> OTHER INFORMATION: Synthetic Construct

<400> SEQUENCE: 12
ttcctgaatc gtgcttgtgt cacatcttca atcgtcagcc gagctccttg tagtacacct    60
cctgtcttcc gatgttcgca cagcact    87

<210> SEQ ID NO 13
<211> LENGTH: 87
<212> TYPE: DNA
<213> ORGANISM: Artificial Sequence
<220> FEATURE:
<223> OTHER INFORMATION: Synthetic Construct

<400> SEQUENCE: 13
ttcttgtaga ctggtgatac tatccataag gattgccctc ctcagggatt aagaggatta    60
cgtacttgaa tagtcgtcgt gcgcgga    87

<210> SEQ ID NO 14
<211> LENGTH: 87
<212> TYPE: DNA
<213> ORGANISM: Artificial Sequence
<220> FEATURE:
<223> OTHER INFORMATION: Synthetic Construct

<400> SEQUENCE: 14
ttcctcgtcc tcctacctgt acgagaggct gagtcttagg attgtgagta cggtagcgct    60
cactgttgac gtagtgtgtc agtccat    87

```
<210> SEQ ID NO 15
<211> LENGTH: 87
<212> TYPE: DNA
<213> ORGANISM: Artificial Sequence
<220> FEATURE:
<223> OTHER INFORMATION: Synthetic Construct

<400> SEQUENCE: 15
ttctgacatc ctacttgaag tatctgatga atcgcgggtg gctgagtgga tggcggcaag      60
gtgacgacta tagctatgtt ctctcgt                                         87

<210> SEQ ID NO 16
<211> LENGTH: 87
<212> TYPE: DNA
<213> ORGANISM: Artificial Sequence
<220> FEATURE:
<223> OTHER INFORMATION: Synthetic Construct

<400> SEQUENCE: 16
ttcctcccag gctgtgcatt cgctatcact atcgcttcac gaagaggtcg cacaacaacg      60
gatccgacgg gtggtgaggg acagctc                                         87

<210> SEQ ID NO 17
<211> LENGTH: 87
<212> TYPE: DNA
<213> ORGANISM: Artificial Sequence
<220> FEATURE:
<223> OTHER INFORMATION: Synthetic Construct

<400> SEQUENCE: 17
ttctgacctt caggcagtta tagacgcgcg tcactcccgt taggcgagta tatcagaacg      60
acacgaccta ctagaagaca tcgatct                                         87

<210> SEQ ID NO 18
<211> LENGTH: 87
<212> TYPE: DNA
<213> ORGANISM: Artificial Sequence
<220> FEATURE:
<223> OTHER INFORMATION: Synthetic Construct

<400> SEQUENCE: 18
ttctgactat ctagatgacc tagaggagag aagatgcgct tgtagacggc tgcgcctaac      60
ctccctgcga ctgcgagtaa gactgtg                                         87

<210> SEQ ID NO 19
<211> LENGTH: 87
<212> TYPE: DNA
<213> ORGANISM: Artificial Sequence
<220> FEATURE:
<223> OTHER INFORMATION: Synthetic Construct

<400> SEQUENCE: 19
ttctgactca tggtatagta gggtcatgcg cagcctccat attcgttgta ggtctgtcgt      60
cagagaaacc gcttcatgag atatcag                                         87

<210> SEQ ID NO 20
<211> LENGTH: 87
<212> TYPE: DNA
<213> ORGANISM: Artificial Sequence
<220> FEATURE:
<223> OTHER INFORMATION: Synthetic Construct

<400> SEQUENCE: 20
```

```
ttctgatgag cgggctcttg aggagatttc ctccgataga atgcacgagg atagctaatc    60
cagctcagag actcgacagc tttcccg                                        87

<210> SEQ ID NO 21
<211> LENGTH: 87
<212> TYPE: DNA
<213> ORGANISM: Artificial Sequence
<220> FEATURE:
<223> OTHER INFORMATION: Synthetic Construct

<400> SEQUENCE: 21
ttctgatgcg caatcagcat cctcgcggga tcaagcacgg atgacgctag agacgtctcg    60
agcttctata cactcctgcg attcttc                                        87

<210> SEQ ID NO 22
<211> LENGTH: 87
<212> TYPE: DNA
<213> ORGANISM: Artificial Sequence
<220> FEATURE:
<223> OTHER INFORMATION: Synthetic Construct

<400> SEQUENCE: 22
ttctgatagc acgcagcaag atcgagagtc tcatgtgaga tcacttgagg tcctcctatc    60
acaactccac atttgatcgg acctcgt                                        87

<210> SEQ ID NO 23
<211> LENGTH: 87
<212> TYPE: DNA
<213> ORGANISM: Artificial Sequence
<220> FEATURE:
<223> OTHER INFORMATION: Synthetic Construct

<400> SEQUENCE: 23
ttctgatata tagtaacaca tagcagcaac aagacgcagt ctcctctaac gagttgtaga    60
aagcctcctg gatgaccggc aagatcg                                        87

<210> SEQ ID NO 24
<211> LENGTH: 87
<212> TYPE: DNA
<213> ORGANISM: Artificial Sequence
<220> FEATURE:
<223> OTHER INFORMATION: Synthetic Construct

<400> SEQUENCE: 24
ttctgatcat caagtcgtga ggtatctatg ccgacggtcg gacagatgtg tagtatcaag    60
gtccgagctt acaagctcgt ctatctc                                        87

<210> SEQ ID NO 25
<211> LENGTH: 87
<212> TYPE: DNA
<213> ORGANISM: Artificial Sequence
<220> FEATURE:
<223> OTHER INFORMATION: Synthetic Construct

<400> SEQUENCE: 25
ttccctgctc tactcggccg tcctggtcga atggtctcga agggatattg cttccctcag    60
gatagagcac agcctatggg aagacat                                        87

<210> SEQ ID NO 26
<211> LENGTH: 87
<212> TYPE: DNA
<213> ORGANISM: Artificial Sequence
```

<220> FEATURE:
<223> OTHER INFORMATION: Synthetic Construct

<400> SEQUENCE: 26
ttccctgtgc gaacttgttg accgctcgtc tgagtcagcg taggagctct ctacttgcac    60
tctgagggct acccattggt gcgaaag                                        87

<210> SEQ ID NO 27
<211> LENGTH: 87
<212> TYPE: DNA
<213> ORGANISM: Artificial Sequence
<220> FEATURE:
<223> OTHER INFORMATION: Synthetic Construct

<400> SEQUENCE: 27
ttccctgatc tagaggctcc tcgattcgac gaggctctcc tccctcgtag tatagctgtg    60
atcactactt ctaatctgtt ctgaatg                                        87

<210> SEQ ID NO 28
<211> LENGTH: 87
<212> TYPE: DNA
<213> ORGANISM: Artificial Sequence
<220> FEATURE:
<223> OTHER INFORMATION: Synthetic Construct

<400> SEQUENCE: 28
ttctgattat tactccgttg cagcgtctcg ctgcgcactg atctctctaa cctatgtgct    60
tcaagagact agagcccggt agagcca                                        87

<210> SEQ ID NO 29
<211> LENGTH: 87
<212> TYPE: DNA
<213> ORGANISM: Artificial Sequence
<220> FEATURE:
<223> OTHER INFORMATION: Synthetic Construct

<400> SEQUENCE: 29
ttccctagca tcaaccctct ggagggctta aagtatgctc tgactactct gctccgaatc    60
actcgcgatc tccgtctcgt gactata                                        87

<210> SEQ ID NO 30
<211> LENGTH: 87
<212> TYPE: DNA
<213> ORGANISM: Artificial Sequence
<220> FEATURE:
<223> OTHER INFORMATION: Synthetic Construct

<400> SEQUENCE: 30
ttccctaaga atctccgaaa gctctattct gtaatgccgt ctggcaatct ggtagacctc    60
ttgcagttgt tggtcatcct gactaga                                        87

<210> SEQ ID NO 31
<211> LENGTH: 87
<212> TYPE: DNA
<213> ORGANISM: Artificial Sequence
<220> FEATURE:
<223> OTHER INFORMATION: Synthetic Construct

<400> SEQUENCE: 31
ttccctgtcg aggcataggt aatggtatca tctcgcgaca tgtagttcgt caatatcccg    60
ccgttcggag cgttaatgat gttctga                                        87

<210> SEQ ID NO 32
<211> LENGTH: 87
<212> TYPE: DNA
<213> ORGANISM: Artificial Sequence
<220> FEATURE:
<223> OTHER INFORMATION: Synthetic Construct

<400> SEQUENCE: 32
ttccctagac agttcccatc atcaacttat agcacaggag tccagtctct cgtcttctgc    60
ttcccgcaga gtacgatcta gtcactc    87

<210> SEQ ID NO 33
<211> LENGTH: 87
<212> TYPE: DNA
<213> ORGANISM: Artificial Sequence
<220> FEATURE:
<223> OTHER INFORMATION: Synthetic Construct

<400> SEQUENCE: 33
ttcccggctt aggtgacgcg catcggatgt actacttgtt taccaccaag cgatggactg    60
acagctcacc gtagtatcga ctgatag    87

<210> SEQ ID NO 34
<211> LENGTH: 87
<212> TYPE: DNA
<213> ORGANISM: Artificial Sequence
<220> FEATURE:
<223> OTHER INFORMATION: Synthetic Construct

<400> SEQUENCE: 34
ttctatttct aggcgtaggt agtatcacag ggtcagaacg tctagtctac tgagagaact    60
ggattgccac atcgcaatgg ccgaatc    87

<210> SEQ ID NO 35
<211> LENGTH: 87
<212> TYPE: DNA
<213> ORGANISM: Artificial Sequence
<220> FEATURE:
<223> OTHER INFORMATION: Synthetic Construct

<400> SEQUENCE: 35
ttcccagtct tcttatcttc atactagtgt tgactcctac ctccgcacca gcgtcgaatc    60
atgactacaa ataagccata gggttct    87

<210> SEQ ID NO 36
<211> LENGTH: 87
<212> TYPE: DNA
<213> ORGANISM: Artificial Sequence
<220> FEATURE:
<223> OTHER INFORMATION: Synthetic Construct

<400> SEQUENCE: 36
ttcccagtaa tgatcgtagc tgattgatgt taggaccgta tcttgtcttg accggcgagt    60
cgagacgcag agatctgatg tactagc    87

<210> SEQ ID NO 37
<211> LENGTH: 87
<212> TYPE: DNA
<213> ORGANISM: Artificial Sequence
<220> FEATURE:
<223> OTHER INFORMATION: Synthetic Construct

<400> SEQUENCE: 37

```
ttccctggcc gaatctctgt cgtaagaaag ctgtgccctg ctgtatcgaa gagaggcaca    60
agctcaataa agatagagct gtcgtga                                       87
```

<210> SEQ ID NO 38
<211> LENGTH: 87
<212> TYPE: DNA
<213> ORGANISM: Artificial Sequence
<220> FEATURE:
<223> OTHER INFORMATION: Synthetic Construct

<400> SEQUENCE: 38

```
ttccctgagt gatgaaagac attatcacga actccgatcg gcgtaccaaa gccttgatgc    60
atgtcgccac aggactgcct cgatttc                                       87
```

<210> SEQ ID NO 39
<211> LENGTH: 87
<212> TYPE: DNA
<213> ORGANISM: Artificial Sequence
<220> FEATURE:
<223> OTHER INFORMATION: Synthetic Construct

<400> SEQUENCE: 39

```
ttcccaaact tgcaggagta gatcttctgc atagaggtgc tgagacgatt cggcgcatta    60
tgatctgtcg tgaaggctat cgcgagt                                       87
```

<210> SEQ ID NO 40
<211> LENGTH: 87
<212> TYPE: DNA
<213> ORGANISM: Artificial Sequence
<220> FEATURE:
<223> OTHER INFORMATION: Synthetic Construct

<400> SEQUENCE: 40

```
ttctatttgt catgtagcct cgtggcttcg ggtggacata actcaggatc agcttctgag    60
tcgttgctgg tcactcgaca cttgcat                                       87
```

<210> SEQ ID NO 41
<211> LENGTH: 87
<212> TYPE: DNA
<213> ORGANISM: Artificial Sequence
<220> FEATURE:
<223> OTHER INFORMATION: Synthetic Construct

<400> SEQUENCE: 41

```
ttctgcagaa ctcgccgatt aacatcttag tcacatgagg atctcgtcgg ccagcctcga    60
tctgcacgac gatacctgcc tccaaga                                       87
```

<210> SEQ ID NO 42
<211> LENGTH: 87
<212> TYPE: DNA
<213> ORGANISM: Artificial Sequence
<220> FEATURE:
<223> OTHER INFORMATION: Synthetic Construct

<400> SEQUENCE: 42

```
ttctgcagca tgttctagat catctatatc aagggaacag tgaatgcaat cccagagccg    60
gtcggtcacg acgtccgccc gacaatg                                       87
```

<210> SEQ ID NO 43
<211> LENGTH: 87
<212> TYPE: DNA

<213> ORGANISM: Artificial Sequence
<220> FEATURE:
<223> OTHER INFORMATION: Synthetic Construct

<400> SEQUENCE: 43

```
ttcctcggta agctctctga gggcgagaga tgactcgctg tcggcagtca gtagcagccg    60
ggcctcttct gctcagtagg cttatta                                        87
```

<210> SEQ ID NO 44
<211> LENGTH: 87
<212> TYPE: DNA
<213> ORGANISM: Artificial Sequence
<220> FEATURE:
<223> OTHER INFORMATION: Synthetic Construct

<400> SEQUENCE: 44

```
ttctgccgat gaccgccaac aatgtagaga atgggaccac gcccgctgcc aataggaaat    60
agttatagtc atatcatggt gcgatta                                        87
```

<210> SEQ ID NO 45
<211> LENGTH: 87
<212> TYPE: DNA
<213> ORGANISM: Artificial Sequence
<220> FEATURE:
<223> OTHER INFORMATION: Synthetic Construct

<400> SEQUENCE: 45

```
ttctgtcgtt gaggagattc gaacagagac agtcctctgt gctacatgag acagctactc    60
gagacatgag cgatatagcc ttactct                                        87
```

<210> SEQ ID NO 46
<211> LENGTH: 87
<212> TYPE: DNA
<213> ORGANISM: Artificial Sequence
<220> FEATURE:
<223> OTHER INFORMATION: Synthetic Construct

<400> SEQUENCE: 46

```
ttctgtatac catacacagc gttcgaggtc ccttattagc tgcgaggagg acatctacta    60
aagctcactc gacattcaaa tcgccct                                        87
```

<210> SEQ ID NO 47
<211> LENGTH: 87
<212> TYPE: DNA
<213> ORGANISM: Artificial Sequence
<220> FEATURE:
<223> OTHER INFORMATION: Synthetic Construct

<400> SEQUENCE: 47

```
ttctgcatcc cacgattggc tgcttcgaat cactctctct cagctttacg atgtcgacct    60 taccctictc atccgatggc tgagccg                                        87
```

<210> SEQ ID NO 48
<211> LENGTH: 87
<212> TYPE: DNA
<213> ORGANISM: Artificial Sequence
<220> FEATURE:
<223> OTHER INFORMATION: Synthetic Construct

<400> SEQUENCE: 48

```
ttctgcacaa ctctccgaac aggcggcgct gagcctccat gagtatctga gccttatact    60
aagtctgctc atgcgtgttc tagatta                                        87
```

<210> SEQ ID NO 49
<211> LENGTH: 87
<212> TYPE: DNA
<213> ORGANISM: Artificial Sequence
<220> FEATURE:
<223> OTHER INFORMATION: Synthetic Construct

<400> SEQUENCE: 49
ttctgtactg tgataggttc ttagacgatg cagtacactt tcctcctact aagacataca    60
agtagatatt agggtggata gtctaat                                       87

<210> SEQ ID NO 50
<211> LENGTH: 87
<212> TYPE: DNA
<213> ORGANISM: Artificial Sequence
<220> FEATURE:
<223> OTHER INFORMATION: Synthetic Construct

<400> SEQUENCE: 50
ttctgcaagt ctggaagtca tccgggccga ctccacacat gacgaccttt ccgaacttgt    60
ccggacgtca gcgtcctcta tttccat                                       87

<210> SEQ ID NO 51
<211> LENGTH: 87
<212> TYPE: DNA
<213> ORGANISM: Artificial Sequence
<220> FEATURE:
<223> OTHER INFORMATION: Synthetic Construct

<400> SEQUENCE: 51
ttctgcaaca tgccgtctct acgatcaaac cctggaggat acgtcgagca tttcatactc    60
tgtagtccgt ctgcggcgat cacgctg                                       87

<210> SEQ ID NO 52
<211> LENGTH: 87
<212> TYPE: DNA
<213> ORGANISM: Artificial Sequence
<220> FEATURE:
<223> OTHER INFORMATION: Synthetic Construct

<400> SEQUENCE: 52
ttcctgttct ctaagagagg accggcgtta tgtttcttcc gatctttctt cctcccagtg    60
agagtcttcg gagtctagag catgtag                                       87

<210> SEQ ID NO 53
<211> LENGTH: 87
<212> TYPE: DNA
<213> ORGANISM: Artificial Sequence
<220> FEATURE:
<223> OTHER INFORMATION: Synthetic Construct

<400> SEQUENCE: 53
ttctattagc cattaaacag agagcgatgc tcacagaatg cgtgcctctc tggccgatta    60
tagtcgatct attcactgca tagcatg                                       87

<210> SEQ ID NO 54
<211> LENGTH: 87
<212> TYPE: DNA
<213> ORGANISM: Artificial Sequence
<220> FEATURE:
<223> OTHER INFORMATION: Synthetic Construct

<400> SEQUENCE: 54
ttcctgccac tacacaagta gtctccttct ctgccgttgg tctctccgcg cagagacgca    60
ttctagcatg ctccgcagaa tgtgagt                                        87

<210> SEQ ID NO 55
<211> LENGTH: 87
<212> TYPE: DNA
<213> ORGANISM: Artificial Sequence
<220> FEATURE:
<223> OTHER INFORMATION: Synthetic Construct

<400> SEQUENCE: 55
ttcccggacg tcagaggccg aggctgctgt gacggcaatg cgcctgacat acctctatca    60
ttcgctgtac gagacttccg ttatagt                                        87

<210> SEQ ID NO 56
<211> LENGTH: 87
<212> TYPE: DNA
<213> ORGANISM: Artificial Sequence
<220> FEATURE:
<223> OTHER INFORMATION: Synthetic Construct

<400> SEQUENCE: 56
ttcttctcga tctcaaagca gcagggcatc gataagatcc gatgatactg cgtctctgag    60
tgagtccctg cacgccagga gtctgcg                                        87

<210> SEQ ID NO 57
<211> LENGTH: 87
<212> TYPE: DNA
<213> ORGANISM: Artificial Sequence
<220> FEATURE:
<223> OTHER INFORMATION: Synthetic Construct

<400> SEQUENCE: 57
ttcctcgctc tagagcgtac tgctcaccca gtataggctt cagagacagg tgtgctcctg    60
actgagcgat gctaggagcg aagccgc                                        87

<210> SEQ ID NO 58
<211> LENGTH: 87
<212> TYPE: DNA
<213> ORGANISM: Artificial Sequence
<220> FEATURE:
<223> OTHER INFORMATION: Synthetic Construct

<400> SEQUENCE: 58
ttctacctct gtggaagcat agatgtctag gacactgcgt tagactattc atagggtaga    60
cgaatcaagg tgtatgacac tagattc                                        87

<210> SEQ ID NO 59
<211> LENGTH: 87
<212> TYPE: DNA
<213> ORGANISM: Artificial Sequence
<220> FEATURE:
<223> OTHER INFORMATION: Synthetic Construct

<400> SEQUENCE: 59
ttctacctaa acgctatagg agtcatgcga agttacgaga gaatcaacga taatctcgct    60
atccgtggcc gcgtcagaac tggcgga                                        87

<210> SEQ ID NO 60
<211> LENGTH: 87

<212> TYPE: DNA
<213> ORGANISM: Artificial Sequence
<220> FEATURE:
<223> OTHER INFORMATION: Synthetic Construct

<400> SEQUENCE: 60
ttctactgtc gaatcatgct cagaccgttg gcacgagctg ctctaacgcc tttctgctag    60
catagtacgc acacgttatt actcttc                                       87

<210> SEQ ID NO 61
<211> LENGTH: 87
<212> TYPE: DNA
<213> ORGANISM: Artificial Sequence
<220> FEATURE:
<223> OTHER INFORMATION: Synthetic Construct

<400> SEQUENCE: 61
ttctattgaa agcctcgaat cgctcgttta gtaacagagg cttcgggatt caagcacaac    60
cctccgtcag agacgccgac atgccct                                       87

<210> SEQ ID NO 62
<211> LENGTH: 87
<212> TYPE: DNA
<213> ORGANISM: Artificial Sequence
<220> FEATURE:
<223> OTHER INFORMATION: Synthetic Construct

<400> SEQUENCE: 62
ttctaccacc tacactgccg acgttacaga ccgatcttcc acactcgagg acaggagatc    60
ggcgctgctg atgtgtcgtt agatgag                                       87

<210> SEQ ID NO 63
<211> LENGTH: 87
<212> TYPE: DNA
<213> ORGANISM: Artificial Sequence
<220> FEATURE:
<223> OTHER INFORMATION: Synthetic Construct

<400> SEQUENCE: 63
ttctatcagc tgagcctcac aaagtagcag aacctcagag gagcgactca gcgcatctcg    60
ccattgctgc ctcctatcca ttagatc                                       87

<210> SEQ ID NO 64
<211> LENGTH: 87
<212> TYPE: DNA
<213> ORGANISM: Artificial Sequence
<220> FEATURE:
<223> OTHER INFORMATION: Synthetic Construct

<400> SEQUENCE: 64
ttctatcctt tcccactcat gctcttaacg cctgcatctc agacattcca ggtgaatccg    60
tgattataga atacggtctg accacct                                       87

<210> SEQ ID NO 65
<211> LENGTH: 87
<212> TYPE: DNA
<213> ORGANISM: Artificial Sequence
<220> FEATURE:
<223> OTHER INFORMATION: Synthetic Construct

<400> SEQUENCE: 65
ttctatccac tgctcctcac tcagcctaag tatcacgctt caactctcac agtaccaact    60
gtcttccgtc tctcaggcta ggaggag					87

<210> SEQ ID NO 66
<211> LENGTH: 87
<212> TYPE: DNA
<213> ORGANISM: Artificial Sequence
<220> FEATURE:
<223> OTHER INFORMATION: Synthetic Construct

<400> SEQUENCE: 66
ttctagcgat cttctgtcgt ctcaactttc gtcatgggac ctgcagaggt catctcatgt					60 cgcatgtcgc atccattccg tcgaatg					87

<210> SEQ ID NO 67
<211> LENGTH: 87
<212> TYPE: DNA
<213> ORGANISM: Artificial Sequence
<220> FEATURE:
<223> OTHER INFORMATION: Synthetic Construct

<400> SEQUENCE: 67
ttctagatca agaagcgcaa tgcagacctc tgcaatttgt tacgcaattc gtacgattac					60 tcgagacgct gaacgacacc taagtgc					87

<210> SEQ ID NO 68
<211> LENGTH: 87
<212> TYPE: DNA
<213> ORGANISM: Artificial Sequence
<220> FEATURE:
<223> OTHER INFORMATION: Synthetic Construct

<400> SEQUENCE: 68
ttctatcgta tatcgtgt catgacatgc ttggtcgacg aggtcggaac tagcatcgca					60 ggcacgcaca cggatccaga tcgagct					87

<210> SEQ ID NO 69
<211> LENGTH: 87
<212> TYPE: DNA
<213> ORGANISM: Artificial Sequence
<220> FEATURE:
<223> OTHER INFORMATION: Synthetic Construct

<400> SEQUENCE: 69
ttctagactt cacatcacca caatgacgcg agacagttag ctccgaaggt atcgcgattg					60 ccagctactg gactcaacgt atatgct					87

<210> SEQ ID NO 70
<211> LENGTH: 87
<212> TYPE: DNA
<213> ORGANISM: Artificial Sequence
<220> FEATURE:
<223> OTHER INFORMATION: Synthetic Construct

<400> SEQUENCE: 70
ttctagacaa tacagtgttc tacattctac catcgttcgg agcctcagaa gctgaatatc					60 gctactatca tactctcaac tatcacg					87

<210> SEQ ID NO 71
<211> LENGTH: 87
<212> TYPE: DNA
<213> ORGANISM: Artificial Sequence
<220> FEATURE:
<223> OTHER INFORMATION: Synthetic Construct

<400> SEQUENCE: 71
ttctagaact agatgtcttg aatgcgcttc actttctagc gatagcagaa gatcgcgaca    60
gcaactatca gactccagtg ccgatct                                        87

<210> SEQ ID NO 72
<211> LENGTH: 87
<212> TYPE: DNA
<213> ORGANISM: Artificial Sequence
<220> FEATURE:
<223> OTHER INFORMATION: Synthetic Construct

<400> SEQUENCE: 72
ttctagaagt atccactgaa tttccacaag ttcagtcata cgagcggtgt ctctttccgt    60
gcagagtcga gagtaacatg aatccat                                        87

<210> SEQ ID NO 73
<211> LENGTH: 87
<212> TYPE: DNA
<213> ORGANISM: Artificial Sequence
<220> FEATURE:
<223> OTHER INFORMATION: Synthetic Construct

<400> SEQUENCE: 73
ttctagagtc gatgacatta cggacgattg agcggaacaa atgaggcttg attaagacga    60
tagcgacacg tcacttctag tgtgttc                                        87

<210> SEQ ID NO 74
<211> LENGTH: 87
<212> TYPE: DNA
<213> ORGANISM: Artificial Sequence
<220> FEATURE:
<223> OTHER INFORMATION: Synthetic Construct

<400> SEQUENCE: 74
ttcctcgtat gcgcacgagt gcagggactc cctcagatcg tctatggtca tgatatagat    60
gctctccctg agacgggagt ggtatga                                        87

<210> SEQ ID NO 75
<211> LENGTH: 87
<212> TYPE: DNA
<213> ORGANISM: Artificial Sequence
<220> FEATURE:
<223> OTHER INFORMATION: Synthetic Construct

<400> SEQUENCE: 75
ttctctgcga tatgtttaga ccgtctcata tagttctgat tcccatctgg tgtgctcaag    60
gtgccttgtg ctttatagaa gtcaggt                                        87

<210> SEQ ID NO 76
<211> LENGTH: 87
<212> TYPE: DNA
<213> ORGANISM: Artificial Sequence
<220> FEATURE:
<223> OTHER INFORMATION: Synthetic Construct

<400> SEQUENCE: 76
ttctctgctg agttctcata tagtagcgac gtccatcgct tgtgaaaggc atatctattg    60
aagcgcgtga cagctatctc gatgcga                                        87

<210> SEQ ID NO 77

```
<211> LENGTH: 87
<212> TYPE: DNA
<213> ORGANISM: Artificial Sequence
<220> FEATURE:
<223> OTHER INFORMATION: Synthetic Construct

<400> SEQUENCE: 77
ttctctagat actaggatac acagagttga ttaacagctt atagatgcga cactacacga    60
tagagccagc tgtagctcaa cgtcact                                        87

<210> SEQ ID NO 78
<211> LENGTH: 87
<212> TYPE: DNA
<213> ORGANISM: Artificial Sequence
<220> FEATURE:
<223> OTHER INFORMATION: Synthetic Construct

<400> SEQUENCE: 78
ttctctagtt gcggttgact cgtgatgcta gagggcgcta gatcgaagga gcctatccga    60
tctcgaactt tggatccgat cttcctc                                        87

<210> SEQ ID NO 79
<211> LENGTH: 87
<212> TYPE: DNA
<213> ORGANISM: Artificial Sequence
<220> FEATURE:
<223> OTHER INFORMATION: Synthetic Construct

<400> SEQUENCE: 79
ttctctgtgg tcgcgttcag ccattctcag ggaatggctg gtctcgtgta ctctaaggat    60
cctactccta tgcctcgtag acagtga                                        87

<210> SEQ ID NO 80
<211> LENGTH: 87
<212> TYPE: DNA
<213> ORGANISM: Artificial Sequence
<220> FEATURE:
<223> OTHER INFORMATION: Synthetic Construct

<400> SEQUENCE: 80
ttctctgtct ctaactcgct aaagctcaga aagcagtgtg tctcagtcga gaactctcgt    60
atcccttgac cttgccgaaa gctcgag                                        87

<210> SEQ ID NO 81
<211> LENGTH: 87
<212> TYPE: DNA
<213> ORGANISM: Artificial Sequence
<220> FEATURE:
<223> OTHER INFORMATION: Synthetic Construct

<400> SEQUENCE: 81
ttctctacgg gtacatagaa ctgagtatac ctgacgggtt tgaacatcaa tcgctatgga    60
ctcccgtctg ctcagatggt actagcg                                        87

<210> SEQ ID NO 82
<211> LENGTH: 87
<212> TYPE: DNA
<213> ORGANISM: Artificial Sequence
<220> FEATURE:
<223> OTHER INFORMATION: Synthetic Construct

<400> SEQUENCE: 82
ttctctactt ctggattaag agctcgtgcg gtatagggat tctcttgaag tcctggcggc    60
```
acttacatga gtgtaaacgc acagtga                                               87

<210> SEQ ID NO 83
<211> LENGTH: 87
<212> TYPE: DNA
<213> ORGANISM: Artificial Sequence
<220> FEATURE:
<223> OTHER INFORMATION: Synthetic Construct

<400> SEQUENCE: 83
ttctctaagt tctctgtctc tccgcatgca ctcccgcatc gcctcataac agagcgatta          60
cgctgatgag ctccgtagtg tcgttga                                              87

<210> SEQ ID NO 84
<211> LENGTH: 87
<212> TYPE: DNA
<213> ORGANISM: Artificial Sequence
<220> FEATURE:
<223> OTHER INFORMATION: Synthetic Construct

<400> SEQUENCE: 84
ttctctaaca gaatgcgaca gtagtacaga ccataggact gtgattgact gtgtttcaga          60
cctagttcag tggtctagtg catctca                                              87

<210> SEQ ID NO 85
<211> LENGTH: 87
<212> TYPE: DNA
<213> ORGANISM: Artificial Sequence
<220> FEATURE:
<223> OTHER INFORMATION: Synthetic Construct

<400> SEQUENCE: 85
ttcccgtaca caaacgtgac tgcttactct tatactatgt ctctcgtaga gagaccacca          60
gtcgtctaca ctgtcgtatg cgaggca                                              87

<210> SEQ ID NO 86
<211> LENGTH: 87
<212> TYPE: DNA
<213> ORGANISM: Artificial Sequence
<220> FEATURE:
<223> OTHER INFORMATION: Synthetic Construct

<400> SEQUENCE: 86
ttcccatcat tccagttcca cgagcctccg cgatgatagt cagacctata cagattctct          60
caggcattga actgcgagtc gagtagc                                              87

<210> SEQ ID NO 87
<211> LENGTH: 87
<212> TYPE: DNA
<213> ORGANISM: Artificial Sequence
<220> FEATURE:
<223> OTHER INFORMATION: Synthetic Construct

<400> SEQUENCE: 87
ttcccgtgta agcagatgat aatctagtca gcaatcggta gctagaacat cgtcagcact          60
ataagtcata gaactcgaac ttctaag                                              87

<210> SEQ ID NO 88
<211> LENGTH: 87
<212> TYPE: DNA
<213> ORGANISM: Artificial Sequence
<220> FEATURE:

<223> OTHER INFORMATION: Synthetic Construct

<400> SEQUENCE: 88
ttcccataga gtcgaatgtc atagttccac ttaagaagat gtactatccg agaggcggag    60
ataactatca agatgacact catggtc    87

<210> SEQ ID NO 89
<211> LENGTH: 87
<212> TYPE: DNA
<213> ORGANISM: Artificial Sequence
<220> FEATURE:
<223> OTHER INFORMATION: Synthetic Construct

<400> SEQUENCE: 89
ttcccattcc gcttccatcg cgcacacgag agatgttgct ctgagttagt ggtccattgt    60
ggaggactcc gacgctagcg tagaaag    87

<210> SEQ ID NO 90
<211> LENGTH: 87
<212> TYPE: DNA
<213> ORGANISM: Artificial Sequence
<220> FEATURE:
<223> OTHER INFORMATION: Synthetic Construct

<400> SEQUENCE: 90
ttcttgaagc cgcctttcca gaatcctgta caggtgcatg ctaagtgcgt aacttagagt    60
aactacctag gtacgatctg acgacag    87

<210> SEQ ID NO 91
<211> LENGTH: 87
<212> TYPE: DNA
<213> ORGANISM: Artificial Sequence
<220> FEATURE:
<223> OTHER INFORMATION: Synthetic Construct

<400> SEQUENCE: 91
ttcccatcta cgttcggtaa gtgtactccg ccttcgtctg acgagcgata gagatataca    60
ctaccgtacc tggtccacta ggcactg    87

<210> SEQ ID NO 92
<211> LENGTH: 87
<212> TYPE: DNA
<213> ORGANISM: Artificial Sequence
<220> FEATURE:
<223> OTHER INFORMATION: Synthetic Construct

<400> SEQUENCE: 92
ttcccgttag tgtatacgcg aatcatccag actaaggcac catagccact cgtcccggca    60
tatctagtaa atgtccgctt aataaag    87

<210> SEQ ID NO 93
<211> LENGTH: 87
<212> TYPE: DNA
<213> ORGANISM: Artificial Sequence
<220> FEATURE:
<223> OTHER INFORMATION: Synthetic Construct

<400> SEQUENCE: 93
ttcccgctct ctctgcagat ctacgagctc ccgcgacgaa gtgatttcac tcgccgagga    60
ttacgcccat gtttcctagg atcagcg    87

```
<210> SEQ ID NO 94
<211> LENGTH: 87
<212> TYPE: DNA
<213> ORGANISM: Artificial Sequence
<220> FEATURE:
<223> OTHER INFORMATION: Synthetic Construct

<400> SEQUENCE: 94
ttcccgtgaa gagatcgagg acatcatact agcaagttgt gtgcattgtt cgtgggaatc      60
cgaccttatt cgtagtagtc gctgtga                                         87

<210> SEQ ID NO 95
<211> LENGTH: 87
<212> TYPE: DNA
<213> ORGANISM: Artificial Sequence
<220> FEATURE:
<223> OTHER INFORMATION: Synthetic Construct

<400> SEQUENCE: 95
ttcccacgtc gcagccgaag taagtaggtg agactactag gacgccgtga tccagatttg      60
gctacttgat agaattgaag aaaggtg                                         87

<210> SEQ ID NO 96
<211> LENGTH: 87
<212> TYPE: DNA
<213> ORGANISM: Artificial Sequence
<220> FEATURE:
<223> OTHER INFORMATION: Synthetic Construct

<400> SEQUENCE: 96
ttctcgagaa gaagccatgc gtgtctgaag tgaataatgg gcgtcgtccc tccggacacg      60
agcacgccat cggctgagca gagtccg                                         87

<210> SEQ ID NO 97
<211> LENGTH: 87
<212> TYPE: DNA
<213> ORGANISM: Artificial Sequence
<220> FEATURE:
<223> OTHER INFORMATION: Synthetic Construct

<400> SEQUENCE: 97
ttctgttctg actagagtta ggctatgtta cagatgccag gtaagactcg tctcccgtta      60
tattaggagt ctacttagtc atataga                                         87

<210> SEQ ID NO 98
<211> LENGTH: 87
<212> TYPE: DNA
<213> ORGANISM: Artificial Sequence
<220> FEATURE:
<223> OTHER INFORMATION: Synthetic Construct

<400> SEQUENCE: 98
ttctgttcac cttcaggaca gctgccggag ctcagactac gaagagaccc tggcccgttc      60
tcacgtaagc gatgcagtag taacata                                         87

<210> SEQ ID NO 99
<211> LENGTH: 87
<212> TYPE: DNA
<213> ORGANISM: Artificial Sequence
<220> FEATURE:
<223> OTHER INFORMATION: Synthetic Construct

<400> SEQUENCE: 99
```

```
ttctgcttct tgaatacaca gtctacaaat gtctatgtga cgggtagagg cgctactcgc    60
tcattacgcc agccacgaat cggaagt                                        87

<210> SEQ ID NO 100
<211> LENGTH: 87
<212> TYPE: DNA
<213> ORGANISM: Artificial Sequence
<220> FEATURE:
<223> OTHER INFORMATION: Synthetic Construct

<400> SEQUENCE: 100
ttctgtttgt tgtcaggctg atagcgatgc ggccctctct gcaacacgga gacaagatcg    60
tctgagctcc acggtccgcc tcctgca                                        87

<210> SEQ ID NO 101
<211> LENGTH: 87
<212> TYPE: DNA
<213> ORGANISM: Artificial Sequence
<220> FEATURE:
<223> OTHER INFORMATION: Synthetic Construct

<400> SEQUENCE: 101
ttctagggtc tcagcacggt ggcgttcgca taggtgagtt acaagggccg tctcagatcg    60
atcgtaatct cgtgctgcgt aagcggt                                        87

<210> SEQ ID NO 102
<211> LENGTH: 87
<212> TYPE: DNA
<213> ORGANISM: Artificial Sequence
<220> FEATURE:
<223> OTHER INFORMATION: Synthetic Construct

<400> SEQUENCE: 102
ttctagggat agcatatcta gccattctag tagtctttca gtagactgat cgacgcaagc    60
gtggagagaa atcgccgcgg ctgagct                                        87

<210> SEQ ID NO 103
<211> LENGTH: 87
<212> TYPE: DNA
<213> ORGANISM: Artificial Sequence
<220> FEATURE:
<223> OTHER INFORMATION: Synthetic Construct

<400> SEQUENCE: 103
ttctaggata tgggattctt gcgactcaga aatcacgatg cgcgtgagga tgagcagaac    60
tctccgcagc tcggctattc tccggtg                                        87

<210> SEQ ID NO 104
<211> LENGTH: 87
<212> TYPE: DNA
<213> ORGANISM: Artificial Sequence
<220> FEATURE:
<223> OTHER INFORMATION: Synthetic Construct

<400> SEQUENCE: 104
ttctaggagc atggactcat agagcctcga gtaatgctag tcggttgcca cttaggacca    60
acacctcagt agcagccttg accagtc                                        87

<210> SEQ ID NO 105
<211> LENGTH: 87
<212> TYPE: DNA
<213> ORGANISM: Artificial Sequence
```

```
<220> FEATURE:
<223> OTHER INFORMATION: Synthetic Construct

<400> SEQUENCE: 105
ttctaggcta acgctatctg tggaacatct aagagatcgg atatattcag acagccgagc        60
ctaagcatca tcgatggatt cctcgct                                            87

<210> SEQ ID NO 106
<211> LENGTH: 87
<212> TYPE: DNA
<213> ORGANISM: Artificial Sequence
<220> FEATURE:
<223> OTHER INFORMATION: Synthetic Construct

<400> SEQUENCE: 106
ttctaggcag tggtaagtgt agagtcatat cctgtgcaca gagtcccgtg tctcgtattg        60
cagggttcaa tccagaacct attagtc                                            87

<210> SEQ ID NO 107
<211> LENGTH: 87
<212> TYPE: DNA
<213> ORGANISM: Artificial Sequence
<220> FEATURE:
<223> OTHER INFORMATION: Synthetic Construct

<400> SEQUENCE: 107
ttcttgagtc tagagactct cctgggtaag tgctagtgtc ataactattg cctgactcag        60
ctcactgtct cgcactagaa catcaga                                            87

<210> SEQ ID NO 108
<211> LENGTH: 87
<212> TYPE: DNA
<213> ORGANISM: Artificial Sequence
<220> FEATURE:
<223> OTHER INFORMATION: Synthetic Construct

<400> SEQUENCE: 108
ttctcaacac tgagtgtatt ctctggagag gaccgtatat cgatcgtaac ggagcctaag        60
acgcacaatc ctctgcgctc taagtag                                            87

<210> SEQ ID NO 109
<211> LENGTH: 87
<212> TYPE: DNA
<213> ORGANISM: Artificial Sequence
<220> FEATURE:
<223> OTHER INFORMATION: Synthetic Construct

<400> SEQUENCE: 109
ttcccgcgat cggcaacacg accggagaga ccaactcagg ataatacgtg ccagcctcgc        60
ctgcgtttcc gtcgccgttg cgtacag                                            87

<210> SEQ ID NO 110
<211> LENGTH: 87
<212> TYPE: DNA
<213> ORGANISM: Artificial Sequence
<220> FEATURE:
<223> OTHER INFORMATION: Synthetic Construct

<400> SEQUENCE: 110
ttctcaaatg gtacactgga gaagccagac aactcttctc atcctggatc attacgtcct        60
gatactagtg cggtcctcac gatgcag                                            87
```

<210> SEQ ID NO 111
<211> LENGTH: 87
<212> TYPE: DNA
<213> ORGANISM: Artificial Sequence
<220> FEATURE:
<223> OTHER INFORMATION: Synthetic Construct

<400> SEQUENCE: 111
ttctcaataa gatgacatct gttgtagctc ctcgtgactt agttgagccg acagccagag    60
ctcactgcac gagagagcga ggagcta                                        87

<210> SEQ ID NO 112
<211> LENGTH: 87
<212> TYPE: DNA
<213> ORGANISM: Artificial Sequence
<220> FEATURE:
<223> OTHER INFORMATION: Synthetic Construct

<400> SEQUENCE: 112
ttctcaactt tgatcacatc tggagtctag cagctgggac tatagcctaa gtcttcgctg    60
ctcggatgaa agggtcataa ccgtatc                                        87

<210> SEQ ID NO 113
<211> LENGTH: 87
<212> TYPE: DNA
<213> ORGANISM: Artificial Sequence
<220> FEATURE:
<223> OTHER INFORMATION: Synthetic Construct

<400> SEQUENCE: 113
ttccaccctt cttctccacc gatcttatgc gtaatcgtcc gaggccatga tcaggtctga    60
ctcctcagag gtgagcgagc aggccct                                        87

<210> SEQ ID NO 114
<211> LENGTH: 87
<212> TYPE: DNA
<213> ORGANISM: Artificial Sequence
<220> FEATURE:
<223> OTHER INFORMATION: Synthetic Construct

<400> SEQUENCE: 114
tttccaataa tatgaagaaa gccgagttat agacctttct tcgctgagaa ggctaagcag    60
tgagtcggca acggtctaaa tcacaag                                        87

<210> SEQ ID NO 115
<211> LENGTH: 87
<212> TYPE: DNA
<213> ORGANISM: Artificial Sequence
<220> FEATURE:
<223> OTHER INFORMATION: Synthetic Construct

<400> SEQUENCE: 115
ttcccgacta tcagacgcaa gctgcagcag cactagactt tcaagctacg agacatgacg    60
atcctccact gacgcttaag agatcac                                        87

<210> SEQ ID NO 116
<211> LENGTH: 87
<212> TYPE: DNA
<213> ORGANISM: Artificial Sequence
<220> FEATURE:
<223> OTHER INFORMATION: Synthetic Construct

<400> SEQUENCE: 116

```
ttctgcgact cttagtctat gttaatcggt tattcacctt caaatgtgcc tccgagtcgc    60
ttattggctg acagcagtgg cttaata                                        87

<210> SEQ ID NO 117
<211> LENGTH: 87
<212> TYPE: DNA
<213> ORGANISM: Artificial Sequence
<220> FEATURE:
<223> OTHER INFORMATION: Synthetic Construct

<400> SEQUENCE: 117
ttcctcgaga cacctaagcc ggcttattga gctgatacta tcgaggtggg atcagatctg    60
cctcgttacg cagagtaggg catcgga                                        87

<210> SEQ ID NO 118
<211> LENGTH: 87
<212> TYPE: DNA
<213> ORGANISM: Artificial Sequence
<220> FEATURE:
<223> OTHER INFORMATION: Synthetic Construct

<400> SEQUENCE: 118
ttcctcagaa tcggacatcg cctgcatctc atggagctat gaatattctc tgtcggccag    60
cacctaaaga gacaggatgg ccgcgag                                        87

<210> SEQ ID NO 119
<211> LENGTH: 87
<212> TYPE: DNA
<213> ORGANISM: Artificial Sequence
<220> FEATURE:
<223> OTHER INFORMATION: Synthetic Construct

<400> SEQUENCE: 119
ttctcacctt ctcagctagg tgtcacgact ctgcagtagc aggcgtatgt acgctgtccg    60
ccgcatggct tgactctcgt agagctc                                        87

<210> SEQ ID NO 120
<211> LENGTH: 87
<212> TYPE: DNA
<213> ORGANISM: Artificial Sequence
<220> FEATURE:
<223> OTHER INFORMATION: Synthetic Construct

<400> SEQUENCE: 120
ttctcactgg tcactggaca gagtccacgc actacttatc agtagggaat ctgcgtgtct    60
actttgatgc cgtagcagct gtaggga                                        87

<210> SEQ ID NO 121
<211> LENGTH: 87
<212> TYPE: DNA
<213> ORGANISM: Artificial Sequence
<220> FEATURE:
<223> OTHER INFORMATION: Synthetic Construct

<400> SEQUENCE: 121
ttcttcgagc tcccaatcta tgactgactc atcagagcta cgccgtgtcc aaacccgaag    60
tcaccagcgc catcacgaca ctatctc                                        87

<210> SEQ ID NO 122
<211> LENGTH: 87
<212> TYPE: DNA
```

<213> ORGANISM: Artificial Sequence
<220> FEATURE:
<223> OTHER INFORMATION: Synthetic Construct

<400> SEQUENCE: 122
ttcttcgacc tagtgggatt gtgactgcag ctgcgattca taggaaatgc tttccacgat    60
gtctgattct acggtttcgt cctcgga                                        87

<210> SEQ ID NO 123
<211> LENGTH: 87
<212> TYPE: DNA
<213> ORGANISM: Artificial Sequence
<220> FEATURE:
<223> OTHER INFORMATION: Synthetic Construct

<400> SEQUENCE: 123
ttctcgcgta ctcctcagtc ttaggtatag aagtattgct gattactgcg tctgcactag    60
tagttcgatc cgttccgttt ccagctc                                        87

<210> SEQ ID NO 124
<211> LENGTH: 87
<212> TYPE: DNA
<213> ORGANISM: Artificial Sequence
<220> FEATURE:
<223> OTHER INFORMATION: Synthetic Construct

<400> SEQUENCE: 124
ttctgaagac ctctcgctaa tctctatcgt ctaactctat cttagggacg cctctagcta    60
gcagtctcgc taaaggctcg cgaggat                                        87

<210> SEQ ID NO 125
<211> LENGTH: 87
<212> TYPE: DNA
<213> ORGANISM: Artificial Sequence
<220> FEATURE:
<223> OTHER INFORMATION: Synthetic Construct

<400> SEQUENCE: 125
ttctcgcata gcccgcgaat gcgtgtgact tagtgcatcc agagtcctat gccttcggtc    60
aatggacaca tagtcgtctg agatact                                        87

<210> SEQ ID NO 126
<211> LENGTH: 87
<212> TYPE: DNA
<213> ORGANISM: Artificial Sequence
<220> FEATURE:
<223> OTHER INFORMATION: Synthetic Construct

<400> SEQUENCE: 126
ttctcaccgg agcgacgtat attagctcac ctacctcact atcagtgagg aatgcagcct    60
gtgggcgctt gacagcattc gaagaag                                        87

<210> SEQ ID NO 127
<211> LENGTH: 87
<212> TYPE: DNA
<213> ORGANISM: Artificial Sequence
<220> FEATURE:
<223> OTHER INFORMATION: Synthetic Construct

<400> SEQUENCE: 127
ttcttcagac tgcacacttc tacaccagtc tgcctaaagc agatcacaca gtagagatag    60
ctctctgtca ctagtctata ttatgag                                        87

<210> SEQ ID NO 128
<211> LENGTH: 87
<212> TYPE: DNA
<213> ORGANISM: Artificial Sequence
<220> FEATURE:
<223> OTHER INFORMATION: Synthetic Construct

<400> SEQUENCE: 128
ttcttcagca ctgctgtgtc tggctctagt ggtaatcgaa accagatggt caagatctag    60
gaggagcgca gatcaaatag atcgaga                                        87

<210> SEQ ID NO 129
<211> LENGTH: 87
<212> TYPE: DNA
<213> ORGANISM: Artificial Sequence
<220> FEATURE:
<223> OTHER INFORMATION: Synthetic Construct

<400> SEQUENCE: 129
ttcttcaagc gaagcagacg aacgtagact actctgtgtc aggcatgccg ctgacgacag    60
actcagccgc agccttgtgg tctatag                                        87

<210> SEQ ID NO 130
<211> LENGTH: 87
<212> TYPE: DNA
<213> ORGANISM: Artificial Sequence
<220> FEATURE:
<223> OTHER INFORMATION: Synthetic Construct

<400> SEQUENCE: 130
ttctcacgag tagagagtcc tcgaaagctc aacaatcgtg acagaaacgg atagtcgcac    60
ataacattca caacacctgc aatgctc                                        87

<210> SEQ ID NO 131
<211> LENGTH: 87
<212> TYPE: DNA
<213> ORGANISM: Artificial Sequence
<220> FEATURE:
<223> OTHER INFORMATION: Synthetic Construct

<400> SEQUENCE: 131
ttcttcgcag gaatcacatc acaccegtac atcgcttagc gacaggtgtt atgatgaaat    60
ttctacggcc acctggagtc tggagca                                        87

<210> SEQ ID NO 132
<211> LENGTH: 87
<212> TYPE: DNA
<213> ORGANISM: Artificial Sequence
<220> FEATURE:
<223> OTHER INFORMATION: Synthetic Construct

<400> SEQUENCE: 132
ttcttcgctc tcatatactg acgaactcgc agctcgcaca gccaccgagg cacgcgctga    60
tctgagcacg ctgtcgcagc attggag                                        87

<210> SEQ ID NO 133
<211> LENGTH: 87
<212> TYPE: DNA
<213> ORGANISM: Artificial Sequence
<220> FEATURE:
<223> OTHER INFORMATION: Synthetic Construct

<400> SEQUENCE: 133
ttcttcgtac tatgacgact ccatgcgtag aatttctgag ctaatgatct acgagacttg    60
ccattcagag cgatccgaca tagaggc    87

<210> SEQ ID NO 134
<211> LENGTH: 87
<212> TYPE: DNA
<213> ORGANISM: Artificial Sequence
<220> FEATURE:
<223> OTHER INFORMATION: Synthetic Construct

<400> SEQUENCE: 134
ttcttcgtcc atctcgtatg tcgaaagtat tgtagcagtc tcccttgcag cgcgttatag    60
tcattgcatg tcactatgtt cgtaaga    87

<210> SEQ ID NO 135
<211> LENGTH: 87
<212> TYPE: DNA
<213> ORGANISM: Artificial Sequence
<220> FEATURE:
<223> OTHER INFORMATION: Synthetic Construct

<400> SEQUENCE: 135
ttcccaatcg tcagagctta ggtagacact ttcgtcacaa catgacatat gaaggtagag    60
tatgagtgcc catcggtcat aatctgt    87

<210> SEQ ID NO 136
<211> LENGTH: 87
<212> TYPE: DNA
<213> ORGANISM: Artificial Sequence
<220> FEATURE:
<223> OTHER INFORMATION: Synthetic Construct

<400> SEQUENCE: 136
ttctatatcg agtacttcgg ccctgcggac actgcttaca agcgaatagg ccctggtgcg    60
gtcgtcctcg tcctaggaag agactcg    87

<210> SEQ ID NO 137
<211> LENGTH: 87
<212> TYPE: DNA
<213> ORGANISM: Artificial Sequence
<220> FEATURE:
<223> OTHER INFORMATION: Synthetic Construct

<400> SEQUENCE: 137
ttcccaccta agcagtagtg acgattagta ccaacacatt gacgagacaa gtgaggtcta    60
tacaatataa atgtacgact ctcaaag    87

<210> SEQ ID NO 138
<211> LENGTH: 87
<212> TYPE: DNA
<213> ORGANISM: Artificial Sequence
<220> FEATURE:
<223> OTHER INFORMATION: Synthetic Construct

<400> SEQUENCE: 138
ttcccagagc ctctaacagt ctgctagtgc agctgaactt gactgatgtg agatggttca    60
ataggtggct taatagcacg acatgga    87

<210> SEQ ID NO 139
<211> LENGTH: 87

```
<212> TYPE: DNA
<213> ORGANISM: Artificial Sequence
<220> FEATURE:
<223> OTHER INFORMATION: Synthetic Construct

<400> SEQUENCE: 139 tcccacaca gccagttacc tctcgcagcg ggacctgtga atggcttaag aatgcacgta    60
atccgttctt gattccctga gacttca                                      87

<210> SEQ ID NO 140
<211> LENGTH: 87
<212> TYPE: DNA
<213> ORGANISM: Artificial Sequence
<220> FEATURE:
<223> OTHER INFORMATION: Synthetic Construct

<400> SEQUENCE: 140
ttcctcggaa acctacctaa gtgccatcct tagccatgac tcaacggaat caatgtcggc    60
tatactcctg caactgcttg ctacccg                                       87

<210> SEQ ID NO 141
<211> LENGTH: 87
<212> TYPE: DNA
<213> ORGANISM: Artificial Sequence
<220> FEATURE:
<223> OTHER INFORMATION: Synthetic Construct

<400> SEQUENCE: 141
ttctcagata agtgacacga tcagttcgca ttcaattgta agcctttaac agcttagtag    60
gtcttctaga tctctgcgta cacgcca                                       87

<210> SEQ ID NO 142
<211> LENGTH: 87
<212> TYPE: DNA
<213> ORGANISM: Artificial Sequence
<220> FEATURE:
<223> OTHER INFORMATION: Synthetic Construct

<400> SEQUENCE: 142
ttctcggagc gcaacacaaa tagtaagtct ctccctgctg cacagcataa gtataatttc    60
aagaagttgc acacttcacc tctcccg                                       87

<210> SEQ ID NO 143
<211> LENGTH: 87
<212> TYPE: DNA
<213> ORGANISM: Artificial Sequence
<220> FEATURE:
<223> OTHER INFORMATION: Synthetic Construct

<400> SEQUENCE: 143
ttctcgggtc acgcaaacgt gacatgctgc cctagattct gcacggagcg taacgcttct    60
tacagcgctg tcagcagcac ttcgcgt                                       87

<210> SEQ ID NO 144
<211> LENGTH: 87
<212> TYPE: DNA
<213> ORGANISM: Artificial Sequence
<220> FEATURE:
<223> OTHER INFORMATION: Synthetic Construct

<400> SEQUENCE: 144
ttctcgggac acggtggtac tctaggcgat aagtgcgtca cacgcgcatg tccttctgct    60
```
catttctagc tcgctgacat gggtcct 87

<210> SEQ ID NO 145
<211> LENGTH: 87
<212> TYPE: DNA
<213> ORGANISM: Artificial Sequence
<220> FEATURE:
<223> OTHER INFORMATION: Synthetic Construct

<400> SEQUENCE: 145
ttcctcgacg tcagactata taagtgaaga gcgccggcgg tatagtctca cgcaaagact 60
aagccgtcag tcagcgctgg actcgga 87

<210> SEQ ID NO 146
<211> LENGTH: 87
<212> TYPE: DNA
<213> ORGANISM: Artificial Sequence
<220> FEATURE:
<223> OTHER INFORMATION: Synthetic Construct

<400> SEQUENCE: 146
ttcctcgcgg agctatctga gacaaatcct tagccgcagt agagccagca gatccgcatc 60
atcgtgttcg cgtctctcta ctagaag 87

<210> SEQ ID NO 147
<211> LENGTH: 87
<212> TYPE: DNA
<213> ORGANISM: Artificial Sequence
<220> FEATURE:
<223> OTHER INFORMATION: Synthetic Construct

<400> SEQUENCE: 147
ttctattcta gttagtacga tgagcagtac tgaagagagc tggtgagcct caagtgtatg 60 tataggcg agcacctaag tataaga 87

<210> SEQ ID NO 148
<211> LENGTH: 87
<212> TYPE: DNA
<213> ORGANISM: Artificial Sequence
<220> FEATURE:
<223> OTHER INFORMATION: Synthetic Construct

<400> SEQUENCE: 148
ttctactcgg gaatactgcg aaacctatct cgaggactag cagtcgagag agtagagcct 60
gatttcttcg ctggttacga tagtgga 87

<210> SEQ ID NO 149
<211> LENGTH: 87
<212> TYPE: DNA
<213> ORGANISM: Artificial Sequence
<220> FEATURE:
<223> OTHER INFORMATION: Synthetic Construct

<400> SEQUENCE: 149
ttctactatc gacattatga tgtggatcac ttaccagtac atcctggaac taacttatga 60
aagcagtagt cttacccacc tggtggt 87

<210> SEQ ID NO 150
<211> LENGTH: 87
<212> TYPE: DNA
<213> ORGANISM: Artificial Sequence
<220> FEATURE:
<223> OTHER INFORMATION: Synthetic Construct

<400> SEQUENCE: 150
ttctgcgcgg tgtgtgtaag atacgcttag gctgtcccac tccactgttt gggtacgtca    60
actggtaagt cgaagaagtg aagagca                                        87

<210> SEQ ID NO 151
<211> LENGTH: 87
<212> TYPE: DNA
<213> ORGANISM: Artificial Sequence
<220> FEATURE:
<223> OTHER INFORMATION: Synthetic Construct

<400> SEQUENCE: 151
ttctgtgctg agtaggcgga ggcttcggac cctttctctg tcggagcgca gttattacga    60
cgctctcgac gaaagtctac ggataag                                        87

<210> SEQ ID NO 152
<211> LENGTH: 87
<212> TYPE: DNA
<213> ORGANISM: Artificial Sequence
<220> FEATURE:
<223> OTHER INFORMATION: Synthetic Construct

<400> SEQUENCE: 152
ttctgtgtag acggcgtcca gttacctgca ggctcatcta cgacagatta gttggctgcg    60
ctccctgtct gtctcagcgg tggcccg                                        87

<210> SEQ ID NO 153
<211> LENGTH: 87
<212> TYPE: DNA
<213> ORGANISM: Artificial Sequence
<220> FEATURE:
<223> OTHER INFORMATION: Synthetic Construct

<400> SEQUENCE: 153
ttctgattcg gtcgcgcgta taatttcaat taccgaggaa tgagagtagt agactgacgc    60
gacgatcctc gagacatggg atcgtct                                        87

<210> SEQ ID NO 154
<211> LENGTH: 87
<212> TYPE: DNA
<213> ORGANISM: Artificial Sequence
<220> FEATURE:
<223> OTHER INFORMATION: Synthetic Construct

<400> SEQUENCE: 154
ttctgtggag tctgatgtct gtctgagtgt gattcggcaa tccagcaccc agagctggcg    60
gcttgtcctt atgataatgt ggaccag                                        87

<210> SEQ ID NO 155
<211> LENGTH: 87
<212> TYPE: DNA
<213> ORGANISM: Artificial Sequence
<220> FEATURE:
<223> OTHER INFORMATION: Synthetic Construct

<400> SEQUENCE: 155
ttctgcggct ctgtatatgt ccagcgattc cagttcgtgt tctactagaa tgtgttacgc    60
tgatatcgag ctcatcacga gagattc                                        87

<210> SEQ ID NO 156

<211> LENGTH: 87
<212> TYPE: DNA
<213> ORGANISM: Artificial Sequence
<220> FEATURE:
<223> OTHER INFORMATION: Synthetic Construct

<400> SEQUENCE: 156
ttctgcgagc cgaagaattg ccgaccaata aagtctccga tcactcctga ctctactgtc    60
ttgtcgcgcc gagctgagtt actgtcg                                        87

<210> SEQ ID NO 157
<211> LENGTH: 87
<212> TYPE: DNA
<213> ORGANISM: Artificial Sequence
<220> FEATURE:
<223> OTHER INFORMATION: Synthetic Construct

<400> SEQUENCE: 157
ttccatactt ctatgccttc gtgagagtgc actgcaaagc tacgtttccc tttgctgtct    60
cagacaagcg cgcaggctcc gcactat                                        87

<210> SEQ ID NO 158
<211> LENGTH: 87
<212> TYPE: DNA
<213> ORGANISM: Artificial Sequence
<220> FEATURE:
<223> OTHER INFORMATION: Synthetic Construct

<400> SEQUENCE: 158
ttcttcatac tgctcggagt ctcgtatatc ataactaagc atgattatta catcagacac    60
agaaatgagt agttagcatc tgcagct                                        87

<210> SEQ ID NO 159
<211> LENGTH: 87
<212> TYPE: DNA
<213> ORGANISM: Artificial Sequence
<220> FEATURE:
<223> OTHER INFORMATION: Synthetic Construct

<400> SEQUENCE: 159
ttcccagcga accacacaat acgaaactgc ggtctcggac cgcagttctt cgacgataga    60
aagagtggag gaggagtagg atgacga                                        87

<210> SEQ ID NO 160
<211> LENGTH: 87
<212> TYPE: DNA
<213> ORGANISM: Artificial Sequence
<220> FEATURE:
<223> OTHER INFORMATION: Synthetic Construct

<400> SEQUENCE: 160
ttcccaacgg tatagtgagc tctagtcagc aagctggaga tccgtttaag cttctctgac    60
tgaacagcgc tgctgacagc agtgttc                                        87

<210> SEQ ID NO 161
<211> LENGTH: 87
<212> TYPE: DNA
<213> ORGANISM: Artificial Sequence
<220> FEATURE:
<223> OTHER INFORMATION: Synthetic Construct

<400> SEQUENCE: 161
ttcttctgct gaggactcgt gactcagcag ctgtgctata cgagacgaaa gaatactaga    60
ggactcctcc atgcagcttg aacgctg                                               87

<210> SEQ ID NO 162
<211> LENGTH: 87
<212> TYPE: DNA
<213> ORGANISM: Artificial Sequence
<220> FEATURE:
<223> OTHER INFORMATION: Synthetic Construct

<400> SEQUENCE: 162
ttctgttaca tggacgctgc acagtgtcgt aagagacgat gtccgttatc gctcggttag        60
ctcttcgctg gccctatctc gtatagc                                             87

<210> SEQ ID NO 163
<211> LENGTH: 87
<212> TYPE: DNA
<213> ORGANISM: Artificial Sequence
<220> FEATURE:
<223> OTHER INFORMATION: Synthetic Construct

<400> SEQUENCE: 163
ttctgttagg aggagcctgc tctaactccg agaagactac agcgccgagc acagacaaga        60
tgagatcatc cggctacacg cgtccgt                                             87

<210> SEQ ID NO 164
<211> LENGTH: 87
<212> TYPE: DNA
<213> ORGANISM: Artificial Sequence
<220> FEATURE:
<223> OTHER INFORMATION: Synthetic Construct

<400> SEQUENCE: 164
ttctgttgcg gtgcgctcat cacttaccca tgcgtggtgg gatctcgtgc taacatgttg        60
tgtatcctcc agaagtcgcc ttatgtc                                             87

<210> SEQ ID NO 165
<211> LENGTH: 87
<212> TYPE: DNA
<213> ORGANISM: Artificial Sequence
<220> FEATURE:
<223> OTHER INFORMATION: Synthetic Construct

<400> SEQUENCE: 165
ttctgctgac attgcgtccc tccttcagga ggatctataa gccactctcg aataccgcta        60
atacaccgcc gaatcgctct aagtatc                                             87

<210> SEQ ID NO 166
<211> LENGTH: 87
<212> TYPE: DNA
<213> ORGANISM: Artificial Sequence
<220> FEATURE:
<223> OTHER INFORMATION: Synthetic Construct

<400> SEQUENCE: 166
ttctgcctct gtcacactga ggagcctgct cctccttgcg gacctactac ttctagagag        60
cgactctgta taggcttact accggct                                             87

<210> SEQ ID NO 167
<211> LENGTH: 87
<212> TYPE: DNA
<213> ORGANISM: Artificial Sequence
<220> FEATURE:

<223> OTHER INFORMATION: Synthetic Construct

<400> SEQUENCE: 167
ttcctccctc tcgacttata gacgatggag gctacttgct cgcacggaca gcagtatcgt    60
gatctgatgg tcctaatgaa tttagag                                        87

<210> SEQ ID NO 168
<211> LENGTH: 87
<212> TYPE: DNA
<213> ORGANISM: Artificial Sequence
<220> FEATURE:
<223> OTHER INFORMATION: Synthetic Construct

<400> SEQUENCE: 168
ttctgtcctg agcacactgc ttgtccacgc agtgtacgaa accacctgag atctacttga    60
ggcacgctca acaacgcatg agtcgca                                        87

<210> SEQ ID NO 169
<211> LENGTH: 87
<212> TYPE: DNA
<213> ORGANISM: Artificial Sequence
<220> FEATURE:
<223> OTHER INFORMATION: Synthetic Construct

<400> SEQUENCE: 169
ttctgcccga cgagttgttg ctaggtctga ttccacggtg tccctgagtg actggtcgta    60
cgcctcctag cgctcttatc ttgcaat                                        87

<210> SEQ ID NO 170
<211> LENGTH: 87
<212> TYPE: DNA
<213> ORGANISM: Artificial Sequence
<220> FEATURE:
<223> OTHER INFORMATION: Synthetic Construct

<400> SEQUENCE: 170
ttcttcatca gaactatagg aactacatgt gtggacaagt gctagggagg cggcatgcct    60
cgttcgactt atggttagaa cgcgcag                                        87

<210> SEQ ID NO 171
<211> LENGTH: 87
<212> TYPE: DNA
<213> ORGANISM: Artificial Sequence
<220> FEATURE:
<223> OTHER INFORMATION: Synthetic Construct

<400> SEQUENCE: 171
ttctgccaga tcgagagcgg actgcataac ctatctaagg cgtctgtcaa ggagactatg    60
ctaggactcg agggacactt caagaag                                        87

<210> SEQ ID NO 172
<211> LENGTH: 87
<212> TYPE: DNA
<213> ORGANISM: Artificial Sequence
<220> FEATURE:
<223> OTHER INFORMATION: Synthetic Construct

<400> SEQUENCE: 172
ttctgaccag gcctcttatc gtagatgcgt ggaaatgact tacctctcta gcagatgtct    60
aatctgagat gaacttaggt cacatta                                        87

```
<210> SEQ ID NO 173
<211> LENGTH: 87
<212> TYPE: DNA
<213> ORGANISM: Artificial Sequence
<220> FEATURE:
<223> OTHER INFORMATION: Synthetic Construct

<400> SEQUENCE: 173
ttcttggagg cttgctctca ctctaagctc ttccctggcg catactgata tatgaacgca    60
tgagctgtct tctataagcc ggattgc                                        87

<210> SEQ ID NO 174
<211> LENGTH: 87
<212> TYPE: DNA
<213> ORGANISM: Artificial Sequence
<220> FEATURE:
<223> OTHER INFORMATION: Synthetic Construct

<400> SEQUENCE: 174
ttcctcctct tctatctctc atcatacagc agaagctgtc tacgatcaaa gctgagtact    60
ttcagaggca agctggcgtt ctatgtc                                        87

<210> SEQ ID NO 175
<211> LENGTH: 87
<212> TYPE: DNA
<213> ORGANISM: Artificial Sequence
<220> FEATURE:
<223> OTHER INFORMATION: Synthetic Construct

<400> SEQUENCE: 175
ttcctcctgc tcccgagata tcctatccag acgcctagtt cgtatactaa cggtcctgta    60
cgaagcgcat agatagaggc taagatg                                        87

<210> SEQ ID NO 176
<211> LENGTH: 87
<212> TYPE: DNA
<213> ORGANISM: Artificial Sequence
<220> FEATURE:
<223> OTHER INFORMATION: Synthetic Construct

<400> SEQUENCE: 176
ttctcggcaa cttagttggg ctatttccgc gctcgagtaa gaatgttagg agcgggatag    60
ctcggataga ctatctgcgg ctcactc                                        87

<210> SEQ ID NO 177
<211> LENGTH: 87
<212> TYPE: DNA
<213> ORGANISM: Artificial Sequence
<220> FEATURE:
<223> OTHER INFORMATION: Synthetic Construct

<400> SEQUENCE: 177
ttcttccgac gacgaatcta gggattccag agcgtcgcac tatgccatcc acctagcgag    60
agaactggcg cagtggatcc ggcgaag                                        87

<210> SEQ ID NO 178
<211> LENGTH: 87
<212> TYPE: DNA
<213> ORGANISM: Artificial Sequence
<220> FEATURE:
<223> OTHER INFORMATION: Synthetic Construct

<400> SEQUENCE: 178
```

```
ttcctctgta ctgctcctat cgtcatcgtc cctctcctgt tgatctatgg ttagcagatc    60
actggaatac cgaatcctta tgtctag                                        87
```

<210> SEQ ID NO 179
<211> LENGTH: 87
<212> TYPE: DNA
<213> ORGANISM: Artificial Sequence
<220> FEATURE:
<223> OTHER INFORMATION: Synthetic Construct

<400> SEQUENCE: 179

```
ttcttactct ctcgatcaaa tgtcgcgctg cgtttgaact gatcaatgtt acgtgaggca    60
gtacgctctt tccataaccg cttcata                                        87
```

<210> SEQ ID NO 180
<211> LENGTH: 87
<212> TYPE: DNA
<213> ORGANISM: Artificial Sequence
<220> FEATURE:
<223> OTHER INFORMATION: Synthetic Construct

<400> SEQUENCE: 180

```
ttcttatgag tcggccctgg atctctcaag cagtagtgtg attagatgtc aaatggactc    60
tctatcctag agtctggaag aatcatc                                        87
```

<210> SEQ ID NO 181
<211> LENGTH: 87
<212> TYPE: DNA
<213> ORGANISM: Artificial Sequence
<220> FEATURE:
<223> OTHER INFORMATION: Synthetic Construct

<400> SEQUENCE: 181

```
ttcctctgat atggacctta tagctgtcac tcatgctatt tagcgagagc tgtactcttc    60
aagtcacgtc taccttgaag tctgtat                                        87
```

<210> SEQ ID NO 182
<211> LENGTH: 87
<212> TYPE: DNA
<213> ORGANISM: Artificial Sequence
<220> FEATURE:
<223> OTHER INFORMATION: Synthetic Construct

<400> SEQUENCE: 182

```
ttccctacga atttcccata ggatttacag aaggcaaaga ctagaactcg atcgagacag    60
cgatctcgaa tgttcggaaa cctcaag                                        87
```

<210> SEQ ID NO 183
<211> LENGTH: 87
<212> TYPE: DNA
<213> ORGANISM: Artificial Sequence
<220> FEATURE:
<223> OTHER INFORMATION: Synthetic Construct

<400> SEQUENCE: 183

```
ttccctactg aggctcgcgg caacccggct ggctagacaa atagcgcgca gctaatcatg    60
actcagttat cagatctcga ttgttat                                        87
```

<210> SEQ ID NO 184
<211> LENGTH: 87
<212> TYPE: DNA
<213> ORGANISM: Artificial Sequence
<220> FEATURE:
<223> OTHER INFORMATION: Synthetic Construct

<400> SEQUENCE: 184
ttccctatgc cagagaagtg agagcgcgtg atactaggag agttgggaag aactataccg    60
gctgcttagt gtaagagaag ttgacga    87

<210> SEQ ID NO 185
<211> LENGTH: 87
<212> TYPE: DNA
<213> ORGANISM: Artificial Sequence
<220> FEATURE:
<223> OTHER INFORMATION: Synthetic Construct

<400> SEQUENCE: 185
ttccctatct gaactaagcc tcgactccga gctactaatg gctactacaa cagacacaag    60
agaagaaagt ctatcctacg tctggct    87

<210> SEQ ID NO 186
<211> LENGTH: 87
<212> TYPE: DNA
<213> ORGANISM: Artificial Sequence
<220> FEATURE:
<223> OTHER INFORMATION: Synthetic Construct

<400> SEQUENCE: 186
ttccctcgac acagctgtct cttagatacg actgcaggag agacagacta gttgtgaatc    60
ggagagtgac tagtcgtgac gatcgat    87

<210> SEQ ID NO 187
<211> LENGTH: 87
<212> TYPE: DNA
<213> ORGANISM: Artificial Sequence
<220> FEATURE:
<223> OTHER INFORMATION: Synthetic Construct

<400> SEQUENCE: 187
ttccctcgta gagctaagtc tatcgctgac aataagtgta cttacgagaa tttaggccat    60
tcaggtacac gactagtcat gcgtagc    87

<210> SEQ ID NO 188
<211> LENGTH: 87
<212> TYPE: DNA
<213> ORGANISM: Artificial Sequence
<220> FEATURE:
<223> OTHER INFORMATION: Synthetic Construct

<400> SEQUENCE: 188
ttccctcagt agggtagctg ttctcgatat actcacatga agactcctct ctaggagcca    60
cctcgagcat tcatgaacga gactggc    87

<210> SEQ ID NO 189
<211> LENGTH: 87
<212> TYPE: DNA
<213> ORGANISM: Artificial Sequence
<220> FEATURE:
<223> OTHER INFORMATION: Synthetic Construct

<400> SEQUENCE: 189
ttccctcata tattaccagt gcgactccag ttcactgtcc gaagcgcaat cgctttggta    60
gacggtcacg tcgtccatag acctgtc    87

<210> SEQ ID NO 190
<211> LENGTH: 87
<212> TYPE: DNA
<213> ORGANISM: Artificial Sequence
<220> FEATURE:
<223> OTHER INFORMATION: Synthetic Construct

<400> SEQUENCE: 190
ttccctccgt atgtgttagc aagcctaaag aatttgaaga gattgtgccg tgcgtatgat      60
cacggattcg cgtgcgagtg tgtgtag                                         87

<210> SEQ ID NO 191
<211> LENGTH: 87
<212> TYPE: DNA
<213> ORGANISM: Artificial Sequence
<220> FEATURE:
<223> OTHER INFORMATION: Synthetic Construct

<400> SEQUENCE: 191
ttccctcctc agggatgaat ctacttcgtg cattatcctt ctcagaacca ccactactcg      60
tagacaatca gacacggtta gtacgca                                         87

<210> SEQ ID NO 192
<211> LENGTH: 87
<212> TYPE: DNA
<213> ORGANISM: Artificial Sequence
<220> FEATURE:
<223> OTHER INFORMATION: Synthetic Construct

<400> SEQUENCE: 192
ttctgagact gacagcagag actcgatggc cagtgaaagt tgagaactcg ttgagctcag      60
taggacttca actctcgatc tccgcct                                         87

<210> SEQ ID NO 193
<211> LENGTH: 87
<212> TYPE: DNA
<213> ORGANISM: Artificial Sequence
<220> FEATURE:
<223> OTHER INFORMATION: Synthetic Construct

<400> SEQUENCE: 193
ttcctctctt attgcgcgat cgctgagcct cgttagatgt gcgaccatat atcttgagtg      60
gtagtgtctg gaccagaggc gaaggtg                                         87

<210> SEQ ID NO 194
<211> LENGTH: 87
<212> TYPE: DNA
<213> ORGANISM: Artificial Sequence
<220> FEATURE:
<223> OTHER INFORMATION: Synthetic Construct

<400> SEQUENCE: 194
ttcctctcga gaggatgaca ttctggtcat aatccgaagt tccgttctac tcctctcgac      60
atagtcctga ctatcacgcc gaagatc                                         87

<210> SEQ ID NO 195
<211> LENGTH: 87
<212> TYPE: DNA
<213> ORGANISM: Artificial Sequence
<220> FEATURE:
<223> OTHER INFORMATION: Synthetic Construct

<400> SEQUENCE: 195
ttctgtctgt tgtgcataag acgatatctc gtcatgcata gagtacagca gttcttccga    60
atctaggagt acatggtcaa cacaagc                                        87

<210> SEQ ID NO 196
<211> LENGTH: 87
<212> TYPE: DNA
<213> ORGANISM: Artificial Sequence
<220> FEATURE:
<223> OTHER INFORMATION: Synthetic Construct

<400> SEQUENCE: 196
ttccattcta atctgaagta tactagctgc ttgagaaatg gatctcaggc aatgaagcta    60
ccatgcgtgt taatcctacg agacctc                                        87

<210> SEQ ID NO 197
<211> LENGTH: 87
<212> TYPE: DNA
<213> ORGANISM: Artificial Sequence
<220> FEATURE:
<223> OTHER INFORMATION: Synthetic Construct

<400> SEQUENCE: 197
ttccactcgg tgcatgcatg agctagttgc cgacgcagac gccctagcag tacagcgcga    60
ccaacactcg gattcaactg agctaag                                        87

<210> SEQ ID NO 198
<211> LENGTH: 87
<212> TYPE: DNA
<213> ORGANISM: Artificial Sequence
<220> FEATURE:
<223> OTHER INFORMATION: Synthetic Construct

<400> SEQUENCE: 198
ttccattaca atgcactggg aggattgtgt gcacagcatg agatactacc taaggctcct    60
ctccgatagt cttcgtctcc agagccg                                        87

<210> SEQ ID NO 199
<211> LENGTH: 87
<212> TYPE: DNA
<213> ORGANISM: Artificial Sequence
<220> FEATURE:
<223> OTHER INFORMATION: Synthetic Construct

<400> SEQUENCE: 199
ttccattagc tgaacgtgca gccgacatgc tacatcccgt cgacaagccc tccaacttgt    60
gaggagcagt agccttagtt cctcttc                                        87

<210> SEQ ID NO 200
<211> LENGTH: 87
<212> TYPE: DNA
<213> ORGANISM: Artificial Sequence
<220> FEATURE:
<223> OTHER INFORMATION: Synthetic Construct

<400> SEQUENCE: 200
ttcccgggcc tcgagttcgg ttctaactgc caggctatca acttcgtcga cagccgactg    60
aaggagttca gttagggaac tgtgcta                                        87

<210> SEQ ID NO 201
<211> LENGTH: 87
<212> TYPE: DNA

```
<213> ORGANISM: Artificial Sequence
<220> FEATURE:
<223> OTHER INFORMATION: Synthetic Construct

<400> SEQUENCE: 201
ttctcggtcc gaagatctta gtgctatgct cctggagatg gcagatgtgc gacaggattg    60
tcacatgcta gtggactccg tcgtagt                                        87

<210> SEQ ID NO 202
<211> LENGTH: 87
<212> TYPE: DNA
<213> ORGANISM: Artificial Sequence
<220> FEATURE:
<223> OTHER INFORMATION: Synthetic Construct

<400> SEQUENCE: 202
ttccacttcc tgatctctcc gcatgcttgt cctggtaaga caggaacaag ccgctagggt    60
tagggaagcg agtgtgcttg tggagct                                        87

<210> SEQ ID NO 203
<211> LENGTH: 87
<212> TYPE: DNA
<213> ORGANISM: Artificial Sequence
<220> FEATURE:
<223> OTHER INFORMATION: Synthetic Construct

<400> SEQUENCE: 203
ttccatttgt gagcgtgaaa gggcatctgt gaggcatctt tcgagtcatt cagaagcgtc    60
catactaagt ctgaggtcca tggtcga                                        87

<210> SEQ ID NO 204
<211> LENGTH: 87
<212> TYPE: DNA
<213> ORGANISM: Artificial Sequence
<220> FEATURE:
<223> OTHER INFORMATION: Synthetic Construct

<400> SEQUENCE: 204
ttccactgtg gactattcgg atcagcttgc ctctcattat tgatcagctt cagctgaacg    60
taggtctact tggtctcgta gttagct                                        87

<210> SEQ ID NO 205
<211> LENGTH: 87
<212> TYPE: DNA
<213> ORGANISM: Artificial Sequence
<220> FEATURE:
<223> OTHER INFORMATION: Synthetic Construct

<400> SEQUENCE: 205
ttccactgaa gatctgtcca caagggttgt tgaaacccac tgtgaccggc gtgattgaga    60
gatcgtcagg gtaatttgcc gcgacga                                        87

<210> SEQ ID NO 206
<211> LENGTH: 87
<212> TYPE: DNA
<213> ORGANISM: Artificial Sequence
<220> FEATURE:
<223> OTHER INFORMATION: Synthetic Construct

<400> SEQUENCE: 206
ttctctcata gatcatatcg tcgaatcgct actctactgg ctctcatatt atatagagtg    60
tcttgaatgc tgactcgcac tttgagc                                        87
```

<210> SEQ ID NO 207
<211> LENGTH: 87
<212> TYPE: DNA
<213> ORGANISM: Artificial Sequence
<220> FEATURE:
<223> OTHER INFORMATION: Synthetic Construct

<400> SEQUENCE: 207
ttctgtcaca aggtcacgtt cgatcgcctg ataggaccac cgtatgagac tcacggtacg      60
cagctctctg tcgtagctca tgtggag                                         87

<210> SEQ ID NO 208
<211> LENGTH: 87
<212> TYPE: DNA
<213> ORGANISM: Artificial Sequence
<220> FEATURE:
<223> OTHER INFORMATION: Synthetic Construct

<400> SEQUENCE: 208
ttctctcgtt agtctgcttt cgagcagcgt agagataatt gaggcttctc tgagaagtct      60
tgactccgat cactattctg ctatgag                                         87

<210> SEQ ID NO 209
<211> LENGTH: 87
<212> TYPE: DNA
<213> ORGANISM: Artificial Sequence
<220> FEATURE:
<223> OTHER INFORMATION: Synthetic Construct

<400> SEQUENCE: 209
ttctctcgag cacgttacct cgtcctcgca tcacaggtat cataggtacg atgacctgag      60
caccaggtcg atagtaatgt gccagac                                         87

<210> SEQ ID NO 210
<211> LENGTH: 87
<212> TYPE: DNA
<213> ORGANISM: Artificial Sequence
<220> FEATURE:
<223> OTHER INFORMATION: Synthetic Construct

<400> SEQUENCE: 210
ttctctctcg tcccgtcggt ccgaatgtag ccgacacgaa tcatcgcgtt ggctcgaact      60
ggtcgatgaa gttgagcgcg aagaatc                                         87

<210> SEQ ID NO 211
<211> LENGTH: 87
<212> TYPE: DNA
<213> ORGANISM: Artificial Sequence
<220> FEATURE:
<223> OTHER INFORMATION: Synthetic Construct

<400> SEQUENCE: 211
ttctctctgc ctggctgagg ctaccctcct cagatattcc caatgtgaga tgtctcatat      60
aagatatatc atcacaagcg accattc                                         87

<210> SEQ ID NO 212
<211> LENGTH: 87
<212> TYPE: DNA
<213> ORGANISM: Artificial Sequence
<220> FEATURE:
<223> OTHER INFORMATION: Synthetic Construct

```
<400> SEQUENCE: 212
ttctctcctg gaggattagt agtctatttg acgaacctag ctgacctatt aggaggttct    60
ctcgcaagcc atggcacact gtcgtgc                                        87

<210> SEQ ID NO 213
<211> LENGTH: 87
<212> TYPE: DNA
<213> ORGANISM: Artificial Sequence
<220> FEATURE:
<223> OTHER INFORMATION: Synthetic Construct

<400> SEQUENCE: 213
ttctctccgc tctcacagcg ctcaggaact ccatgatgat cttgccgacc agtagtatga    60
aatctcaact accgatacgc agtaaga                                        87

<210> SEQ ID NO 214
<211> LENGTH: 87
<212> TYPE: DNA
<213> ORGANISM: Artificial Sequence
<220> FEATURE:
<223> OTHER INFORMATION: Synthetic Construct

<400> SEQUENCE: 214
ttctctatct agccaatcac ggcacactga agcgctcagc agacgccgta cgtgtacact    60
gtgccttgtc tcatatgcac tacatct                                        87

<210> SEQ ID NO 215
<211> LENGTH: 87
<212> TYPE: DNA
<213> ORGANISM: Artificial Sequence
<220> FEATURE:
<223> OTHER INFORMATION: Synthetic Construct

<400> SEQUENCE: 215
ttctctatac acggactccg actgatccct gctaaggagg gtttctagcc tatctcgaga    60
ctgccttagc acacaactga ggtaatc                                        87

<210> SEQ ID NO 216
<211> LENGTH: 87
<212> TYPE: DNA
<213> ORGANISM: Artificial Sequence
<220> FEATURE:
<223> OTHER INFORMATION: Synthetic Construct

<400> SEQUENCE: 216
ttcctccgat acaagttgat aatcctcctg gagcctttca aggagagtcc tatcatccag    60
ttggatttag agaagggtcg attaaag                                        87

<210> SEQ ID NO 217
<211> LENGTH: 87
<212> TYPE: DNA
<213> ORGANISM: Artificial Sequence
<220> FEATURE:
<223> OTHER INFORMATION: Synthetic Construct

<400> SEQUENCE: 217
ttcctccgtt tcgctatcca cttgttcctc cctcgacata agataccggt cagagcttga    60
cgcggcagac cgttccgaaa cctcgtc                                        87

<210> SEQ ID NO 218
<211> LENGTH: 87
```

```
<212> TYPE: DNA
<213> ORGANISM: Artificial Sequence
<220> FEATURE:
<223> OTHER INFORMATION: Synthetic Construct

<400> SEQUENCE: 218
ttcctccagg gaatggctaa gcgcgtaact cgcctctgag ctccgctggt attacctcga      60
agacgtgtcg tcctctatac tcgagct                                         87

<210> SEQ ID NO 219
<211> LENGTH: 87
<212> TYPE: DNA
<213> ORGANISM: Artificial Sequence
<220> FEATURE:
<223> OTHER INFORMATION: Synthetic Construct

<400> SEQUENCE: 219
ttcctccacg tgttcgcagg attattacta atccgaagaa tccgttcaca gctattcgct      60
cgaactggac gccataatta ggtcctc                                         87

<210> SEQ ID NO 220
<211> LENGTH: 87
<212> TYPE: DNA
<213> ORGANISM: Artificial Sequence
<220> FEATURE:
<223> OTHER INFORMATION: Synthetic Construct

<400> SEQUENCE: 220
ttcctcacgg gcatccgagg atgctcttga tgagagatgg gaatgctgga ggattcagac      60
tgttcacagg tgtgctgacc tatgaga                                         87

<210> SEQ ID NO 221
<211> LENGTH: 87
<212> TYPE: DNA
<213> ORGANISM: Artificial Sequence
<220> FEATURE:
<223> OTHER INFORMATION: Synthetic Construct

<400> SEQUENCE: 221
ttcctcactg tgcgtgaccc taacgcggga aataacacta gattgaaggg attattaaac      60
atcagagtgt agaaggcaag cactgct                                         87

<210> SEQ ID NO 222
<211> LENGTH: 87
<212> TYPE: DNA
<213> ORGANISM: Artificial Sequence
<220> FEATURE:
<223> OTHER INFORMATION: Synthetic Construct

<400> SEQUENCE: 222
ttcctcatga tcaagtgatc aaatcagcga tatagagtct tctgcagaca gttcggccat      60
gaggctgcgt ataagttaca tccacca                                         87

<210> SEQ ID NO 223
<211> LENGTH: 87
<212> TYPE: DNA
<213> ORGANISM: Artificial Sequence
<220> FEATURE:
<223> OTHER INFORMATION: Synthetic Construct

<400> SEQUENCE: 223
ttcctcatct atacacctaa cgcgtataat acgcgagagg gccctggatg tctacaggta      60
```
cctgtcatcc gagaggtaaa ccatagc                                            87

<210> SEQ ID NO 224
<211> LENGTH: 87
<212> TYPE: DNA
<213> ORGANISM: Artificial Sequence
<220> FEATURE:
<223> OTHER INFORMATION: Synthetic Construct

<400> SEQUENCE: 224
ttcctcaagg cttgtcgaag tgcgatattc gaggcgctcg tcgctcgata tttctgccga        60
taggcgagag taactctgtc acctcgt                                            87

<210> SEQ ID NO 225
<211> LENGTH: 87
<212> TYPE: DNA
<213> ORGANISM: Artificial Sequence
<220> FEATURE:
<223> OTHER INFORMATION: Synthetic Construct

<400> SEQUENCE: 225
ttcctcaact tcgtaaagag agatccgtca ttctctactg agttacgaga cacattcctc        60
tgaagagcgg accgtgacca gactcct                                            87

<210> SEQ ID NO 226
<211> LENGTH: 87
<212> TYPE: DNA
<213> ORGANISM: Artificial Sequence
<220> FEATURE:
<223> OTHER INFORMATION: Synthetic Construct

<400> SEQUENCE: 226
ttcttgcgtc tataggtgtc tagtatcatc acactaccta cttgagctcg tgtccctgtc        60
caggtgctcc tcgtgtgatt agtctct                                            87

<210> SEQ ID NO 227
<211> LENGTH: 87
<212> TYPE: DNA
<213> ORGANISM: Artificial Sequence
<220> FEATURE:
<223> OTHER INFORMATION: Synthetic Construct

<400> SEQUENCE: 227
ttcttgcagg cgataacagt ctgaatatag tgctgcgatc agttaaagat aacgcgctga        60
ggcgtcaaga cgggctctga tccatgt                                            87

<210> SEQ ID NO 228
<211> LENGTH: 87
<212> TYPE: DNA
<213> ORGANISM: Artificial Sequence
<220> FEATURE:
<223> OTHER INFORMATION: Synthetic Construct

<400> SEQUENCE: 228
ttcttgatct tcgagtgaaa ctcacctaat gctagctctg ctgtcgctcg tacgggatca        60
ttataccctt tgacgactta ccaccag                                            87

<210> SEQ ID NO 229
<211> LENGTH: 87
<212> TYPE: DNA
<213> ORGANISM: Artificial Sequence
<220> FEATURE:
<223> OTHER INFORMATION: Synthetic Construct

<400> SEQUENCE: 229
ttcttacgaa atacttcaac tgatgtatac acgtcgtctc gcagctgacg ctgaggtctc    60
gagatcaatc gtctccaggc tcgtgtc                                        87

<210> SEQ ID NO 230
<211> LENGTH: 87
<212> TYPE: DNA
<213> ORGANISM: Artificial Sequence
<220> FEATURE:
<223> OTHER INFORMATION: Synthetic Construct

<400> SEQUENCE: 230
ttcttaccta agggactacg tgacgctaca aattacttcg atcgtcagcg aatcatctct    60
cctaacggtg acagatcgac tgtattc                                        87

<210> SEQ ID NO 231
<211> LENGTH: 87
<212> TYPE: DNA
<213> ORGANISM: Artificial Sequence
<220> FEATURE:
<223> OTHER INFORMATION: Synthetic Construct

<400> SEQUENCE: 231
ttcttactgg atttgacgta ctgagctgct gtagatcaca tgcagttcgc tttattctac    60
gtattgactg gtgtcatcga ggacgat                                        87

<210> SEQ ID NO 232
<211> LENGTH: 87
<212> TYPE: DNA
<213> ORGANISM: Artificial Sequence
<220> FEATURE:
<223> OTHER INFORMATION: Synthetic Construct

<400> SEQUENCE: 232
ttcttacact cactctaggc atcgaacggc atcggtgtcc gattgtgtct cttagctgct    60
acacctatac gtccttcgac tggtgat                                        87

<210> SEQ ID NO 233
<211> LENGTH: 87
<212> TYPE: DNA
<213> ORGANISM: Artificial Sequence
<220> FEATURE:
<223> OTHER INFORMATION: Synthetic Construct

<400> SEQUENCE: 233
ttcttgccat tctgtggctg aaacgcgcag aatagtagcc ctcagttctc aggtagactc    60
ggagcacagg agtcgggata tgagctg                                        87

<210> SEQ ID NO 234
<211> LENGTH: 87
<212> TYPE: DNA
<213> ORGANISM: Artificial Sequence
<220> FEATURE:
<223> OTHER INFORMATION: Synthetic Construct

<400> SEQUENCE: 234
ttcttgactc tccattgatt ctctttcaag tatcgcttcg gacaggcatg tatacagcac    60
cgcgtcgcag cgacgatctg acataca                                        87

<210> SEQ ID NO 235

```
<211> LENGTH: 87
<212> TYPE: DNA
<213> ORGANISM: Artificial Sequence
<220> FEATURE:
<223> OTHER INFORMATION: Synthetic Construct

<400> SEQUENCE: 235
ttcttgatgt cacagacagg ttagatgcga cgaaagtatt atgcacgagt ctgacgagta      60
agaagcctca ctcctggacg aggattg                                          87

<210> SEQ ID NO 236
<211> LENGTH: 87
<212> TYPE: DNA
<213> ORGANISM: Artificial Sequence
<220> FEATURE:
<223> OTHER INFORMATION: Synthetic Construct

<400> SEQUENCE: 236
ttcttctacg tcgcgccttc tctcgcaact ggatgatgac atctcgagtc agcgtacaga      60
tagcgcaacg cgttctcaac gcgctga                                          87

<210> SEQ ID NO 237
<211> LENGTH: 87
<212> TYPE: DNA
<213> ORGANISM: Artificial Sequence
<220> FEATURE:
<223> OTHER INFORMATION: Synthetic Construct

<400> SEQUENCE: 237
ttcccaagct tcttgtcttc atattagtgc tgactcctac ctccacatca gcgccgaatc      60
ataactacga acaagatcac tatagtc                                          87

<210> SEQ ID NO 238
<211> LENGTH: 87
<212> TYPE: DNA
<213> ORGANISM: Artificial Sequence
<220> FEATURE:
<223> OTHER INFORMATION: Synthetic Construct

<400> SEQUENCE: 238
ttcttggcga gagctgatac ttagcatgct acgcacctcc gctgccacat ctctagctga      60
cgcctgtgta gctatcacat gacgtat                                          87

<210> SEQ ID NO 239
<211> LENGTH: 87
<212> TYPE: DNA
<213> ORGANISM: Artificial Sequence
<220> FEATURE:
<223> OTHER INFORMATION: Synthetic Construct

<400> SEQUENCE: 239
ttctgtgtct catatatcct agctacagat acgatgtctc tgatgccacc tggagtgttg      60
tctcgtggtc tatatggaca cataaca                                          87

<210> SEQ ID NO 240
<211> LENGTH: 87
<212> TYPE: DNA
<213> ORGANISM: Artificial Sequence
<220> FEATURE:
<223> OTHER INFORMATION: Synthetic Construct

<400> SEQUENCE: 240
ttcccgagat tcttatcttc atactagtgt tgactcctac ctccacatca gcgtcgaatc      60
```
ataactacga ataagttccg aagccgt       87

<210> SEQ ID NO 241
<211> LENGTH: 87
<212> TYPE: DNA
<213> ORGANISM: Artificial Sequence
<220> FEATURE:
<223> OTHER INFORMATION: Synthetic Construct

<400> SEQUENCE: 241
ttcccaaagg gtttgtatgg aatcagttgc atcgtccgaa ctttcatcat atcgtatgct       60
ccacctaata ataactagta ccgttga       87

<210> SEQ ID NO 242
<211> LENGTH: 87
<212> TYPE: DNA
<213> ORGANISM: Artificial Sequence
<220> FEATURE:
<223> OTHER INFORMATION: Synthetic Construct

<400> SEQUENCE: 242
ttctacagaa gaccagctac ttgagagact gtctacatcg tctcatgacc ttcagtgcgc       60
cagaagtacc atcgcgtcct cctcctc       87

<210> SEQ ID NO 243
<211> LENGTH: 87
<212> TYPE: DNA
<213> ORGANISM: Artificial Sequence
<220> FEATURE:
<223> OTHER INFORMATION: Synthetic Construct

<400> SEQUENCE: 243
ttctacagct cgcgcggacg aaatcattcg gtcctgcgac gtagatgagt cccaacaaac       60
gtagatatct agcgacgaat cggtaag       87

<210> SEQ ID NO 244
<211> LENGTH: 87
<212> TYPE: DNA
<213> ORGANISM: Artificial Sequence
<220> FEATURE:
<223> OTHER INFORMATION: Synthetic Construct

<400> SEQUENCE: 244
ttctacaagt gttcttgaac accagtgatc agcgcagctc agtctctagg agcaagacga       60
gtctgactca catagctcac ggtccga       87

<210> SEQ ID NO 245
<211> LENGTH: 87
<212> TYPE: DNA
<213> ORGANISM: Artificial Sequence
<220> FEATURE:
<223> OTHER INFORMATION: Synthetic Construct

<400> SEQUENCE: 245
ttctataacc ctagtaagtg tacgatctga gtgccgtctc tgtctacgat ctctcgatat       60
gagccttcgc cggcttgatc gatagta       87

<210> SEQ ID NO 246
<211> LENGTH: 87
<212> TYPE: DNA
<213> ORGANISM: Artificial Sequence
<220> FEATURE:

<223> OTHER INFORMATION: Synthetic Construct

<400> SEQUENCE: 246
ttctatacgg tggcaagacg cgtcggacat ctgactgagc caggctcgtg aactcattga    60
tgaatcagaa agttcctagt catactc    87

<210> SEQ ID NO 247
<211> LENGTH: 87
<212> TYPE: DNA
<213> ORGANISM: Artificial Sequence
<220> FEATURE:
<223> OTHER INFORMATION: Synthetic Construct

<400> SEQUENCE: 247
ttctatactg gcactaacca ggtaagacgt ctaccaggat agccgacttg cttcccatac    60
tgacgagact gtcagagatt agatagt    87

<210> SEQ ID NO 248
<211> LENGTH: 87
<212> TYPE: DNA
<213> ORGANISM: Artificial Sequence
<220> FEATURE:
<223> OTHER INFORMATION: Synthetic Construct

<400> SEQUENCE: 248
ttctatataa gagcgctcga ctgaactgag ccgcctcctg caaacaacta gactgtatga    60
ctcctaggac cgggcctctc gtcggga    87

<210> SEQ ID NO 249
<211> LENGTH: 87
<212> TYPE: DNA
<213> ORGANISM: Artificial Sequence
<220> FEATURE:
<223> OTHER INFORMATION: Synthetic Construct

<400> SEQUENCE: 249
ttcctgaagt gatattgaaa ggtcagtcgt ttcttcatga taggcgacta tggattgtcg    60
actatagaga cttgtcagca caagcag    87

<210> SEQ ID NO 250
<211> LENGTH: 87
<212> TYPE: DNA
<213> ORGANISM: Artificial Sequence
<220> FEATURE:
<223> OTHER INFORMATION: Synthetic Construct

<400> SEQUENCE: 250
ttctacgtga gtgctttccc agacaattat tgaggtactc gacagcagac tctcacagct    60
gtggatactg cgacagaccc tggttct    87

<210> SEQ ID NO 251
<211> LENGTH: 87
<212> TYPE: DNA
<213> ORGANISM: Artificial Sequence
<220> FEATURE:
<223> OTHER INFORMATION: Synthetic Construct

<400> SEQUENCE: 251
ttctatgtct tgcagggagt cggatgatag acgggccact gtgagctgaa tggcgctgag    60
aacgtctgtg tccactactg cactcgc    87

```
<210> SEQ ID NO 252
<211> LENGTH: 87
<212> TYPE: DNA
<213> ORGANISM: Artificial Sequence
<220> FEATURE:
<223> OTHER INFORMATION: Synthetic Construct

<400> SEQUENCE: 252
ttctgatcta gtcagagcgc tcgaggcagc ctgagccaga gacgcttgta gacgggacct      60
atgagcgtgt cgcgaaagag agtcacg                                         87

<210> SEQ ID NO 253
<211> LENGTH: 87
<212> TYPE: DNA
<213> ORGANISM: Artificial Sequence
<220> FEATURE:
<223> OTHER INFORMATION: Synthetic Construct

<400> SEQUENCE: 253
ttctctgata atttcttaat cgagcaccct agaaatcaca actcaagtcc aagtttccta      60
ccgggatgat gactccgttc aggcaat                                         87

<210> SEQ ID NO 254
<211> LENGTH: 87
<212> TYPE: DNA
<213> ORGANISM: Artificial Sequence
<220> FEATURE:
<223> OTHER INFORMATION: Synthetic Construct

<400> SEQUENCE: 254
ttctcgaagc gatagctcct cagacctgca cgccgcagag atccgggacg aatggcttat      60
tctactcatg acccatgaaa gcgagct                                         87

<210> SEQ ID NO 255
<211> LENGTH: 87
<212> TYPE: DNA
<213> ORGANISM: Artificial Sequence
<220> FEATURE:
<223> OTHER INFORMATION: Synthetic Construct

<400> SEQUENCE: 255
ttctgaaaga agaattatga ggcttaggga tagtcgaaga agataccttg atagggagtc      60
ggttaggctc ctagaagcac tcacgta                                         87

<210> SEQ ID NO 256
<211> LENGTH: 87
<212> TYPE: DNA
<213> ORGANISM: Artificial Sequence
<220> FEATURE:
<223> OTHER INFORMATION: Synthetic Construct

<400> SEQUENCE: 256
ttctgaagtt ctcagcactt gtgatgcgca aacttgggag cgcgtgaggg ttcaatgata      60
actgacaatg caacaacata ctcgtac                                         87

<210> SEQ ID NO 257
<211> LENGTH: 87
<212> TYPE: DNA
<213> ORGANISM: Artificial Sequence
<220> FEATURE:
<223> OTHER INFORMATION: Synthetic Construct

<400> SEQUENCE: 257
```

```
ttctgacgac cgtgatgcgt caacacgatc agagtccgcg cgtagtcacc tctaaatccg    60
gaccgcctct gcccaccgtt gaagatc                                        87
```

<210> SEQ ID NO 258
<211> LENGTH: 87
<212> TYPE: DNA
<213> ORGANISM: Artificial Sequence
<220> FEATURE:
<223> OTHER INFORMATION: Synthetic Construct

<400> SEQUENCE: 258

```
ttctgaatcg cgcacatgaa gttgctgcat ttgtactgaa tctcacaggt ggcaaagacg    60
gacggcctct cgctggtgtc tgagcct                                        87
```

<210> SEQ ID NO 259
<211> LENGTH: 87
<212> TYPE: DNA
<213> ORGANISM: Artificial Sequence
<220> FEATURE:
<223> OTHER INFORMATION: Synthetic Construct

<400> SEQUENCE: 259

```
ttctgacagg cgtatctctt ccctctccca tctcgtacat tgggacctcc gctcctctag    60
gcatagttgt cgatccatgt cgaggca                                        87
```

<210> SEQ ID NO 260
<211> LENGTH: 87
<212> TYPE: DNA
<213> ORGANISM: Artificial Sequence
<220> FEATURE:
<223> OTHER INFORMATION: Synthetic Construct

<400> SEQUENCE: 260

```
ttctgacgtt gagagtcttg attacagcag ccactgtata gatacctcgg cttgtagtgc    60
agacgtcgcc gaatcggtgc tcagaag                                        87
```

<210> SEQ ID NO 261
<211> LENGTH: 87
<212> TYPE: DNA
<213> ORGANISM: Artificial Sequence
<220> FEATURE:
<223> OTHER INFORMATION: Synthetic Construct

<400> SEQUENCE: 261

```
ttctgaacaa atgagaatgg aggagtgaac gtcccaagag cttagcgact agcagtccga    60
ctagcaactg acttcttcgc atctcag                                        87
```

<210> SEQ ID NO 262
<211> LENGTH: 87
<212> TYPE: DNA
<213> ORGANISM: Artificial Sequence
<220> FEATURE:
<223> OTHER INFORMATION: Synthetic Construct

<400> SEQUENCE: 262

```
ttctgaaatt tcctaatcaa caagactcag tattactagc cgtgttcgcg cggatgtact    60
tgaaatgcta actacgctcg atgttct                                        87
```

<210> SEQ ID NO 263
<211> LENGTH: 87
<212> TYPE: DNA
<213> ORGANISM: Artificial Sequence

```
<220> FEATURE:
<223> OTHER INFORMATION: Synthetic Construct

<400> SEQUENCE: 263
ttctgaataa gaggcgcggc tactttgaac cagagagtct acgtctctgt agcgtcatta    60
tactcattcc agagaacatg atgccga                                       87

<210> SEQ ID NO 264
<211> LENGTH: 87
<212> TYPE: DNA
<213> ORGANISM: Artificial Sequence
<220> FEATURE:
<223> OTHER INFORMATION: Synthetic Construct

<400> SEQUENCE: 264
ttctgaactt gcctctctta gttcaacaga tgagcaacgg agctagtggt ctcaaagctc    60
ggcctccagc gcgctcgata ctagcgc                                       87

<210> SEQ ID NO 265
<211> LENGTH: 87
<212> TYPE: DNA
<213> ORGANISM: Artificial Sequence
<220> FEATURE:
<223> OTHER INFORMATION: Synthetic Construct

<400> SEQUENCE: 265
ttctacggct gcactggaca ggatatccca gactgatctc ctttgaactg tcaggtcaat    60
agaacactca gtatcatacg agatggt                                       87

<210> SEQ ID NO 266
<211> LENGTH: 87
<212> TYPE: DNA
<213> ORGANISM: Artificial Sequence
<220> FEATURE:
<223> OTHER INFORMATION: Synthetic Construct

<400> SEQUENCE: 266
ttctctttgg gcgtcaaccg aggcctcatc acttcgacgg gtctcatgca gtgcacgacg    60
agaggaactt cttcactgct ctatatg                                       87

<210> SEQ ID NO 267
<211> LENGTH: 87
<212> TYPE: DNA
<213> ORGANISM: Artificial Sequence
<220> FEATURE:
<223> OTHER INFORMATION: Synthetic Construct

<400> SEQUENCE: 267
ttcttattcg agcaggcatc gaagcgacgc ataatcgcta gagagctctc tcgcactacg    60
ggcgatgtca tgactcgaaa gaacata                                       87

<210> SEQ ID NO 268
<211> LENGTH: 87
<212> TYPE: DNA
<213> ORGANISM: Artificial Sequence
<220> FEATURE:
<223> OTHER INFORMATION: Synthetic Construct

<400> SEQUENCE: 268
ttcttcggag ctctcgcttt acagcctgct ctgactgtcg gtcacatata gagaaaccgc    60
cgcggagtcg agctctctag tctccag                                       87
```

```
<210> SEQ ID NO 269
<211> LENGTH: 87
<212> TYPE: DNA
<213> ORGANISM: Artificial Sequence
<220> FEATURE:
<223> OTHER INFORMATION: Synthetic Construct

<400> SEQUENCE: 269
ttcttatctg cttatactcg cgtcgataga aaccagactt tacctttagt caaggtcgtc      60
catagacgac ctaactgtga gtagttc                                          87

<210> SEQ ID NO 270
<211> LENGTH: 87
<212> TYPE: DNA
<213> ORGANISM: Artificial Sequence
<220> FEATURE:
<223> OTHER INFORMATION: Synthetic Construct

<400> SEQUENCE: 270
ttcctatgag agccatctat gatagctcta gcatcttgag ctgagagagc ggagctaaag      60
cgactgtcat tgcctctcgt gggatga                                          87

<210> SEQ ID NO 271
<211> LENGTH: 87
<212> TYPE: DNA
<213> ORGANISM: Artificial Sequence
<220> FEATURE:
<223> OTHER INFORMATION: Synthetic Construct

<400> SEQUENCE: 271
ttcttgttat gtagagatct cttatagctc atgaaccgtg caggacgaaa tgtggcaaga      60
cagcgcagaa agtgtcgcct gcgatct                                          87

<210> SEQ ID NO 272
<211> LENGTH: 87
<212> TYPE: DNA
<213> ORGANISM: Artificial Sequence
<220> FEATURE:
<223> OTHER INFORMATION: Synthetic Construct

<400> SEQUENCE: 272
ttcttatata taagattgct ggcgcgactc acgtctaatg gcaagagttg tcctccgaca      60
cagactaaga acttgttggg actgtca                                          87

<210> SEQ ID NO 273
<211> LENGTH: 87
<212> TYPE: DNA
<213> ORGANISM: Artificial Sequence
<220> FEATURE:
<223> OTHER INFORMATION: Synthetic Construct

<400> SEQUENCE: 273
ttcttgtcag tcttctagct aacggacgag gatcgtcgct gaccttctgg tggatctttc      60
gtcacaagag agactccgaa gcgcttc                                          87

<210> SEQ ID NO 274
<211> LENGTH: 87
<212> TYPE: DNA
<213> ORGANISM: Artificial Sequence
<220> FEATURE:
<223> OTHER INFORMATION: Synthetic Construct

<400> SEQUENCE: 274
```

```
ttcctacctc tccagaatca tctgcgacta acgggccagt ctggtcaggt ggtactctcg    60
tatggccacc tccgtgatgt cgtctta                                       87

<210> SEQ ID NO 275
<211> LENGTH: 87
<212> TYPE: DNA
<213> ORGANISM: Artificial Sequence
<220> FEATURE:
<223> OTHER INFORMATION: Synthetic Construct

<400> SEQUENCE: 275
ttcctactac tataggtgcg cttcgatagc gtactcaaga tactcgagcc tggcaagact    60
ctgagaatct gatagagtac gggtcgt                                       87

<210> SEQ ID NO 276
<211> LENGTH: 87
<212> TYPE: DNA
<213> ORGANISM: Artificial Sequence
<220> FEATURE:
<223> OTHER INFORMATION: Synthetic Construct

<400> SEQUENCE: 276
ttcctgtgcg gtgcttagtt gtatttcaag ggtggaaata cactaggcgc gttaaagctc    60
ttgagcgtac cgtctagctg aagtttc                                       87

<210> SEQ ID NO 277
<211> LENGTH: 87
<212> TYPE: DNA
<213> ORGANISM: Artificial Sequence
<220> FEATURE:
<223> OTHER INFORMATION: Synthetic Construct

<400> SEQUENCE: 277
ttcctgtagg tcacgggcat cttcttgact cagttgtctc agccagaggc gtcgccttgc    60
tcgacttcta tagctcactt ggtcata                                       87

<210> SEQ ID NO 278
<211> LENGTH: 87
<212> TYPE: DNA
<213> ORGANISM: Artificial Sequence
<220> FEATURE:
<223> OTHER INFORMATION: Synthetic Construct

<400> SEQUENCE: 278
ttcctactcc gagagatcct acgacgacgc tctcgtctgg gctcgctaat ccagggatca    60
tgaccttctc gttgagagac gggagct                                       87

<210> SEQ ID NO 279
<211> LENGTH: 87
<212> TYPE: DNA
<213> ORGANISM: Artificial Sequence
<220> FEATURE:
<223> OTHER INFORMATION: Synthetic Construct

<400> SEQUENCE: 279
ttctaggtat atgatctaaa ccattgtcag ccatcgtagg gtcgctagtc ggcgagcaag    60
gtatgtacac cttgcctgtc tcagcag                                       87

<210> SEQ ID NO 280
<211> LENGTH: 87
<212> TYPE: DNA
```

```
<213> ORGANISM: Artificial Sequence
<220> FEATURE:
<223> OTHER INFORMATION: Synthetic Construct

<400> SEQUENCE: 280
ttcctatctt cttctactat aagattggtc tgtgcagtga agcgcactgc acactgtaga    60
actctcccgg gatgcgtcaa gcgagtc                                       87

<210> SEQ ID NO 281
<211> LENGTH: 87
<212> TYPE: DNA
<213> ORGANISM: Artificial Sequence
<220> FEATURE:
<223> OTHER INFORMATION: Synthetic Construct

<400> SEQUENCE: 281
ttcctgttaa attctcgaac aaagttcccg acaagactca attcagatct ccgaagagga    60
catataggaa cattcacact cgaggac                                       87

<210> SEQ ID NO 282
<211> LENGTH: 87
<212> TYPE: DNA
<213> ORGANISM: Artificial Sequence
<220> FEATURE:
<223> OTHER INFORMATION: Synthetic Construct

<400> SEQUENCE: 282
ttcctgtatt cggtgcagct gagacgtgcg gctgatttac tcgctcgata cagactagac    60
catctcgagg taggatatgg atagtta                                       87

<210> SEQ ID NO 283
<211> LENGTH: 87
<212> TYPE: DNA
<213> ORGANISM: Artificial Sequence
<220> FEATURE:
<223> OTHER INFORMATION: Synthetic Construct

<400> SEQUENCE: 283
ttcctatcgc atttacactg ccagtagtcg ttggctagac ctacgctatc attcaagtcg    60
agcggttaga tccaggtctc tccatct                                       87

<210> SEQ ID NO 284
<211> LENGTH: 87
<212> TYPE: DNA
<213> ORGANISM: Artificial Sequence
<220> FEATURE:
<223> OTHER INFORMATION: Synthetic Construct

<400> SEQUENCE: 284
ttctagtcac ctaactgttt gacagcagca aacacagacg cttactcgcc gttcctgcag    60
agccgcgcta cagatcgttc aaagtac                                       87

<210> SEQ ID NO 285
<211> LENGTH: 87
<212> TYPE: DNA
<213> ORGANISM: Artificial Sequence
<220> FEATURE:
<223> OTHER INFORMATION: Synthetic Construct

<400> SEQUENCE: 285
ttcctcttcg tcccttgagg tccttgagac gtgctatgaa tagatgtcac attacgagat    60
tcgagaatat tggagctctc tttgata                                       87
```

<210> SEQ ID NO 286
<211> LENGTH: 87
<212> TYPE: DNA
<213> ORGANISM: Artificial Sequence
<220> FEATURE:
<223> OTHER INFORMATION: Synthetic Construct

<400> SEQUENCE: 286
ttcctcttaa actgcctaaa tggagtaggc gctgtgtctt atcctgatga tttggattac    60
gaccgagact tatgatcatg cataggt                                        87

<210> SEQ ID NO 287
<211> LENGTH: 87
<212> TYPE: DNA
<213> ORGANISM: Artificial Sequence
<220> FEATURE:
<223> OTHER INFORMATION: Synthetic Construct

<400> SEQUENCE: 287
ttcttcggct gctctagaca ctgtgatgag aagcatcact gaccatagct gggaggcacg    60
gtcatcgtag agagagattc gccgcgt                                        87

<210> SEQ ID NO 288
<211> LENGTH: 87
<212> TYPE: DNA
<213> ORGANISM: Artificial Sequence
<220> FEATURE:
<223> OTHER INFORMATION: Synthetic Construct

<400> SEQUENCE: 288
ttctgagagt tcgtcagact agtagtctgt ggtgagatcc agcgaaagag tcgaggcatc    60
cgtttccgat gtcgctacga gggtgtc                                        87

<210> SEQ ID NO 289
<211> LENGTH: 87
<212> TYPE: DNA
<213> ORGANISM: Artificial Sequence
<220> FEATURE:
<223> OTHER INFORMATION: Synthetic Construct

<400> SEQUENCE: 289
ttctgaggca agtaggcggc gcgagcttag tgaggtctcg tacgctctag ctatatgttc    60
caggatatac agtgatcacc actcgtc                                        87

<210> SEQ ID NO 290
<211> LENGTH: 87
<212> TYPE: DNA
<213> ORGANISM: Artificial Sequence
<220> FEATURE:
<223> OTHER INFORMATION: Synthetic Construct

<400> SEQUENCE: 290
ttctgaggaa agaagtattt agtctatcag ggcgattgat ctggagatct gactgatgca    60
gacatcggtg tcagaatatt gccggga                                        87

<210> SEQ ID NO 291
<211> LENGTH: 87
<212> TYPE: DNA
<213> ORGANISM: Artificial Sequence
<220> FEATURE:
<223> OTHER INFORMATION: Synthetic Construct

```
<400> SEQUENCE: 291
ttctgagtcc tgtagtgata gacttctccg ttcgcatgaa tgggaggcct cagagacgac    60
ctcctagaca agtgtatcat gcgagga                                        87

<210> SEQ ID NO 292
<211> LENGTH: 87
<212> TYPE: DNA
<213> ORGANISM: Artificial Sequence
<220> FEATURE:
<223> OTHER INFORMATION: Synthetic Construct

<400> SEQUENCE: 292
ttctgagtgt gcgagtaggt gactccttgc tcgcgacgcc gaactagtgg aatcttcgag    60
catcctcgtg ctgatgtcag tgtgtag                                        87

<210> SEQ ID NO 293
<211> LENGTH: 87
<212> TYPE: DNA
<213> ORGANISM: Artificial Sequence
<220> FEATURE:
<223> OTHER INFORMATION: Synthetic Construct

<400> SEQUENCE: 293
ttctgagctt cttgatagtt ctctgcagtg ctgttccgca gactcgtcgc tgatttcaga    60
atcctgcctg acggattctt aagttag                                        87

<210> SEQ ID NO 294
<211> LENGTH: 87
<212> TYPE: DNA
<213> ORGANISM: Artificial Sequence
<220> FEATURE:
<223> OTHER INFORMATION: Synthetic Construct

<400> SEQUENCE: 294
ttctgagcgt agccgcgccc tggatattga agagtaggtg atagatatct gcgaccgaca    60
agacgactag tcactccaaa gtatcgc                                        87

<210> SEQ ID NO 295
<211> LENGTH: 87
<212> TYPE: DNA
<213> ORGANISM: Artificial Sequence
<220> FEATURE:
<223> OTHER INFORMATION: Synthetic Construct

<400> SEQUENCE: 295
ttctcgagct gcgatgcagc tttcggtcct ggacctcgac attacttcct cggcgcttgt    60
gacggttcta cgggaactcc atagtgt                                        87

<210> SEQ ID NO 296
<211> LENGTH: 87
<212> TYPE: DNA
<213> ORGANISM: Artificial Sequence
<220> FEATURE:
<223> OTHER INFORMATION: Synthetic Construct

<400> SEQUENCE: 296
ttccctgcat cacgtttcga gcgttcatag tctggagtcg tacctcgatt caagcatatg    60
gcgtgatctc tcggacagag atagaga                                        87

<210> SEQ ID NO 297
<211> LENGTH: 87
```

```
<212> TYPE: DNA
<213> ORGANISM: Artificial Sequence
<220> FEATURE:
<223> OTHER INFORMATION: Synthetic Construct

<400> SEQUENCE: 297
ttctcactct tcgatgagcg aagaggacct atcagaagtg aggctctaat ccacctaatc    60
cctttggtat gaatcgactg cgtcggt                                       87

<210> SEQ ID NO 298
<211> LENGTH: 87
<212> TYPE: DNA
<213> ORGANISM: Artificial Sequence
<220> FEATURE:
<223> OTHER INFORMATION: Synthetic Construct

<400> SEQUENCE: 298
ttctcgtgag agcagaaccc atcagtatct ccgggcgcgc aggtggtgta gttcgcggga    60
ggccagttct agcacctgta tccttcg                                       87

<210> SEQ ID NO 299
<211> LENGTH: 87
<212> TYPE: DNA
<213> ORGANISM: Artificial Sequence
<220> FEATURE:
<223> OTHER INFORMATION: Synthetic Construct

<400> SEQUENCE: 299
ttccatatag tcagttcaga ctaccagtgc cagcgattag gactgaacag ttctagatag    60
tgcctctacc taggaacttg catcgga                                       87

<210> SEQ ID NO 300
<211> LENGTH: 87
<212> TYPE: DNA
<213> ORGANISM: Artificial Sequence
<220> FEATURE:
<223> OTHER INFORMATION: Synthetic Construct

<400> SEQUENCE: 300
ttccatatct cttgacaggg ccagtcatgc tgccgaacag caatattgtg attcatagtg    60
agcgtcatat tcactggtaa cgagcca                                       87

<210> SEQ ID NO 301
<211> LENGTH: 87
<212> TYPE: DNA
<213> ORGANISM: Artificial Sequence
<220> FEATURE:
<223> OTHER INFORMATION: Synthetic Construct

<400> SEQUENCE: 301
ttccatcaga atcagcgctc taagggatgc cgagtgcctc gacgtctctg aaattctatg    60
acatactctg tggactgata ggtcgct                                       87

<210> SEQ ID NO 302
<211> LENGTH: 87
<212> TYPE: DNA
<213> ORGANISM: Artificial Sequence
<220> FEATURE:
<223> OTHER INFORMATION: Synthetic Construct

<400> SEQUENCE: 302
ttccatcacc agactccaga gtgtgcgtgc gagtagcatc tagacagcca gcaggtacag    60
```

```
cctcattaga tggctaacaa gacttgc                                          87

<210> SEQ ID NO 303
<211> LENGTH: 87
<212> TYPE: DNA
<213> ORGANISM: Artificial Sequence
<220> FEATURE:
<223> OTHER INFORMATION: Synthetic Construct

<400> SEQUENCE: 303
ttccatcgaa ctctcaaggc tcacacgtgt ctcaacgact tcaatctcat gatgggtcag      60
gagcgacgct gatatcgagg tagtgtc                                         87

<210> SEQ ID NO 304
<211> LENGTH: 87
<212> TYPE: DNA
<213> ORGANISM: Artificial Sequence
<220> FEATURE:
<223> OTHER INFORMATION: Synthetic Construct

<400> SEQUENCE: 304
ttccaccgta tccgatgaaa tggaggctgt gtctctacga agcagcagga cagaggctct      60
gacagaataa agttctctga tgagcct                                         87

<210> SEQ ID NO 305
<211> LENGTH: 87
<212> TYPE: DNA
<213> ORGANISM: Artificial Sequence
<220> FEATURE:
<223> OTHER INFORMATION: Synthetic Construct

<400> SEQUENCE: 305
ttccatctac gcccttgaga gagtcgatgc atccaggtg tactggatgc aagagatagc       60
gtcggaatcc cgcgtatcat aatacat                                         87

<210> SEQ ID NO 306
<211> LENGTH: 87
<212> TYPE: DNA
<213> ORGANISM: Artificial Sequence
<220> FEATURE:
<223> OTHER INFORMATION: Synthetic Construct

<400> SEQUENCE: 306
ttccacctca gatcataggg acgaaagtgc agctagggtc agtactcaga tcgaggaatg      60
gctgatatcg tcagatcttt gtacagt                                         87

<210> SEQ ID NO 307
<211> LENGTH: 87
<212> TYPE: DNA
<213> ORGANISM: Artificial Sequence
<220> FEATURE:
<223> OTHER INFORMATION: Synthetic Construct

<400> SEQUENCE: 307
ttccatccgg tgcagtgtaa tttcgagtgc ggtggatctc ctctaggcat ggcgtagcta      60
cagttgaagg tgtcactcaa ttactta                                         87

<210> SEQ ID NO 308
<211> LENGTH: 87
<212> TYPE: DNA
<213> ORGANISM: Artificial Sequence
<220> FEATURE:
<223> OTHER INFORMATION: Synthetic Construct
```

<400> SEQUENCE: 308
ttctcgcagg gacgaagatg acgcttagat cgagtgagaa cagaggcgct cgacagatca    60
gtcttgtact tgtcgagatc tagaatc    87

<210> SEQ ID NO 309
<211> LENGTH: 87
<212> TYPE: DNA
<213> ORGANISM: Artificial Sequence
<220> FEATURE:
<223> OTHER INFORMATION: Synthetic Construct

<400> SEQUENCE: 309
ttctagtgct caaagcctcg aagtctcgga tcattggctc tcgcgagctg tcagatgcac    60
ttaagtgatc gccacttagc tcgtagc    87

<210> SEQ ID NO 310
<211> LENGTH: 87
<212> TYPE: DNA
<213> ORGANISM: Artificial Sequence
<220> FEATURE:
<223> OTHER INFORMATION: Synthetic Construct

<400> SEQUENCE: 310
ttctagtaga tccagaacaa gcctatctcg gatccacgaa ctactgagat ccagatcttg    60
agacgtggac gcatcttctc tgctctc    87

<210> SEQ ID NO 311
<211> LENGTH: 87
<212> TYPE: DNA
<213> ORGANISM: Artificial Sequence
<220> FEATURE:
<223> OTHER INFORMATION: Synthetic Construct

<400> SEQUENCE: 311
ttctagctca gaaagggtcg ttagaacact cgcctgaatc ctctagagtc ttaggctaca    60
tagaagccaa gaggcatcat caatctc    87

<210> SEQ ID NO 312
<211> LENGTH: 87
<212> TYPE: DNA
<213> ORGANISM: Artificial Sequence
<220> FEATURE:
<223> OTHER INFORMATION: Synthetic Construct

<400> SEQUENCE: 312
ttctagtgag agggaacaaa cgtcaaggta ttacgtaacc caaagtcgac tgctccaact    60
acattggctg gcctcatggt cgtatgc    87

<210> SEQ ID NO 313
<211> LENGTH: 87
<212> TYPE: DNA
<213> ORGANISM: Artificial Sequence
<220> FEATURE:
<223> OTHER INFORMATION: Synthetic Construct

<400> SEQUENCE: 313
ttctagcctg agttccgacc tttgacgtag gatctggaca tccctccttg acacagacgc    60
gatagataga gtctatctat caaccac    87

<210> SEQ ID NO 314

```
<211> LENGTH: 87
<212> TYPE: DNA
<213> ORGANISM: Artificial Sequence
<220> FEATURE:
<223> OTHER INFORMATION: Synthetic Construct

<400> SEQUENCE: 314
ttctagctaa tcgtggtccg acgccgccgt gtaggatgca acctctacgc tacaggtgct    60
ggattctgat atgacgatcc tacgggc                                        87

<210> SEQ ID NO 315
<211> LENGTH: 87
<212> TYPE: DNA
<213> ORGANISM: Artificial Sequence
<220> FEATURE:
<223> OTHER INFORMATION: Synthetic Construct

<400> SEQUENCE: 315
ttctcttctt tactccagta ttgatcgctc ctcagagatc gatcaacgat caagcatgga    60
ctcagagacc actctgcaac actcact                                        87

<210> SEQ ID NO 316
<211> LENGTH: 87
<212> TYPE: DNA
<213> ORGANISM: Artificial Sequence
<220> FEATURE:
<223> OTHER INFORMATION: Synthetic Construct

<400> SEQUENCE: 316
ttctcttcaa gattaggatg tatcttctga ctcggagagc gagtagcggg cctcatatag    60
tcaatgctcg cttactagaa gactgac                                        87

<210> SEQ ID NO 317
<211> LENGTH: 87
<212> TYPE: DNA
<213> ORGANISM: Artificial Sequence
<220> FEATURE:
<223> OTHER INFORMATION: Synthetic Construct

<400> SEQUENCE: 317
ttctagcgcc tcccagtagt cagttgaggc gtgagaggat tctagttagt actcccttga    60
actatcgcta ctcgtgatga cgtgact                                        87

<210> SEQ ID NO 318
<211> LENGTH: 87
<212> TYPE: DNA
<213> ORGANISM: Artificial Sequence
<220> FEATURE:
<223> OTHER INFORMATION: Synthetic Construct

<400> SEQUENCE: 318
ttctagcagg ctggtggaca caagtagcac tgattcaact tgggcttcgg agatggacag    60
ccaagtttca gctctcacct cccgaga                                        87

<210> SEQ ID NO 319
<211> LENGTH: 87
<212> TYPE: DNA
<213> ORGANISM: Artificial Sequence
<220> FEATURE:
<223> OTHER INFORMATION: Synthetic Construct

<400> SEQUENCE: 319
ttctcttgtc tcataaagct cggagattga tagacgtgtg tacgatgaat acagtagaag    60
```
ttgtcattca tcaattctta gtgtaga        87

<210> SEQ ID NO 320
<211> LENGTH: 87
<212> TYPE: DNA
<213> ORGANISM: Artificial Sequence
<220> FEATURE:
<223> OTHER INFORMATION: Synthetic Construct

<400> SEQUENCE: 320
ttctcttgat tgaagcgcgc tcgcacatct gagggctcgt attatccggc tgacgtcggc    60
tagggtcgca cggcaggtca ccgttgc        87

<210> SEQ ID NO 321
<211> LENGTH: 87
<212> TYPE: DNA
<213> ORGANISM: Artificial Sequence
<220> FEATURE:
<223> OTHER INFORMATION: Synthetic Construct

<400> SEQUENCE: 321
ttcttcctct gtatccagca caagctagga tcaaactcga atactttcct cgtccactga    60
ggccagtcat cttcttagtt atacaat        87

<210> SEQ ID NO 322
<211> LENGTH: 87
<212> TYPE: DNA
<213> ORGANISM: Artificial Sequence
<220> FEATURE:
<223> OTHER INFORMATION: Synthetic Construct

<400> SEQUENCE: 322
ttcttcctgt tcgcattgct cgtgtctcgc tcgctaaatt gtgctacggc tagagctgtg    60
tgtagcctct agtcgctact ccacact        87

<210> SEQ ID NO 323
<211> LENGTH: 87
<212> TYPE: DNA
<213> ORGANISM: Artificial Sequence
<220> FEATURE:
<223> OTHER INFORMATION: Synthetic Construct

<400> SEQUENCE: 323
ttcctctatc gacgtacttt ccaccctgag gtgactgaca atcagccgac attctcggga    60
aagtgtgcat ctcagcctgc ttagtta        87

<210> SEQ ID NO 324
<211> LENGTH: 87
<212> TYPE: DNA
<213> ORGANISM: Artificial Sequence
<220> FEATURE:
<223> OTHER INFORMATION: Synthetic Construct

<400> SEQUENCE: 324
ttctcaatcc tcctacagta gcgaagatta caccaccatt agtctcctct gtatttgaga    60
ctcttcttca gcttactctg cttatct        87

<210> SEQ ID NO 325
<211> LENGTH: 87
<212> TYPE: DNA
<213> ORGANISM: Artificial Sequence
<220> FEATURE:

<223> OTHER INFORMATION: Synthetic Construct

<400> SEQUENCE: 325
ttcttctagt aggtcaatgg accttcgtca agcctcgatt cgagtactgt cagtatcact    60
agccctgcag gagtcaatgt cgcggta    87

<210> SEQ ID NO 326
<211> LENGTH: 87
<212> TYPE: DNA
<213> ORGANISM: Artificial Sequence
<220> FEATURE:
<223> OTHER INFORMATION: Synthetic Construct

<400> SEQUENCE: 326
ttcccgggat tcacttcgcc aacagtatgt cattcgtacc atgcgttcgc atctggtaag    60
aacctaacta tgtaggtcga cgcatct    87

<210> SEQ ID NO 327
<211> LENGTH: 87
<212> TYPE: DNA
<213> ORGANISM: Artificial Sequence
<220> FEATURE:
<223> OTHER INFORMATION: Synthetic Construct

<400> SEQUENCE: 327
ttctctttca gtggaatcct ctagctacga ccaaatggac tctagaattc agcagatagt    60
ccaatccgtg atgagctacg ctgagag    87

<210> SEQ ID NO 328
<211> LENGTH: 87
<212> TYPE: DNA
<213> ORGANISM: Artificial Sequence
<220> FEATURE:
<223> OTHER INFORMATION: Synthetic Construct

<400> SEQUENCE: 328
ttctagagag gtgcttgagg tcatccacta ggcgacggtc agtgaactca gttcacatag    60
agaatcctag gaccgcgcca gaatcga    87

<210> SEQ ID NO 329
<211> LENGTH: 87
<212> TYPE: DNA
<213> ORGANISM: Artificial Sequence
<220> FEATURE:
<223> OTHER INFORMATION: Synthetic Construct

<400> SEQUENCE: 329
ttcttccgcg acggaaattc agatggtctg atcgtcatag tcggaggact cagttgacct    60
acggatttgt tacactagga gttgcca    87

<210> SEQ ID NO 330
<211> LENGTH: 87
<212> TYPE: DNA
<213> ORGANISM: Artificial Sequence
<220> FEATURE:
<223> OTHER INFORMATION: Synthetic Construct

<400> SEQUENCE: 330
ttcttcaacg acaatttcgt accgtgcact cgcatgactt tcgcgtgctc gttggtgctc    60
gaggtaccga tactctgaac actcgta    87

```
<210> SEQ ID NO 331
<211> LENGTH: 87
<212> TYPE: DNA
<213> ORGANISM: Artificial Sequence
<220> FEATURE:
<223> OTHER INFORMATION: Synthetic Construct

<400> SEQUENCE: 331
ttcttccact agtgccagtg tctggtacag tgatgacctt gagagcatta ttacaagctg     60
ctccctctgg tgaactgtgc tgatcct                                        87

<210> SEQ ID NO 332
<211> LENGTH: 87
<212> TYPE: DNA
<213> ORGANISM: Artificial Sequence
<220> FEATURE:
<223> OTHER INFORMATION: Synthetic Construct

<400> SEQUENCE: 332
ttcttccagt catagtgtat gcaggctggt gcgagcaagc atccatagca gagcttgaga     60
gctgagcctc tggtggtatg cggaagt                                        87

<210> SEQ ID NO 333
<211> LENGTH: 87
<212> TYPE: DNA
<213> ORGANISM: Artificial Sequence
<220> FEATURE:
<223> OTHER INFORMATION: Synthetic Construct

<400> SEQUENCE: 333
ttcttccctt cgtctgtctc ttcttagcga cgcctcggtc atgagatgaa cctagaggac     60
ttatctcagg tgtgcagcct gctatag                                        87

<210> SEQ ID NO 334
<211> LENGTH: 87
<212> TYPE: DNA
<213> ORGANISM: Artificial Sequence
<220> FEATURE:
<223> OTHER INFORMATION: Synthetic Construct

<400> SEQUENCE: 334
ttcttcccgg agcagactag tcgagtccct tagttcgcta agccggcaag tggaaagtag     60
tagagaggaa gaacgtcgca tctccga                                        87

<210> SEQ ID NO 335
<211> LENGTH: 87
<212> TYPE: DNA
<213> ORGANISM: Artificial Sequence
<220> FEATURE:
<223> OTHER INFORMATION: Synthetic Construct

<400> SEQUENCE: 335
ttcttgagat agcactgccc tcgctacatc acttatactc cgcgttagac gcagggtgcg     60
agttagcatt gaacgagagt atgttac                                        87

<210> SEQ ID NO 336
<211> LENGTH: 87
<212> TYPE: DNA
<213> ORGANISM: Artificial Sequence
<220> FEATURE:
<223> OTHER INFORMATION: Synthetic Construct

<400> SEQUENCE: 336
```

```
ttcttggtct aggagacacc ttctgtacta taggacctct tattgtctag cgtcggagca    60
aaggctactt gagctaatct cgctaca                                       87

<210> SEQ ID NO 337
<211> LENGTH: 87
<212> TYPE: DNA
<213> ORGANISM: Artificial Sequence
<220> FEATURE:
<223> OTHER INFORMATION: Synthetic Construct

<400> SEQUENCE: 337
ttcttggtat ctacggactt cacatgtggt ccgcagatct gttcttattt cttacacatc    60
ctcttcccgc ctcattctag caaccga                                       87

<210> SEQ ID NO 338
<211> LENGTH: 87
<212> TYPE: DNA
<213> ORGANISM: Artificial Sequence
<220> FEATURE:
<223> OTHER INFORMATION: Synthetic Construct

<400> SEQUENCE: 338
ttcttagctc agatgcgtat ggctgtcgac atatcagcta tggagaattg tcagttctct    60
gcaatacctc ctcgaactta gctctta                                       87

<210> SEQ ID NO 339
<211> LENGTH: 87
<212> TYPE: DNA
<213> ORGANISM: Artificial Sequence
<220> FEATURE:
<223> OTHER INFORMATION: Synthetic Construct

<400> SEQUENCE: 339
ttcttaacaa attgatctca ttatagacga aacgcaatcg caccaccgtc tcatagcagt    60
cctcctacgc gaaattgcct atctcgt                                       87

<210> SEQ ID NO 340
<211> LENGTH: 87
<212> TYPE: DNA
<213> ORGANISM: Artificial Sequence
<220> FEATURE:
<223> OTHER INFORMATION: Synthetic Construct

<400> SEQUENCE: 340
ttcttgaact gagagatcac ggagcctatg gagggagatg tcacacctgt gcatcacgag    60
aaggcgacga tactgtgaag catacct                                       87

<210> SEQ ID NO 341
<211> LENGTH: 87
<212> TYPE: DNA
<213> ORGANISM: Artificial Sequence
<220> FEATURE:
<223> OTHER INFORMATION: Synthetic Construct

<400> SEQUENCE: 341
ttcttcacta tattcacatt agctaagcgc ataatccgtg gaatcatctg tttaccgtct    60
ggcttcctac accgcgtggc ggagcga                                       87

<210> SEQ ID NO 342
<211> LENGTH: 87
<212> TYPE: DNA
<213> ORGANISM: Artificial Sequence
```

```
<220> FEATURE:
<223> OTHER INFORMATION: Synthetic Construct

<400> SEQUENCE: 342
ttcttcacac cggtaaatta cgtcatcaac cgaggatctc gcctcccatt attctgaaac      60
tgagagatgg gtttctcatg agcgtcg                                         87

<210> SEQ ID NO 343
<211> LENGTH: 87
<212> TYPE: DNA
<213> ORGANISM: Artificial Sequence
<220> FEATURE:
<223> OTHER INFORMATION: Synthetic Construct

<400> SEQUENCE: 343
ttcctgggta gcctgtgaaa gcaggtacat tgaaactctc tcactcctca tctgccacag      60
tgcatcaagc cgggaactcg acgcata                                         87

<210> SEQ ID NO 344
<211> LENGTH: 87
<212> TYPE: DNA
<213> ORGANISM: Artificial Sequence
<220> FEATURE:
<223> OTHER INFORMATION: Synthetic Construct

<400> SEQUENCE: 344
ttcctgggac agaacggtct actatagctc cgctgactac gtacatgtga ttgaacggta      60
cagtgactcc ctatgcgata taacgat                                         87

<210> SEQ ID NO 345
<211> LENGTH: 87
<212> TYPE: DNA
<213> ORGANISM: Artificial Sequence
<220> FEATURE:
<223> OTHER INFORMATION: Synthetic Construct

<400> SEQUENCE: 345
ttctcggtgg atttcccttc gggaggagga ggacagcagc taagaacacc agcgaaggtc      60
tatggatcta caatccaggt cttccct                                         87

<210> SEQ ID NO 346
<211> LENGTH: 87
<212> TYPE: DNA
<213> ORGANISM: Artificial Sequence
<220> FEATURE:
<223> OTHER INFORMATION: Synthetic Construct

<400> SEQUENCE: 346
ttctcggcta cgaatctatc tgatatccca cacccgtaca tgtctacggg atagtcagtg      60
tgtttcaaca cggcttaccc aacaaag                                         87

<210> SEQ ID NO 347
<211> LENGTH: 87
<212> TYPE: DNA
<213> ORGANISM: Artificial Sequence
<220> FEATURE:
<223> OTHER INFORMATION: Synthetic Construct

<400> SEQUENCE: 347
ttcctgagcg tcatgactgc taagcgagtg gtcccgcgac gaaatatcga gtctatctat      60
gagctgcgag tctcagtgtg accgcgt                                         87
```

<210> SEQ ID NO 348
<211> LENGTH: 87
<212> TYPE: DNA
<213> ORGANISM: Artificial Sequence
<220> FEATURE:
<223> OTHER INFORMATION: Synthetic Construct

<400> SEQUENCE: 348
ttcctaagat agtcgatcag atgatatcag atcacagctc actctttaag attggcgaca    60
cctttcatca tggagctgcg acgctca    87

<210> SEQ ID NO 349
<211> LENGTH: 87
<212> TYPE: DNA
<213> ORGANISM: Artificial Sequence
<220> FEATURE:
<223> OTHER INFORMATION: Synthetic Construct

<400> SEQUENCE: 349
ttcctagtct tctcgaagcc tccataggga aatggttagg cgggtgtcag attgcatgat    60
cagatctgca gaggaggatt atcaagt    87

<210> SEQ ID NO 350
<211> LENGTH: 87
<212> TYPE: DNA
<213> ORGANISM: Artificial Sequence
<220> FEATURE:
<223> OTHER INFORMATION: Synthetic Construct

<400> SEQUENCE: 350
ttcctagtga cggattcttc aagaaagcag tgaatacgac agagcgtcca gtgcatgcga    60
agtactccgg agtgttactg cgcggtc    87

<210> SEQ ID NO 351
<211> LENGTH: 87
<212> TYPE: DNA
<213> ORGANISM: Artificial Sequence
<220> FEATURE:
<223> OTHER INFORMATION: Synthetic Construct

<400> SEQUENCE: 351
ttcctggctg tacacagcct cgtgagcact acagtcgctc tccgatcgcc tgtaggatta    60
tatgtgtagg taagctgtta gatcgta    87

<210> SEQ ID NO 352
<211> LENGTH: 87
<212> TYPE: DNA
<213> ORGANISM: Artificial Sequence
<220> FEATURE:
<223> OTHER INFORMATION: Synthetic Construct

<400> SEQUENCE: 352
ttcctggcat taatatctga tctgcgtgag agtgcaacgc cgaagggaat catcgtctgc    60
gatactaagg acacggtcct cagcaat    87

<210> SEQ ID NO 353
<211> LENGTH: 87
<212> TYPE: DNA
<213> ORGANISM: Artificial Sequence
<220> FEATURE:
<223> OTHER INFORMATION: Synthetic Construct

<400> SEQUENCE: 353

```
ttcctagaca ctttctcgat ctattacaat gagtgcctct tcatcgcata gtatggaata    60
gcacgtaaca cactaagata tccttct                                        87

<210> SEQ ID NO 354
<211> LENGTH: 87
<212> TYPE: DNA
<213> ORGANISM: Artificial Sequence
<220> FEATURE:
<223> OTHER INFORMATION: Synthetic Construct

<400> SEQUENCE: 354
ttcctagagg agttcgagat acataatttc acggcgtcta taggctacga ccattgttca    60
cagcagatcg taggcgtggc aggccgc                                        87

<210> SEQ ID NO 355
<211> LENGTH: 87
<212> TYPE: DNA
<213> ORGANISM: Artificial Sequence
<220> FEATURE:
<223> OTHER INFORMATION: Synthetic Construct

<400> SEQUENCE: 355
ttcccttcta gccgtactcc gatccaggga ctcaaggtca accctggttc tctcgcgtga    60
gtgggacgat tcatgtgaca ctcaacg                                        87

<210> SEQ ID NO 356
<211> LENGTH: 87
<212> TYPE: DNA
<213> ORGANISM: Artificial Sequence
<220> FEATURE:
<223> OTHER INFORMATION: Synthetic Construct

<400> SEQUENCE: 356
ttcccttcag tctatactat gtcgtctcct gattcggagg agcatgcaga tcaggagctg    60
cctgcgtgac tcgtctgacg tgtgaga                                        87

<210> SEQ ID NO 357
<211> LENGTH: 87
<212> TYPE: DNA
<213> ORGANISM: Artificial Sequence
<220> FEATURE:
<223> OTHER INFORMATION: Synthetic Construct

<400> SEQUENCE: 357 ttcccttttct gttagcagtt catagactga tcttgcatcg gagataagca tggcaagatg   60
actggaacta tatctagcaa ggcgtag                                        87

<210> SEQ ID NO 358
<211> LENGTH: 87
<212> TYPE: DNA
<213> ORGANISM: Artificial Sequence
<220> FEATURE:
<223> OTHER INFORMATION: Synthetic Construct

<400> SEQUENCE: 358 ttcccttgc agcagactta gcgagtggta tgacagtctc atcagccatc gtctgtgtac     60
cagcgctctc acgtgatcat caagctg                                        87

<210> SEQ ID NO 359
<211> LENGTH: 87
<212> TYPE: DNA
```

<213> ORGANISM: Artificial Sequence
<220> FEATURE:
<223> OTHER INFORMATION: Synthetic Construct

<400> SEQUENCE: 359
ttcccttgca accactgatc tcatatccga gtcgtacact ctatgaatat actgatcgag    60
gtcgtgcagt gaacgctcga gccattg                                       87

<210> SEQ ID NO 360
<211> LENGTH: 87
<212> TYPE: DNA
<213> ORGANISM: Artificial Sequence
<220> FEATURE:
<223> OTHER INFORMATION: Synthetic Construct

<400> SEQUENCE: 360
ttcccttgat tgacggtcgg cctctagtat tcaccggcgt gcggtgagtt gctatagact    60
agaagagcgc gatcgcaggt ccctagc                                       87

<210> SEQ ID NO 361
<211> LENGTH: 87
<212> TYPE: DNA
<213> ORGANISM: Artificial Sequence
<220> FEATURE:
<223> OTHER INFORMATION: Synthetic Construct

<400> SEQUENCE: 361
ttcccttact cttatcgagg accgtgatag ggttcatcag atagctacgc agtccctgtc    60
gtcgatatcc tctcaaatcc accgtag                                       87

<210> SEQ ID NO 362
<211> LENGTH: 87
<212> TYPE: DNA
<213> ORGANISM: Artificial Sequence
<220> FEATURE:
<223> OTHER INFORMATION: Synthetic Construct

<400> SEQUENCE: 362
ttcccttagc agtgacgcga ggagaacgct aatcctacgc ctcgcctaca tatccgatag    60
atgagccgag gcggcctagt aggttct                                       87

<210> SEQ ID NO 363
<211> LENGTH: 87
<212> TYPE: DNA
<213> ORGANISM: Artificial Sequence
<220> FEATURE:
<223> OTHER INFORMATION: Synthetic Construct

<400> SEQUENCE: 363
ttcccgcagt gtttccatct caacgtggtc ccggtcaagt tctagcactc tcgccacacg    60
ggtctcggat tcctcctaat cacattc                                       87

<210> SEQ ID NO 364
<211> LENGTH: 87
<212> TYPE: DNA
<213> ORGANISM: Artificial Sequence
<220> FEATURE:
<223> OTHER INFORMATION: Synthetic Construct

<400> SEQUENCE: 364
ttctagtatt gaccagtcta ttagtgccca ttcatcccag agatctaggc tgtcgcgcta    60
gagctaacat tgactcgcgt acgctgt                                       87

<210> SEQ ID NO 365
<211> LENGTH: 87
<212> TYPE: DNA
<213> ORGANISM: Artificial Sequence
<220> FEATURE:
<223> OTHER INFORMATION: Synthetic Construct

<400> SEQUENCE: 365
ttccctctct tcgatctggt acgatagcga tcaatatgtc gatagatagt agatagaatc      60
tgcgcttcga agtcactcga tgagact                                         87

<210> SEQ ID NO 366
<211> LENGTH: 87
<212> TYPE: DNA
<213> ORGANISM: Artificial Sequence
<220> FEATURE:
<223> OTHER INFORMATION: Synthetic Construct

<400> SEQUENCE: 366
ttccctctaa gcgtactctc ttgaccgaag gtacagtctc cagtgagaac tggcccaggt      60
tagctcctgt cagctctacc ttcatta                                         87

<210> SEQ ID NO 367
<211> LENGTH: 87
<212> TYPE: DNA
<213> ORGANISM: Artificial Sequence
<220> FEATURE:
<223> OTHER INFORMATION: Synthetic Construct

<400> SEQUENCE: 367
ttcccactaa gaccggcgac ttacctaagt tatccttatc tgtctgctct ctacgtcttc      60
tctacaggag gtcctaataa tgagaga                                         87

<210> SEQ ID NO 368
<211> LENGTH: 87
<212> TYPE: DNA
<213> ORGANISM: Artificial Sequence
<220> FEATURE:
<223> OTHER INFORMATION: Synthetic Construct

<400> SEQUENCE: 368
ttcttgggca gacatggaag cgcttcgtag ctgaacagac cttgtttgat agtgggacct      60
gcttagagat ctatccatta ttgacct                                         87

<210> SEQ ID NO 369
<211> LENGTH: 87
<212> TYPE: DNA
<213> ORGANISM: Artificial Sequence
<220> FEATURE:
<223> OTHER INFORMATION: Synthetic Construct

<400> SEQUENCE: 369
ttcccaccgc tccattcgct accgagaaat atgcctcgct cttacgtcag aatcggagcg      60
atagctggac gaggttgctg aggactc                                         87

<210> SEQ ID NO 370
<211> LENGTH: 87
<212> TYPE: DNA
<213> ORGANISM: Artificial Sequence
<220> FEATURE:
<223> OTHER INFORMATION: Synthetic Construct

<400> SEQUENCE: 370
ttctacgaga ctagagagcc agaccctcca agctagggac ctggcagagt ggctctagct    60
gatggatgtt tgaattgagc gagctta                                        87

<210> SEQ ID NO 371
<211> LENGTH: 87
<212> TYPE: DNA
<213> ORGANISM: Artificial Sequence
<220> FEATURE:
<223> OTHER INFORMATION: Synthetic Construct

<400> SEQUENCE: 371
ttcttctgaa gtacttacgc tgctctcttg agcgacttca gactcctccg tcagtataga    60
acaactacaa atagcacgtc tgtcttc                                        87

<210> SEQ ID NO 372
<211> LENGTH: 87
<212> TYPE: DNA
<213> ORGANISM: Artificial Sequence
<220> FEATURE:
<223> OTHER INFORMATION: Synthetic Construct

<400> SEQUENCE: 372
ttctcttact gacaggcaac gatccatgcg ctctgctgta ctgagggcga gggtgtccga    60
cgtttccagg cgttcagata ggtcgag                                        87

<210> SEQ ID NO 373
<211> LENGTH: 87
<212> TYPE: DNA
<213> ORGANISM: Artificial Sequence
<220> FEATURE:
<223> OTHER INFORMATION: Synthetic Construct

<400> SEQUENCE: 373
ttctagatgg tcagtttcaa ggatacgata ttaataggca gctgagtaag ccagcctgac    60
cagacgatcc ctcgatgata ttcatga                                        87

<210> SEQ ID NO 374
<211> LENGTH: 87
<212> TYPE: DNA
<213> ORGANISM: Artificial Sequence
<220> FEATURE:
<223> OTHER INFORMATION: Synthetic Construct

<400> SEQUENCE: 374
ttctcttaga agaagcactt ctgatcgcgc gtcagaagac caggttgtga ggcaatgcct    60
ttgatcagag agcgcaacaa gatgcag                                        87

<210> SEQ ID NO 375
<211> LENGTH: 87
<212> TYPE: DNA
<213> ORGANISM: Artificial Sequence
<220> FEATURE:
<223> OTHER INFORMATION: Synthetic Construct

<400> SEQUENCE: 375
ttccctggat agaagcgatt gctggtgact tgtcgatgat gattctagtc gggaatctga    60
caggtaacaa gtccaatgtg tggtgga                                        87

<210> SEQ ID NO 376
<211> LENGTH: 87

```
<212> TYPE: DNA
<213> ORGANISM: Artificial Sequence
<220> FEATURE:
<223> OTHER INFORMATION: Synthetic Construct

<400> SEQUENCE: 376
ttctaccgac agactaagct gtagagcgga ttcaaggcac tcggtgactc tggattaagc    60
cgaggccgta agtgtcagca gggactg                                       87

<210> SEQ ID NO 377
<211> LENGTH: 87
<212> TYPE: DNA
<213> ORGANISM: Artificial Sequence
<220> FEATURE:
<223> OTHER INFORMATION: Synthetic Construct

<400> SEQUENCE: 377
ttctagcata tagctaaggg agaggtcgga ggatagaacg ctccgaatct ccgagcacct    60
aagtcggcta agctggctcc ggtaggt                                       87

<210> SEQ ID NO 378
<211> LENGTH: 87
<212> TYPE: DNA
<213> ORGANISM: Artificial Sequence
<220> FEATURE:
<223> OTHER INFORMATION: Synthetic Construct

<400> SEQUENCE: 378
ttctctcagt gctagaagga gtcgacaaag actcattctt gctgaagttt agctgagcag    60
ctgtgtcgag gtggaggact gaagagt                                       87

<210> SEQ ID NO 379
<211> LENGTH: 87
<212> TYPE: DNA
<213> ORGANISM: Artificial Sequence
<220> FEATURE:
<223> OTHER INFORMATION: Synthetic Construct

<400> SEQUENCE: 379
ttctagccac cgactcgccc gatggtatat caggagtcag atacagtgta tgaccgacag    60
ggcctctaca agttgaactt gcagaac                                       87

<210> SEQ ID NO 380
<211> LENGTH: 87
<212> TYPE: DNA
<213> ORGANISM: Artificial Sequence
<220> FEATURE:
<223> OTHER INFORMATION: Synthetic Construct

<400> SEQUENCE: 380
ttcttggacg cttctagtac tagttgtgct atccctagtt atagccacca gcgagagtag    60
acaggattgt taataaagaa ggagcac                                       87

<210> SEQ ID NO 381
<211> LENGTH: 87
<212> TYPE: DNA
<213> ORGANISM: Artificial Sequence
<220> FEATURE:
<223> OTHER INFORMATION: Synthetic Construct

<400> SEQUENCE: 381
ttcttcttct tacctaacaa caagaataat aataataatc ctaataacaa caataacaat    60
```
aataacaaca acaatgatta gccttga								87

<210> SEQ ID NO 382
<211> LENGTH: 87
<212> TYPE: DNA
<213> ORGANISM: Artificial Sequence
<220> FEATURE:
<223> OTHER INFORMATION: Synthetic Construct

<400> SEQUENCE: 382
ttcttgggag gagtgtcgag agagttgcga ggcagagctt gatctcatta gatccatgag				60 acgttgggac tcaagtatct ggagtcg								87

<210> SEQ ID NO 383
<211> LENGTH: 87
<212> TYPE: DNA
<213> ORGANISM: Artificial Sequence
<220> FEATURE:
<223> OTHER INFORMATION: Synthetic Construct

<400> SEQUENCE: 383
ttcctcagta gatacataga gagcgagtat caggctgacg gaagatgaag actatcgact				60 gaggacgagc tgggaatagc ttcagtc								87

<210> SEQ ID NO 384
<211> LENGTH: 87
<212> TYPE: DNA
<213> ORGANISM: Artificial Sequence
<220> FEATURE:
<223> OTHER INFORMATION: Synthetic Construct

<400> SEQUENCE: 384
ttcttcttaa agatactaac aactgcttgc gagctggatg tcctctcgaa gaattgcttc				60 aagatcttgg tgctcgagcc aagccca								87

<210> SEQ ID NO 385
<211> LENGTH: 87
<212> TYPE: DNA
<213> ORGANISM: Artificial Sequence
<220> FEATURE:
<223> OTHER INFORMATION: Synthetic Construct

<400> SEQUENCE: 385
ttctagttca ctactgtcat acagggctag ctaataactt ctcctgagta tgctcctcct				60 ggtgcttaga gtgacgagac actacgt								87

<210> SEQ ID NO 386
<211> LENGTH: 87
<212> TYPE: DNA
<213> ORGANISM: Artificial Sequence
<220> FEATURE:
<223> OTHER INFORMATION: Synthetic Construct

<400> SEQUENCE: 386
ttctatggac cggctttgct ctgttgatcg tcgatagact tccagctaca ccacgacccg				60 ggccgaatgg tattggctga tctgaag								87

<210> SEQ ID NO 387
<211> LENGTH: 87
<212> TYPE: DNA
<213> ORGANISM: Artificial Sequence
<220> FEATURE:
<223> OTHER INFORMATION: Synthetic Construct

```
<400> SEQUENCE: 387
ttctagtctt ctatcgagtc tggtcatagt catatcgcac gaagacatgg tctaagtcag    60
cgccgaatct gtgacgtctt cttgaca                                        87

<210> SEQ ID NO 388
<211> LENGTH: 87
<212> TYPE: DNA
<213> ORGANISM: Artificial Sequence
<220> FEATURE:
<223> OTHER INFORMATION: Synthetic Construct

<400> SEQUENCE: 388
ttctagttaa gagagtctat catcgtcagt gtcgcgaagg atcgtcgaca ccctatcaat    60
ctcgtctatt ctttccagcg cgtgtct                                        87

<210> SEQ ID NO 389
<211> LENGTH: 87
<212> TYPE: DNA
<213> ORGANISM: Artificial Sequence
<220> FEATURE:
<223> OTHER INFORMATION: Synthetic Construct

<400> SEQUENCE: 389
ttctatgacc tccagtcata gcagaagtgt atcgaccatc tgcctccgac aatcctcagt    60
agacctccac caccaatccg tgtcaga                                        87

<210> SEQ ID NO 390
<211> LENGTH: 87
<212> TYPE: DNA
<213> ORGANISM: Artificial Sequence
<220> FEATURE:
<223> OTHER INFORMATION: Synthetic Construct

<400> SEQUENCE: 390
ttctacgcat tactggtgca cgcattccga ttctacgtag tagtcagcta gtctccttgc    60
cgagagaacg tccagacgtc agcactc                                        87

<210> SEQ ID NO 391
<211> LENGTH: 87
<212> TYPE: DNA
<213> ORGANISM: Artificial Sequence
<220> FEATURE:
<223> OTHER INFORMATION: Synthetic Construct

<400> SEQUENCE: 391
ttctcgtgcg gcggatctcc atagccgggt tcatgggtg taagaggagt cggtcaggag     60
atcttattcc tcatcgcggg aagtctc                                        87

<210> SEQ ID NO 392
<211> LENGTH: 87
<212> TYPE: DNA
<213> ORGANISM: Artificial Sequence
<220> FEATURE:
<223> OTHER INFORMATION: Synthetic Construct

<400> SEQUENCE: 392
ttctcatagg agatacgacc tttcaaccga gtgctcgcga cgcacggcat ccatccggtc    60
aatacggctg gtatgcagcc tccactc                                        87

<210> SEQ ID NO 393
```

```
<211> LENGTH: 87
<212> TYPE: DNA
<213> ORGANISM: Artificial Sequence
<220> FEATURE:
<223> OTHER INFORMATION: Synthetic Construct

<400> SEQUENCE: 393
ttctcgtacg gacgagctac tctggctcta ggagtcgatc gaaagtatac gaagaaggga      60
tgtactcagc agctcactga gcgagga                                          87

<210> SEQ ID NO 394
<211> LENGTH: 87
<212> TYPE: DNA
<213> ORGANISM: Artificial Sequence
<220> FEATURE:
<223> OTHER INFORMATION: Synthetic Construct

<400> SEQUENCE: 394
ttctcatcgc tgtgaaactg atctctcaag tcatgagtgt acttgctcca gactggatga      60
acaggtcagc cttagtgcta tatgtgc                                          87

<210> SEQ ID NO 395
<211> LENGTH: 87
<212> TYPE: DNA
<213> ORGANISM: Artificial Sequence
<220> FEATURE:
<223> OTHER INFORMATION: Synthetic Construct

<400> SEQUENCE: 395
ttctcatcta tcctgggccc agacttcctg gtccgtaagc taaattctct cttctactga      60
gcattctatc cagagttgag atctaag                                          87

<210> SEQ ID NO 396
<211> LENGTH: 87
<212> TYPE: DNA
<213> ORGANISM: Artificial Sequence
<220> FEATURE:
<223> OTHER INFORMATION: Synthetic Construct

<400> SEQUENCE: 396
ttctcgttgc acgtgtctat atatttcggc tcatgaactc tctatgtcct cctcgcggtc      60
gtgcagctgc ataagtcata ggagtac                                          87

<210> SEQ ID NO 397
<211> LENGTH: 87
<212> TYPE: DNA
<213> ORGANISM: Artificial Sequence
<220> FEATURE:
<223> OTHER INFORMATION: Synthetic Construct

<400> SEQUENCE: 397
ttctcgttcc cttactctaa gtcaagtaac tgattcggac caagcttcaa gcctggcccg      60
tcaacagagc cgggtaagaa tgctgag                                          87

<210> SEQ ID NO 398
<211> LENGTH: 87
<212> TYPE: DNA
<213> ORGANISM: Artificial Sequence
<220> FEATURE:
<223> OTHER INFORMATION: Synthetic Construct

<400> SEQUENCE: 398
ttctctggag agacttagaa gagtagtacg actatgacac ctctgctatt actcgtgacg      60
```
ccgcatgacg tctctggaag accgcga                                                87

<210> SEQ ID NO 399
<211> LENGTH: 87
<212> TYPE: DNA
<213> ORGANISM: Artificial Sequence
<220> FEATURE:
<223> OTHER INFORMATION: Synthetic Construct

<400> SEQUENCE: 399
ttctctggtg tcggactgcc gaagatacca ggacagcata acttactggc gtaggacaga        60
gtccagacta tcaatatccg actgcgt                                             87

<210> SEQ ID NO 400
<211> LENGTH: 87
<212> TYPE: DNA
<213> ORGANISM: Artificial Sequence
<220> FEATURE:
<223> OTHER INFORMATION: Synthetic Construct

<400> SEQUENCE: 400
ttctctgaga tcaagctcgg agtcagcatg gctgtgggcc cactggcttg ttagagtgac        60
cgacagagag atccacatag ccctgac                                             87

<210> SEQ ID NO 401
<211> LENGTH: 87
<212> TYPE: DNA
<213> ORGANISM: Artificial Sequence
<220> FEATURE:
<223> OTHER INFORMATION: Synthetic Construct

<400> SEQUENCE: 401
ttcttctctt tacagtcgag aacttcatca cagcctcgtt agtctagttc tagcgaggta        60
tctcatagcg agctacctac tggcata                                             87

<210> SEQ ID NO 402
<211> LENGTH: 87
<212> TYPE: DNA
<213> ORGANISM: Artificial Sequence
<220> FEATURE:
<223> OTHER INFORMATION: Synthetic Construct

<400> SEQUENCE: 402
ttcctctaga tcggtcgcct cagaatccga tattatggct atcgtcatag aaaggtcgta        60
ttcactttcc ctcctatgag aggttac                                             87

<210> SEQ ID NO 403
<211> LENGTH: 87
<212> TYPE: DNA
<213> ORGANISM: Artificial Sequence
<220> FEATURE:
<223> OTHER INFORMATION: Synthetic Construct

<400> SEQUENCE: 403
ttctaggtcg tgatcgcgtc tgattcacag ttcttgggag ctctattggg acgtaaggag        60
ctcggaaaca agcatagttg tggcatc                                             87

<210> SEQ ID NO 404
<211> LENGTH: 20
<212> TYPE: DNA
<213> ORGANISM: Artificial Sequence
<220> FEATURE:

<223> OTHER INFORMATION: Synthetic Construct

<400> SEQUENCE: 404
aatcttgtgg gtagtaggcg                                           20

<210> SEQ ID NO 405
<211> LENGTH: 20
<212> TYPE: DNA
<213> ORGANISM: Artificial Sequence
<220> FEATURE:
<223> OTHER INFORMATION: Synthetic Construct

<400> SEQUENCE: 405
cctaagatgg gcggaaaact                                           20

<210> SEQ ID NO 406
<211> LENGTH: 20
<212> TYPE: DNA
<213> ORGANISM: Artificial Sequence
<220> FEATURE:
<223> OTHER INFORMATION: Synthetic Construct

<400> SEQUENCE: 406
aatgaatgcc cttccttcct                                           20

<210> SEQ ID NO 407
<211> LENGTH: 20
<212> TYPE: DNA
<213> ORGANISM: Artificial Sequence
<220> FEATURE:
<223> OTHER INFORMATION: Synthetic Construct

<400> SEQUENCE: 407
tcaacgtagg gcgaagaaat                                           20

<210> SEQ ID NO 408
<211> LENGTH: 20
<212> TYPE: DNA
<213> ORGANISM: Artificial Sequence
<220> FEATURE:
<223> OTHER INFORMATION: Synthetic Construct

<400> SEQUENCE: 408
acacaatacc attggcagga                                           20

<210> SEQ ID NO 409
<211> LENGTH: 20
<212> TYPE: DNA
<213> ORGANISM: Artificial Sequence
<220> FEATURE:
<223> OTHER INFORMATION: Synthetic Construct

<400> SEQUENCE: 409
cttgcgtgcc atatctgatg                                           20

<210> SEQ ID NO 410
<211> LENGTH: 20
<212> TYPE: DNA
<213> ORGANISM: Artificial Sequence
<220> FEATURE:
<223> OTHER INFORMATION: Synthetic Construct

<400> SEQUENCE: 410
acagccaaag aataccgtcc                                           20

-continued

```
<210> SEQ ID NO 411
<211> LENGTH: 20
<212> TYPE: DNA
<213> ORGANISM: Artificial Sequence
<220> FEATURE:
<223> OTHER INFORMATION: Synthetic Construct

<400> SEQUENCE: 411
taagtgctca aaacgaacgg                                           20

<210> SEQ ID NO 412
<211> LENGTH: 20
<212> TYPE: DNA
<213> ORGANISM: Artificial Sequence
<220> FEATURE:
<223> OTHER INFORMATION: Synthetic Construct

<400> SEQUENCE: 412
acgatgggga catagaacac                                           20

<210> SEQ ID NO 413
<211> LENGTH: 20
<212> TYPE: DNA
<213> ORGANISM: Artificial Sequence
<220> FEATURE:
<223> OTHER INFORMATION: Synthetic Construct

<400> SEQUENCE: 413
ttgcccttcg ctcaatctag                                           20

<210> SEQ ID NO 414
<211> LENGTH: 20
<212> TYPE: DNA
<213> ORGANISM: Artificial Sequence
<220> FEATURE:
<223> OTHER INFORMATION: Synthetic Construct

<400> SEQUENCE: 414
acgcccacta tatttcacca                                           20

<210> SEQ ID NO 415
<211> LENGTH: 20
<212> TYPE: DNA
<213> ORGANISM: Artificial Sequence
<220> FEATURE:
<223> OTHER INFORMATION: Synthetic Construct

<400> SEQUENCE: 415
tggggacttt taccatccag                                           20
```

DNA-BASED DATA STORAGE AND RETRIEVAL

CROSS REFERENCE TO RELATED APPLICATIONS

This application is a national phase application under 35 U.S.C. § 371 of International Application No. PCT/CN2018/097083, having an international filing date of Jul. 25, 2018 and claims the benefit of Chinese Patent Application No. 201710611123.2, filed on Jul. 25, 2017, the entire contents of which are incorporated herein by reference for all purposes.

SUBMISSION ON SEQUENCE LISTING ON ASCII TEXT FILE

The content of the following submission on ASCII text file is incorporated herein by reference in its entirety; a computer readable form (CRF) of the Sequence Listing (file name: 759892000300SEQLIST.TXT, date recorded: Jan. 15, 2020, size: 102 KB).

FIELD OF INVENTION

The present disclosure relates generally to data storage and retrieval, and more specifically, to techniques for achieving reliable and efficient DNA-based data storage and retrieval.

BACKGROUND

The concept of leveraging DNA as a vehicle for data storage and retrieval can be traced back to 1988, when Joe Davis and his collaborator created a synthetic DNA named "Mocrovenus" for encoding an icon and incorporated it into *E. coli* cells. Compared to traditional storage media such as magnetic tape and hard disk, DNA-based storage has the advantages of higher density (e.g., ~1 $mm^3$ for storing 1 EB data), longer term storage (e.g., over 1 million years in $-18°$ C.), and lower maintaining cost. DNA storage is a cutting-edge researching field which is based on both oligonucleotide synthesis (especially high throughput synthesis platform like CustomArray) for the generation of DNA storage media and sequencing (especially next-generation sequencing (NGS] like Illumina HiSeq 2500 and MiSeq) for information retrieval.

However, presently, DNA-based data storage has a number of limitations. For example, the production cost of DNA synthesis is fairly high, while the speed of data retrieval can be low due to sequencing. As such, DNA-based storage has been considered to be more suitable for large-scale archival storage, which involves fewer numbers of reads and writes of the storage medium. Furthermore, many errors may be introduced in various stages of the process (e.g., encoding, writing, storing, decoding, reading, retrieval), thus compromising the input and output of the data stream. Exemplary errors include mutations, deletions, insertions, missing of DNA fragments induced during synthesis and sequencing, and degeneration after long-term storage. Moreover, when a large amount of data is stored using DNA, it can be challenging to achieve random access to a portion of the data without retrieving the data in its entirety.

BRIEF SUMMARY

The present invention relates to techniques for achieving reliable and efficient DNA-based data storage and retrieval. Specifically, the present invention provides accurate, efficient, and reliable methods of storing input data on a nucleic acid, such as a deoxyribonucleic acid ("DNA"). In particular, the present invention utilizes a novel 5-bit transcoding framework to convert one or more data files into nucleic acid sequences (for example DNA sequences). The present invention also provides an integrated process that includes compression algorithm(s), error correction algorithm(s), and transcoding framework(s) for efficient and reliable data storage and retrieval. Further, the present invention allows for random data access, which is particularly beneficial when data on a large scale is stored together, but only partial information need to be browsed at a given time. Data that can be stored in accordance with the methods disclosed herein includes any type of data that could be expressed in a digital manner (i.e., in binary data) including, for example, text files, high definition videos, images, and/or audios.

In some embodiments, there is provided a method for storing input data on nucleic acid comprises: a) converting the input data into a set of nucleotide sequences, wherein the converting comprises i) a data processing step comprising converting the input data into a binary string; and ii) a nucleotide encoding step comprising converting the binary string using a 5-bit transcoding framework to obtain the set of nucleotide sequences; and b) synthesizing a set of nucleic acids comprising the set of nucleotide sequences.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences.

In some embodiments, the data processing step comprises dividing the binary string into a sequence of non-overlapping 5-bit binary strings.

In some embodiments, the nucleotide encoding step comprises converting each 5-bit binary string into an integer ranging from 0 to 31 to obtain a string of integers.

In some embodiments, the nucleotide encoding step further comprises converting the string of integers using the 5-bit transcoding framework to obtain the set of nucleotide sequences.

In some embodiments, the nucleotide encoding step further comprises dividing the string of integers into a plurality of initial sub-sequence of integers having a predetermined length.

In some embodiments, the length of each of the plurality of initial sub-sequence of integers is determined based on an oligo length of a selected synthesis platform, a desired error tolerance, a size of the input data, a selected error correction code, or a combination thereof.

In some embodiments, the nucleotide encoding step further comprises adding index information to each of the plurality of the initial sub-sequences of integers to obtain a plurality of integer sub-sequences having index.

In some embodiments, the index information added to each of the plurality of the initial sub-sequences of integers comprises a sequence of integers, wherein the length of the sequence of integers is based on the size of the input data.

In some embodiments, the nucleotide encoding step comprises, after adding the index information, adding redundancy data to the plurality of integer sub-sequences having index, thereby obtaining a plurality of integer sub-sequences having redundancy.

In some embodiments, adding redundancy data to the plurality of integer sub-sequences having index comprises:

creating an empty matrix, wherein the number of columns in the empty matrix is larger than the size of the plurality of integer sub-sequences having index, and wherein the number of rows of the empty matrix is larger than the number of integers in each of the plurality integer sub-sequences having index; filling the empty matrix with the plurality of integer sub-sequences having index and data generated by applying an error correction coding; and obtaining the plurality of sub-sequences having redundancy based on the filled matrix.

In some embodiments, the number of columns of the empty matrix is determined based on an oligo length of a selected synthesis platform, the type of the error correction code, a predetermined error tolerance value, a size of the plurality of integer sub-sequences having index, or a combination thereof.

In some embodiments, the number of rows of the empty matrix is determined based on an oligo length of a selected synthesis platform, a type of the error correction code, a predetermined error tolerance value, a size of the plurality of integer sub-sequences having index, or a combination thereof.

In some embodiments, the error correction coding is Reed-Solomon ("RS") coding.

In some embodiments, the data generated by applying an error correction coding is generated by applying string correction of the RS coding and/or block correction of the RS coding.

In some embodiments, the 5-bit transcoding framework is according to Table 2.

In some embodiments, R and Y are chosen based on: 1) being different from the nucleotide immediately in front of R or Y; and/or 2) the estimated GC content of the nucleotide sequence.

In some embodiments, the input data corresponds to a compressed file. In some embodiments, the input data corresponds to two or more files.

In some embodiments, the input data corresponds to a text file.

In some embodiments, the data processing step further comprises compressing the input data to obtain a compressed file and converting the compressed file into a binary string.

In some embodiments, the compressed file is compressed using the Lempel-Zic-Markov chain algorithm ("LZMA").

In some embodiments, the data processing step further comprises: grouping the two or more files into a TAR file.

In some embodiments, the TAR file is further compressed using the Lempel-Zic-Markov chain algorithm ("LZMA").

In some embodiments, the nucleotide encoding step further comprises appending a pair of primer sequences to the 5' and 3' ends of each nucleotide sequence of the set of nucleotide sequences.

In some embodiments, a pair of primers is attached to the set of synthesized nucleic acids.

In some embodiments, there is provide a method for storing two or more sets of input data on nucleic acid comprises: a) separately converting the two or more sets of input data into two or more sets of corresponding nucleotide sequences according to any of the methods described herein; b) separately appending a pair of primer sequences to the 5' and 3' end of each set of the two or more sets of nucleotide sequences, wherein the pairs of primers for the two or more sets of corresponding nucleotide sequences are different from each other; and c) synthesizing two or more sets of nucleic acids comprising the two or more sets of corresponding nucleotide sequences, respectively.

In some embodiments, each pair of primers has a sequence that is different from any one of the two or more sets of corresponding nucleotide sequences or complementary sequences thereof.

In some embodiments, the set of synthesized nucleic acids has GC content ranging from 30% to 70%. In some embodiments, the set of synthesized nucleic acids has GC content of less than about 70%.

In some embodiments, the set of synthesized nucleic acids is stored. In some embodiments, the set of synthesized nucleic acids is stored by drying. In some embodiments, the set of synthesized nucleic acids is stored by lyophilization.

In some embodiments, the set of synthesized nucleic acids is immobilized on a carrier. In some embodiments, the carrier is a microarray.

In some embodiments, there is provided a method for retrieving output data stored on nucleic acid comprises: a) obtaining a set of nucleotide sequences of a set of nucleic acids, b) converting the set of nucleotide sequences into the output data, wherein the converting comprises: i) a nucleotide decoding step comprising converting the set of nucleotide sequences into a binary string using a 5-bit transcoding framework; and ii) a data processing step comprising converting binary string into the output data, thereby obtaining the output data.

In some embodiments, the set of nucleic acids is amplified prior to retrieving the output data.

In some embodiments, the set of nucleic acids is sequenced to generate a plurality of sequence reads.

In some embodiments, the plurality of sequence reads are paired, merged, and filtered to obtain the set of nucleotide sequences.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data.

In some embodiments, the nucleotide decoding step comprises converting the set of nucleotide sequences into a plurality of integer sub-sequences comprising integers ranging from 0-31.

In some embodiments, the nucleotide decoding step further comprises applying error correction coding to the plurality of integer sub-sequences, thereby obtaining the plurality of integer sub-sequences having index.

In some embodiments, the step of applying error correction coding comprises: i) applying RS coding string correction to the plurality of integer sub-sequences to obtain a plurality of consensus integer sub-sequences; and ii) applying RS coding block correction to the plurality of consensus integer sub-sequences to obtain the plurality of integer sub-sequences having index.

In some embodiments, the nucleotide decoding step further comprises removing the index from the plurality of integer sub-sequences having index to obtain a plurality of core sub-sequences of integers.

In some embodiments, the nucleotide decoding step further comprises merging the core sub-sequences of integers into a string of integers.

In some embodiments, the nucleotide decoding step further comprises converting the string of integers into a binary string.

In some embodiments, the output data is stored in a compressed file. In some embodiments, the data processing step further comprises decompressing the compressed file.

In some embodiments, the decompressing is carried out through the LZMA algorithm.

In some embodiments, the output data corresponds to a plurality of files. In some embodiments, the plurality of files is extracted from the output data through the TAR algorithm.

In some embodiments, the 5-bit transcoding framework is according to Table 2.

In some embodiments, the set of nucleic acids comprises primer sequences at the 3' and 5' ends and the method comprises removing the primer sequences before the nucleotide decoding step.

In some embodiments, there is provided a method for retrieving output data stored on a set of nucleic acids of interest, wherein the set of nucleic acids of interest is one of a plurality of sets of nucleotide sequences present in a mixture, each set encoding a different set of output data and having a different set of primer pairs at the 3' and 5' end, comprises: a) amplifying the set of nucleic acids using the primer pair corresponding to nucleic acids of interest; b) obtaining a set of nucleotide sequences of the amplified nucleic acids, c) converting the set of nucleotide sequences into the output data according to any of the methods described herein; thereby obtaining the output data.

In some embodiments, there is provided a method for retrieving two or more sets of output data stored on corresponding two or more sets of nucleic acids of interest, wherein the two or more sets of nucleic acids of interest are among a plurality of nucleotide sequences present in a mixture, each set encoding a different set of output data and having a different set of primer pairs at the 3' and 5' end, comprises: a) amplifying (e.g., separately amplifying or amplifying together) the two or more sets of nucleic acids of interest using primer pairs corresponding to the two or more sets of nucleic acids of interest; b) obtaining two or more sets of nucleotide sequences of the amplified nucleic acids, c) separately converting the two or more sets of nucleotide sequences into the two or more sets of output data according to any of the methods described herein; thereby obtaining the two or more sets of output data.

In some embodiments, there is provided a non-transitory computer-readable storage medium stores one or more programs, the one or more programs comprising instructions, which when executed by one or more processors of an electronic device, cause the electronic device to carry out any of the methods described herein.

Also provided are systems for providing nucleic acid-based data storage or data retrieval from a nucleic acid, comprising: one or more processors; a memory; and one or more programs, wherein the one or more programs are stored in the memory and configured to be executed by the one or more processors, the one or more programs including instructions for carrying out any of the methods described herein.

Also provided are electronic devices for providing nucleic acid-based data storage or data retrieval from a nucleic acid comprising means for carrying out any of the methods described herein.

DESCRIPTION OF THE FIGURES

FIG. 6 illustrates an exemplary text portion to be stored and retrieved, according to some embodiments.

FIG. 9A illustrates an exemplary process for providing DNA-based data storage, according to some embodiments.

FIG. 9B illustrates an exemplary process for providing DNA-based data retrieval, according to some embodiments.

DETAILED DESCRIPTION

Figure 1:
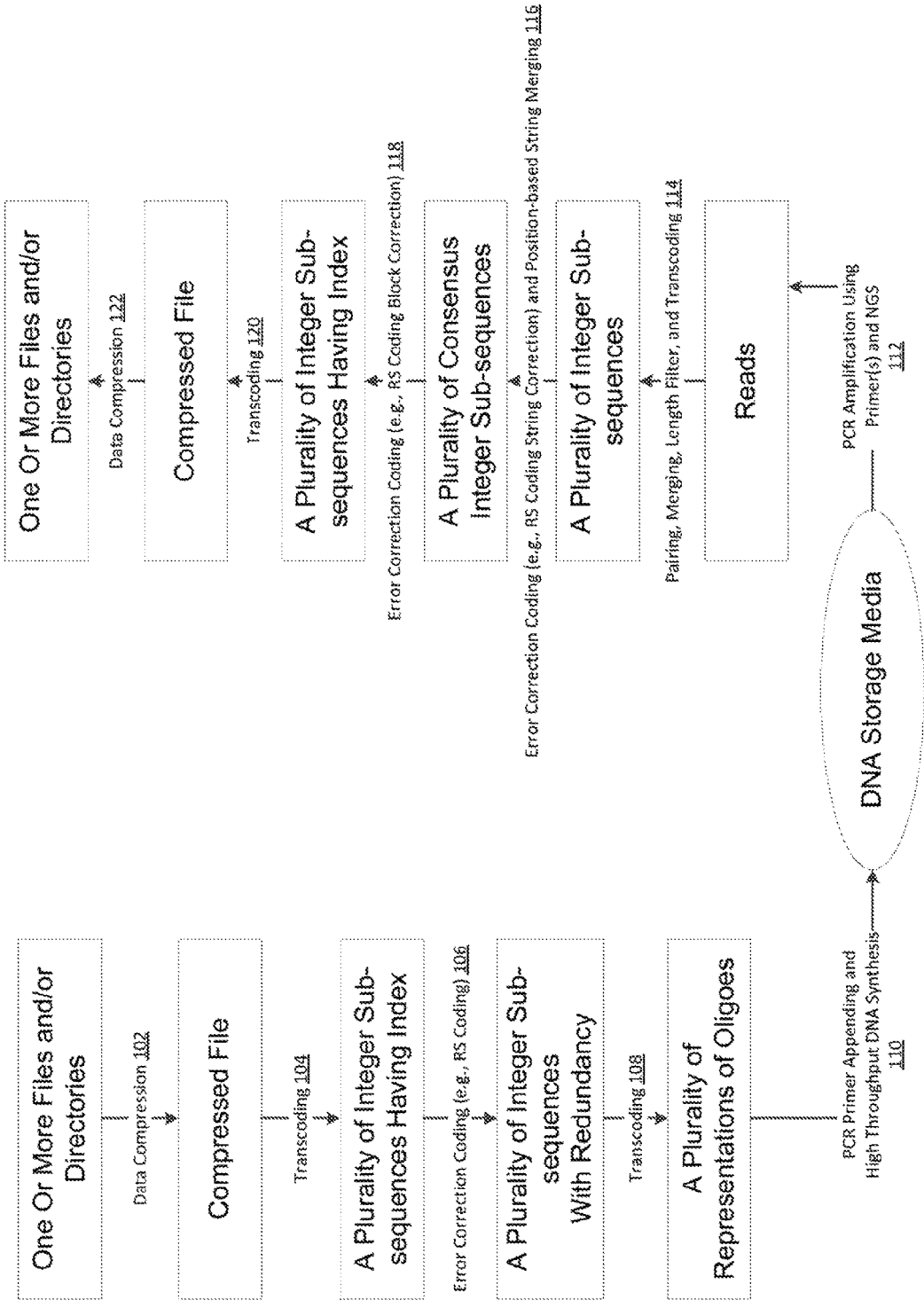
FIG. 1 illustrates an exemplary process for providing DNA-based data storage and retrieval, according to some embodiments.

The present invention provides accurate, efficient, and reliable methods of storing input data on a nucleic acid, such as a deoxyribonucleic acid ("DNA"). Specifically, the present invention utilizes a novel 5-bit transcoding framework to convert one or more data files into nucleic acid sequences (for example DNA sequences). This novel transcoding framework allows for effective nucleic acid sequence design that strikes the right GC content, avoids certain homopolymers (e.g., homoploymers that are 4 or more nucleotides long), and reduces error rate in nucleic acid synthesis and amplification. The present invention also provides an integrated process that includes compression algorithm(s), error correction algorithm(s), and transcoding framework(s) for efficient and reliable data storage and retrieval. The methods provided herein can be used for storing data of any size, including large sized files. Further, the present invention allows for random data access, which is particularly beneficial when data on a large scale is stored together, but only partial information need to be browsed at a given time. Data that can be stored in accordance with the methods disclosed herein includes any type of data that could be expressed in a digital manner (i.e., in binary data) including, for example, text files, high definition videos, images, and/or audios.

Thus, the present application in one aspect provides methods for storing input data on a set of nucleic acids as well as methods for converting input data into a set of nucleotide sequences. In another aspect, there are provided methods for retrieving output data stored on a nucleic acid as well as methods of converting a set of nucleotide sequences into output data. Also provided are systems and non-transitory computer-readable storage medium for storing one or more programs for carrying out any one or more steps of the methods described herein.

It is understood that embodiments of the invention described herein include "consisting" and/or "consisting essentially of" embodiments.

Reference to "about" a value or parameter herein includes (and describes) variations that are directed to that value or parameter per se. For example, description referring to "about X" includes description of "X".

As used herein, reference to "not" a value or parameter generally means and describes "other than" a value or parameter. For example, the method is not used to treat cancer of type X means the method is used to treat cancer of types other than X.

As used herein and in the appended claims, the singular forms "a," "or," and "the" include plural referents unless the context clearly dictates otherwise.

As used herein and in the appended claims, "a set of" refers to one or a plurality of referents unless the context clearly dictates otherwise. A set of nucleic acids can be nucleic acids encoding data from the same file or same group of files compressed together. In some embodiments, nucleic acids in the same file can have the same set of primers attached to the 5' and 3' ends.

Methods of Encoding Data and Data Storage

The present invention in one aspect provides methods (such as computer implemented methods) for converting input data into a set of nucleotide sequences. The method typically comprises a data processing step that converts the input data into a binary string and a nucleotide encoding step that converts the binary string using a 5-bit transcoding framework to obtain a set of nucleotide sequences. The methods are useful for storing input data on a set of nucleic acids, which involves first converting the input data into a set of nucleotide sequences and then synthesizing a set of nucleic acids comprising the set of nucleotide sequences.

The input data can represent any number of files of any type, such as text files, image files, audio/video files (such as high-definition files), etc. The files can be non-compressed or compressed. When a file is non-compressed, it can first be compressed before being converted into a binary string. For example, the file can be compressed into a LZMA file (e.g., A.lzma) using the Lempel-Ziv-Markov Chain algorithm. In some embodiments, two or more files (such as three, four, five, six, and more files) are first grouped together, for example, into a TAR file (e.g., A.tar), and the TAR file is further compressed into a LZMA file (e.g., A.tar.lzma). As such, the method can allow storage of multiple files (e.g., 1-5, 5-10, 10-15, 15-25, 25-35, 35-50) in a single nucleic acid composition.

In some embodiments, to allow random access to locations within a single file, the single file can be divided into multiple sets of data and the multiple sets of data are each compressed and processed as described below. For example, a digital file corresponding to a book having 10 chapters can be divided into 10 files, with each file corresponding to a single chapter. The 10 files are then separately compressed and processed to achieve random access of any chapter.

The data processing step converts the input data into a binary string. The binary string can be directly converted into a set of nucleotide sequences, for example by following a 5-bit transcoding framework described herein. Alternatively, the binary string can be further converted into a string of integers which are then converted into a set of nucleotide sequences, for example, by following a 5-bit transcoding framework. In some embodiments, the string of integers are further subjected to error correction coding and/or other processes to generate a plurality of integer sub-sequences having redundancy, and the plurality of integer sub-sequences having redundancy are then converted into a set of nucleotide sequences, for example by following a 5-bit transcoding framework.

Thus, for example, in some embodiments, there is provided a method (such as a computer implemented method) for converting input data into a set of nucleotide sequences, wherein the converting comprises: i) a data processing step comprising converting the input data into a binary string; and ii) a nucleotide encoding step comprising converting the binary string using a 5-bit transcoding framework to obtain a set of nucleotide sequences. In some embodiments, there is provided a method for storing input data on nucleic acid, the method comprises: a) converting the input data into a set of nucleotide sequences, wherein the converting comprises i) a data processing step comprising converting the input data into a binary string; and ii) a nucleotide encoding step comprising converting the binary string using a 5-bit transcoding framework to obtain a set of nucleotide sequences; and b) synthesizing a set of nucleic acids comprising the set of nucleotide sequences.

In some embodiments, the data processing step comprises dividing the binary string into a sequence of non-overlapping 5-bit binary strings, each of which can be further converted into an integer ranging from 0 to 31 to obtain a string of integers. The string of integers can be directly converted into a set of nucleotide sequences, for example using the 5-bit transcoding framework. Alternatively, the string of integers is subjected to further manipulation as described below.

Specifically, the string of integers can be divided into a plurality of initial sub-sequence of integers having a predetermined length. The predetermined length of the initial sub-sequence of integers is calculated based on a plurality of factors including the oligo length of the synthesis platform, the error correction code selected, the desired error tolerance, the synthesis error rate of oligo, and/or the total encoded data size, as discussed in detail below. For example, the integer string can be sliced into a list of non-overlapping integer sub-sequence using a length-fixed (e.g., 22 integers) sliding window. An index can then be added to each of the plurality of the initial sub-sequences of integers to generate a plurality of integer sub-sequences with index. The index can contain some integers also ranging from 0 to 31. The length of the index is flexible and depends on the throughput of the DNA synthesis and data size.

In some embodiments, redundancy data is added to generate a plurality of integer sub-sequences having redundancy. For example, Reed-Solomon (RS) error correction coding, is applied to the plurality of integer sub-sequences to generate a novel list of integer sub-sequences having redundancy through string correction and block correction of RS coding. Redundancy refers to the excess of synthesized oligoes to provide robustness to dropout. Redundancy in string correction is helpful for error correction of transitions and transversions of oligo. Redundancy in block correction enables correction of insertion, deletion, and completely missing of information.

In one exemplary embodiment, adding redundancy data to the plurality of integer sub-sequences having index comprises: creating an empty matrix, wherein the number of columns in the empty matrix is larger than the size of the plurality of integer sub-sequences having index, and wherein the number of rows of the empty matrix is larger than the number of integers in each of the plurality integer sub-sequences having index; filling the empty matrix with the plurality of integer sub-sequences having index and data generated by applying an error correction coding; and obtaining the plurality of sub-sequences having redundancy based on the filled matrix. The number of columns and/or rows of the empty matrix can be determined based on the type of the error correction code, a predetermined error tolerance value, a size of the plurality of integer sub-sequences having index, or a combination thereof. In some embodiments, the error correction coding is Reed-Solomon ("RS") coding. In some embodiments, the data generated by applying an error correction coding is generated by applying string correction of the RS coding and block correction of the RS coding.

In some embodiments, the nucleotide encoding step further comprises appending a pair of primer sequences to the 5' and 3' ends of a set of nucleotide sequences. The primers can be used for amplifying the set of nucleic acids, e.g. by PCR amplification methods. In some embodiments, the primer sequences are added to the set of nucleotide sequences before synthesis. Alternatively, primers can be attached to synthesized nucleic acids, for example through ligation.

The methods can be useful for storing two or more sets of input data on a nucleic acid. Specifically, the method comprises: a) separately converting the two or more sets of input data into two or more sets of corresponding nucleotide sequences; b) separately appending a pair of primer sequences to the 5' and 3' end of each of the two or more sets of nucleotide sequences, wherein the primers for each of the two or more sets of corresponding nucleotide sequences are different from each other; and c) synthesizing a plurality of sets of nucleic acids comprising the two or more sets of corresponding nucleotide sequences respectively. Each of the pair of primers can have a sequence that is different from any one of the two or more corresponding nucleotide sequences or complementary sequences thereof.

The synthesized nucleic acids can have GC content ranging from about 30% to about 70%. For example, the synthesized nucleic acids can have GC content ranging from any of about 40% to about 60%, about 30% to about 40%, about 40% to about 50%, about 50% to about 60%, or about 60% to about 70%. In some embodiments, the synthesized nucleic acids have no homopolymers of longer than 3 nucleotides (e.g., no homopolymers of 4, 5, 6, 7, 8, 9, or 10 nucleotides). The synthesized nucleic acids in some embodiments are oligonucleotides, for example, oligonucleotides of about any of 50, 150, 200, 300, or 400 nucleotides long. In some embodiments, a set of nucleic acids comprises about any of 1, 2, 3, 5, 10, 15, or more oligonucleotides.

In some embodiments, the method further comprises storing the set of synthesized nucleic acids. In some embodiments, the set of nucleic acids is stored by drying, such as lyophilization. The set of nucleic acids can be stored as dry compositions, including lyophilized compositions. In some embodiments, the set of nucleic acids is immobilized on a carrier, including a solid carrier such as a microarray. In some embodiments, the nucleic acids are stored on a microarray having a density of about 5 µg per an area of 1 inch*3 inch (e.g., in CustomArray 12K chip). In some embodiments, the size of the input data is at least about 50 MB.

Methods of Decoding Nucleic Acid Sequence and Data Retrieval

The present invention in another aspect provides methods (such as computer implemented methods) for converting a set of nucleotide sequences into an output data. The method is almost the reverse course of the encoding procedure, and typically comprises a nucleotide decoding step which converts the set of nucleotide sequences into a binary string, e.g., by using a 5-bit transcoding framework, and a data processing step which converts the binary string into the output data. The methods are useful for retrieving output data stored in a set of nucleic acids, which involves obtaining nucleotide sequence of the set of nucleic acids and then converting the set of nucleotide sequences into the output data.

In some embodiments, the set of nucleic acids is first amplified, for example by using primers present at the 5' and 3' ends of the set of nucleic acids. And the amplified nucleic acids can be subjected to sequencing, for example next generation sequencing. Next generation sequencing technologies are generally known in the art. For example, the nucleic acids can be sequenced by using the Illumina sequencing methods. Sequences belonging to a specific file can be obtained by aligning the primer sequences. In some embodiments, the method comprises an NGS library preparation. When the set of nucleic acids is present in a mixture comprising different sets of nucleic acids encoding different sets of data, the set of nucleic acids of interest can be specifically amplified by using the primer pair unique to the set of nucleic acids of interest, thus allowing random access of data corresponding to the set of nucleic acids of interest. If several compressed files need to be read and decoded at a single run of next generation sequencing, all of their corresponding sets of nucleic acids are amplified through PCR and all corresponding pairs will be used.

In some embodiments, the method comprises pair-end next generation sequencing, and read pairing and merging, in which forward and reverse read from a single cluster will be paired and merged into a single read, and all new reads with irregular length will be filtered. And, according to primer sequences, all reads can be grouped for each compressed file. The primers can then be removed, and the nucleotide sequences can either be converted into a plurality of integer sub-sequences comprising integers ranging from 0-31, or directly converted into a binary string which is subsequently converted into the output data.

In some embodiments, the method further comprises applying error correction of the plurality of integer sub-sequences to obtain a plurality of integer sub-sequences having index. In one exemplary embodiment, the step of applying error correction coding comprises: i) applying RS coding string correction to the plurality of integer sub-sequences to obtain a plurality of consensus integer sub-sequences; and ii) applying RS coding block correction to the plurality of consensus integer sub-sequences to obtain the plurality of integer sub-sequences having index. Since one kind of nucleic acids could have many copies of molecules during synthesis and be sequenced many times, many reads could stand for one nucleic acid. Due to error introduced during both high throughput synthesis and sequencing, these reads may have variants, but the correct reads matching completely well with originally designed nucleic acids still have advantage on the count. Through the highest frequency-based correction at every location of integer string, all integer strings sharing identical index can be corrected and merged into a consensus integer string between the string correction and block correction.

The index from the plurality of integer sub-sequences having index can then be removed to obtain a plurality of core sub-sequences of integers. The integer strings can then be concatenated into a full integer string and then converted into a binary string. The binary string can then be written into a file, such as a compressed file. The compressed file can then be decompressed, for example by using the LZMA algorithm. If the decompressed file includes data corresponding to multiple files, the decompressed file is further processed (e.g., extracted) by the TAR algorithm to obtain the multiple files.

In some embodiments, the method is useful for retrieving output data stored on a set of nucleic acids of interest, wherein the set of nucleic acids of interest is one of a plurality of sets of nucleotide sequences present in a mixture, each set encoding a different set of output data and having different sets of primer pairs at the 3' and 5' end. The method comprises a) amplifying the set of nucleic acids using the primer pair corresponding to set of nucleic acids of interest; b) obtaining a set of nucleotide sequences of the set of amplified nucleic acids; c) and converting the set of nucleotide sequences into the output data according any of the methods described herein; thereby obtaining the output data.

In some embodiments, there is provided a method for retrieving two or more sets of output data stored on corresponding two or more sets of nucleic acids of interest, wherein the set of nucleic acids of interest are among a plurality of sets of nucleotide sequences present in a mixture, each set encoding a different set of output data and having a different set of primer pairs at the 3' and 5' end, the method comprises: a) amplifying (e.g., separately amplifying or amplifying together) the two or more sets of nucleic acids of interest using primer pairs corresponding to the two or more sets of nucleic acids of interest; b) obtaining two or more sets of nucleotide sequences of the two or more sets of amplified nucleic acids, and c) separately converting the two or more sets of nucleotide sequences into the two or more sets of output data; thereby obtaining the two or more sets of output data.

5-Bit Transcoding Framework

The methods of the present invention utilize a novel 5-bit transcoding framework for converting a binary string or an integer string into a set of nucleotide sequences. "5-bit transcoding framework" refers to the conversion according to Table 1 below. Generally, every 5 continued bits from a binary string could be represented as an integer ranging from 0 to 31 and then 3 nucleotides (i.e., 3 mers). For instance, nucleic acids having four bases (e.g., A, T, G and C), thus 2-mers (i.e., NN) should have 16 kinds (e.g., AA, AT, AG, AC, TA, TT, TG, TC, GA, GT, GG, GC, CA, CT, CG and CC). Suppose degenerate base R and Y are concatenated after the 2-mers, the 3-mers (NNR/NNY) should consist of 32 kinds, which also matched well with 32 integers ranging from 0 to 31 and make binary string being converted into DNA sequence.

In some embodiments, R is selected from any two of A, T, G, and C, while Y is selected from the corresponding other two of A, T, G, and C. For example, in some embodiments, R is selected from A and G while Y is selected from T and C. In some embodiments, R is selected from A and C while Y is selected from T and G. In some embodiments, R is selected from T and G while Y is selected from A and C. In some embodiments, R is selected from T and C while Y is selected from A and G.

The choice of the nucleotide corresponding to R and Y can depend on their front basis, for example for the purposes of maintaining a desirable GC content and/or avoid homopolymers. For example, in a scheme in which R is selected from A and G and Y is selected from C and T, whether A or G is chosen for R and whether C or T is chosen for Y are dependent on their front bases (i.e., 2nd base of 3-mers). In some embodiments, R and Y are chosen so that the 2nd and 3rd bases are different. In some embodiments, R and Y are chosen to maintain a desirable GC balance. So long as the rules are followed R and Y can be randomly chosen. The coding potential of this transcoding framework is 1.67 (i.e., 5 bit to 3nt).

TABLE 1

| 5-bit | integer | Nucleotide sequence $N_{1\text{-}4}$ are selected from A, T, C, G and are different from each other. R is selected from any 2 of A, T, C, G. Y is selected from the corresponding other 2 nucleotides. | 5-bit | integer | Nucleotide sequence $N_{1\text{-}4}$ are selected from A, T, C, G and are different from each other R is selected from any 2 of A, T, C, G. Y is selected from the corresponding other 2 nucleotides. |
|---|---|---|---|---|---|
| 00000 | 0  | $N_1N_1R$ | 10000 | 16 | N3N1R |
| 00001 | 1  | $N_1N_1Y$ | 10001 | 17 | N3N1Y |
| 00010 | 2  | $N_1N_2R$ | 10010 | 18 | N3N2R |
| 00011 | 3  | $N_1N_2Y$ | 10011 | 19 | N3N2Y |
| 00100 | 4  | N1N3R | 10100 | 20 | N3N3R |
| 00101 | 5  | N1N3Y | 10101 | 21 | N3N3Y |
| 00110 | 6  | N1N4R | 10110 | 22 | N3N4R |
| 00111 | 7  | N1N4Y | 10111 | 23 | N3N4Y |
| 01000 | 8  | N2N1R | 11000 | 24 | N4N1R |
| 01001 | 9  | N2N1Y | 11001 | 25 | N4N1Y |
| 01010 | 10 | N2N2R | 11010 | 26 | N4N2R |
| 01011 | 11 | N2N2Y | 11011 | 27 | N4N2Y |
| 01100 | 12 | N2N3R | 11100 | 28 | N4N3R |
| 01101 | 13 | N2N3Y | 11101 | 29 | N4N3Y |
| 01110 | 14 | N2N4R | 11110 | 30 | N4N4R |
| 01111 | 15 | N2N4Y | 11111 | 31 | N4N4Y |

Table 2 provides an exemplary 5-bit transcoding framework. In the particular scheme depicted in Table 2, R is to be selected from A and G, while Y is to be selected from C and T. It is to be understood that other transcoding frameworks following the same principle can also be used.

TABLE 2

| 5-bit | integer | Exemplary nucleotide sequence R = A or G Y = C or T |
|---|---|---|
| 00000 | 0 | AAR |
| 00001 | 1 | AAY |
| 00010 | 2 | ATR |
| 00011 | 3 | ATY |
| 00100 | 4 | ACR |

TABLE 2-continued

| 5-bit | integer | Exemplary nucleotide sequence R = A or G Y = C or T |
|---|---|---|
| 00101 | 5 | ACY |
| 00110 | 6 | AGR |
| 00111 | 7 | AGY |
| 01000 | 8 | TAR |
| 01001 | 9 | TAY |
| 01010 | 10 | TTR |
| 01011 | 11 | TTY |
| 01100 | 12 | TCR |
| 01101 | 13 | TCR |
| 01110 | 14 | TGR |
| 01111 | 15 | TGY |
| 10000 | 16 | CAR |
| 10001 | 17 | CAY |
| 10010 | 18 | CTR |
| 10011 | 19 | CTY |
| 10100 | 20 | CCR |
| 10101 | 21 | CCY |
| 10110 | 22 | CGR |
| 10111 | 23 | CGY |
| 11000 | 24 | GAR |
| 11001 | 25 | GAY |
| 11010 | 26 | GTR |
| 11011 | 27 | GTY |
| 11100 | 28 | GCR |
| 11101 | 29 | GCY |
| 11110 | 30 | GGR |
| 11111 | 31 | GGY |

Synthesis and Storage of Nucleic Acids

The nucleic acids comprising the desirable nucleotide sequences can be synthesized using any nucleic acid synthesis methods. In some embodiments, the nucleic acids are synthesized by chemical synthesis. Methods of high throughput nucleic acid synthesis are described in International Application No. WO2002US40580, published as WO03052383, titled "COMBINATORIAL SYNTHESIS ON ARRAYS", filed Feb. 17, 2002, and a publication titled "ELECTROCHEMICALLY GENERATED ACID AND ITS CONTAINMENT TO 100 MICRON REACTION AREAS FOR THE PRODUCTION OF DNA MICROARRAYS" by Maurer et al., published in December 2016, which are incorporated herein by reference in their entireties.

The nucleic acids, once synthesized, can be stored in various medium. In some embodiments, the nucleic acids are dried (e.g., lyophilized) and stored in a vial. In some embodiments, the nucleic acids are immobilized on a carrier, for example a solid carrier such as a microarray.

Computer-Readable Storage Medium and Systems

Also provided herein are non-transitory computer-readable storage media storing one or more programs, the one or more programs comprising instructions, which when executed by one or more processors of an electronic device, causes the electronic device to carry out one or more steps of any of the methods described herein.

In some embodiments, there is provided a system for providing nucleic acid-based data storage or data retrieval from a nucleic acid, the system comprising: one or more processors; a memory; and one or more programs, wherein the one or more programs are stored in the memory and configured to be executed by the one or more processors, the one or more programs including instructions for carrying out one or more steps of any one of the methods described herein.

In some embodiments, there is provided an electronic device for providing nucleic acid-based data storage or data retrieval from a nucleic acid, the device comprising means for carrying out any one of the methods described herein.

Exemplary Embodiments

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The data processing step comprises dividing the binary string into a sequence of non-overlapping 5-bit binary strings. The nucleotide encoding step comprises converting each 5-bit binary string into an integer ranging from 0 to 31 to obtain a string of integers and converting the string of integers using the 5-bit transcoding framework to obtain the set of nucleotide sequences.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The data processing step comprises dividing the binary string into a sequence of non-overlapping 5-bit binary strings. The nucleotide encoding step comprises converting each 5-bit binary string into an integer ranging from 0 to 31 to obtain a string of integers and converting the string of integers using the 5-bit transcoding framework to obtain the set of nucleotide sequences. The nucleotide encoding step further comprises dividing the string of integers into a plurality of initial sub-sequence of integers having a predetermined length.

In some embodiments, the length of each of the plurality of initial sub-sequence of integers is determined based on an oligo length of a selected synthesis platform, a desired error tolerance, a size of the input data, a selected error correction code, or a combination thereof.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The data processing step comprises dividing the binary string into a sequence of non-overlapping 5-bit binary strings. The nucleotide encoding step comprises converting each 5-bit binary string into an integer ranging from 0 to 31 to obtain a string of integers and converting the string of integers using the 5-bit transcoding framework to obtain the set of nucleotide sequences. The nucleotide encoding step further comprises dividing the string of integers into a plurality of initial sub-sequence of integers having a predetermined length. The nucleotide encoding step further comprises adding index information to each of the plurality of the initial sub-sequences of integers to obtain a plurality of integer sub-sequences having index.

In some embodiments, the index information added to each of the plurality of the initial sub-sequences of integers comprises a sequence of integers, wherein the length of the sequence of integers is based on the size of the input data.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The data processing step comprises dividing the binary string into a sequence of non-overlapping 5-bit binary strings. The nucleotide encoding step comprises converting each 5-bit binary string into an integer ranging from 0 to 31 to obtain a string of integers and converting the string of integers using the 5-bit transcoding framework to obtain the set of nucleotide sequences. The nucleotide encoding step further comprises dividing the string of integers into a plurality of initial sub-sequence of integers having a predetermined length. The nucleotide encoding step further comprises adding index information to each of the plurality of the initial sub-sequences of integers to obtain a plurality of integer sub-sequences having index. The nucleotide encoding step further comprises, after adding the index information, adding redundancy data to the plurality of integer sub-sequences having index, thereby obtaining a plurality of integer sub-sequences having redundancy.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The data processing step comprises dividing the binary string into a sequence of non-overlapping 5-bit binary strings. The nucleotide encoding step comprises converting each 5-bit binary string into an integer ranging from 0 to 31 to obtain a string of integers and converting the string of integers using the 5-bit transcoding framework to obtain the set of nucleotide sequences. The nucleotide encoding step further comprises dividing the string of integers into a plurality of initial sub-sequence of integers having a predetermined length. The nucleotide encoding step further comprises adding index information to each of the plurality of the initial sub-sequences of integers to obtain a plurality of integer sub-sequences having index. The nucleotide encoding step further comprises, after adding the index information, adding redundancy data to the plurality of integer sub-sequences having index, thereby obtaining a plurality of integer sub-sequences having redundancy. Adding redundancy data to the plurality of integer sub-sequences having index comprises: creating an empty matrix, wherein the number of columns in the empty matrix is larger than the size of the plurality of integer sub-sequences having index, and wherein the number of rows of the empty matrix is larger than the number of integers in each of the plurality integer sub-sequences having index; filling the empty matrix with the plurality of integer sub-sequences having index and data generated by applying an error correction coding; and obtaining the plurality of sub-sequences having redundancy based on the filled matrix.

In some embodiments, the number of columns of the empty matrix is determined based on an oligo length of a selected synthesis platform, the type of the error correction code, a predetermined error tolerance value, a size of the plurality of integer sub-sequences having index, or a combination thereof.

In some embodiments, the number of rows of the empty matrix is determined based on an oligo length of a selected synthesis platform, a type of the error correction code, a predetermined error tolerance value, a size of the plurality of integer sub-sequences having index, or a combination thereof.

In some embodiments, the error correction coding is Reed-Solomon ("RS") coding.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The data processing step comprises dividing the binary string into a sequence of non-overlapping 5-bit binary strings. The nucleotide encoding step comprises converting each 5-bit binary string into an integer ranging from 0 to 31 to obtain a string of integers and converting the string of integers using the 5-bit transcoding framework to obtain the set of nucleotide sequences. The nucleotide encoding step further comprises dividing the string of integers into a plurality of initial sub-sequence of integers having a predetermined length. The nucleotide encoding step further comprises adding index information to each of the plurality of the initial sub-sequences of integers to obtain a plurality of integer sub-sequences having index. The nucleotide encoding step further comprises, after adding the index information, adding redundancy data to the plurality of integer sub-sequences having index, thereby obtaining a plurality of integer sub-sequences having redundancy. Adding redundancy data to the plurality of integer sub-sequences having index comprises: creating an empty matrix, wherein the number of columns in the empty matrix is larger than the size of the plurality of integer sub-sequences having index, and wherein the number of rows of the empty matrix is larger than the number of integers in each of the plurality integer sub-sequences having index; filling the empty matrix with the plurality of integer sub-sequences having index and data generated by applying an error correction coding; and obtaining the plurality of sub-sequences having redundancy based on the filled matrix. The data generated by applying an error correction coding is generated by applying string correction of the RS coding and/or block correction of the RS coding.

In some embodiments, there is provided a computer implemented method for converting input data into a set of nucleotide sequences, the method comprises: i) converting the input data into a binary string; ii) dividing the binary string into a sequence of non-overlapping 5-bit binary strings; iii) converting each 5-bit binary string into an integer ranging from 0 to 31 to obtain a string of integers and converting the string of integers using the 5-bit transcoding framework; iv) dividing the string of integers into a plurality of initial sub-sequence of integers having a predetermined length; v) adding index information to each of the plurality of the initial sub-sequences of integers to obtain a plurality of integer sub-sequences having index; vi) after adding the index information, adding redundancy data to the plurality of integer sub-sequences having index, thereby obtaining a plurality of integer sub-sequences having redundancy, thereby obtaining the set of nucleic acid sequences.

In some embodiments, there is provided a method for storing input data on nucleic acid, the method comprises: i) converting the input data into a binary string; ii) dividing the binary string into a sequence of non-overlapping 5-bit binary strings; iii) converting each 5-bit binary string into an integer ranging from 0 to 31 to obtain a string of integers and converting the string of integers using the 5-bit transcoding framework; iv) dividing the string of integers into a plurality of initial sub-sequence of integers having a predetermined length; v) adding index information to each of the plurality of the initial sub-sequences of integers to obtain a plurality of integer sub-sequences having index; vi) after adding the index information, adding redundancy data to the plurality of integer sub-sequences having index, thereby obtaining a plurality of integer sub-sequences having redundancy, thereby obtaining the set of nucleic acid sequences; and vii) synthesizing a set of nucleic acids comprising the set of nucleotide sequences.

In some embodiments, there is provided a computer implemented method for converting input data into a set of nucleotide sequences, the method comprises: i) converting the input data into a binary string; ii) dividing the binary string into a sequence of non-overlapping 5-bit binary strings; iii) converting each 5-bit binary string into an integer ranging from 0 to 31 to obtain a string of integers and converting the string of integers using the 5-bit transcoding framework; iv) dividing the string of integers into a plurality of initial sub-sequence of integers having a predetermined length; v) adding index information to each of the plurality of the initial sub-sequences of integers to obtain a plurality of integer sub-sequences having index; vi) creating an empty matrix, wherein the number of columns in the empty matrix is larger than the size of the plurality of integer sub-sequences having index, and wherein the number of rows of the empty matrix is larger than the number of integers in each of the plurality integer sub-sequences having index; vii) filling the empty matrix with the plurality of integer sub-sequences having index and data generated by applying an error correction coding (e.g., by applying string correction of the RS coding and/or block correction of the RS coding); and viii) obtaining the plurality of sub-sequences having redundancy based on the filled matrix, thereby obtaining the set of nucleic acid sequences.

In some embodiments, there is provided a method for storing input data on nucleic acid, the method comprises: i) converting the input data into a binary string; ii) dividing the binary string into a sequence of non-overlapping 5-bit binary strings; iii) converting each 5-bit binary string into an integer ranging from 0 to 31 to obtain a string of integers and converting the string of integers using the 5-bit transcoding framework; iv) dividing the string of integers into a plurality of initial sub-sequence of integers having a predetermined length; v) adding index information to each of the plurality of the initial sub-sequences of integers to obtain a plurality of integer sub-sequences having index; vi) creating an empty matrix, wherein the number of columns in the empty matrix is larger than the size of the plurality of integer sub-sequences having index, and wherein the number of rows of the empty matrix is larger than the number of integers in each of the plurality integer sub-sequences having index; vii) filling the empty matrix with the plurality of integer sub-sequences having index and data generated by applying an error correction coding (e.g., by applying string correction of the RS coding and/or block correction of the RS coding); and viii) obtaining the plurality of sub-sequences having redundancy based on the filled matrix, thereby obtaining the set of nucleic acid sequences; and xi) synthesizing a set of nucleic acids comprising the set of nucleotide sequences.

In some embodiments, there is provided a method for retrieving output data stored on nucleic acid, the method comprises: i) obtaining a set of nucleotide sequences of a set of nucleic acids, ii) converting the set of nucleotide sequences into a plurality of integer sub-sequences compris- ing integers ranging from 0-31; iii) converting the plurality of integer sub-sequences into a binary string; and iv) converting binary string into the output data, thereby obtaining the output data.

In some embodiments, there is provided a method for retrieving output data stored on nucleic acid, the method comprises: i) sequencing a set of nucleic acids to generate a plurality of sequence reads; ii) pairing, merging, and/or filtering to obtain the set of nucleotide sequences; iii) converting the set of nucleotide sequences into a plurality of integer sub-sequences comprising integers ranging from 0-31; iv) applying error correction coding to the plurality of integer sub-sequences, thereby obtaining the plurality of integer sub-sequences having index; v) converting the plurality of integer sub-sequences having index into a binary string; and vi) converting binary string into the output data, thereby obtaining the output data.

In some embodiments, there is provided a method for retrieving output data stored on nucleic acid, the method comprises: i) sequencing a set of nucleic acids to generate a plurality of sequence reads; ii) pairing, merging, and/or filtering to obtain the set of nucleotide sequences; iii) converting the set of nucleotide sequences into a plurality of integer sub-sequences comprising integers ranging from 0-31; iv) applying RS coding string correction to the plurality of integer sub-sequences to obtain a plurality of consensus integer sub-sequences; v) applying RS coding block correction to the plurality of consensus integer sub-sequences to obtain the plurality of integer sub-sequences having index; vi) converting the plurality of integer sub-sequences having index into a binary string; and vii) converting binary string into the output data, thereby obtaining the output data.

In some embodiments, there is provided a method for retrieving output data stored on nucleic acid, the method comprises: i) sequencing a set of nucleic acids to generate a plurality of sequence reads; ii) pairing, merging, and/or filtering to obtain the set of nucleotide sequences; iii) converting the set of nucleotide sequences into a plurality of integer sub-sequences comprising integers ranging from 0-31; iv) applying RS coding string correction to the plurality of integer sub-sequences to obtain a plurality of consensus integer sub-sequences; v) applying RS coding block correction to the plurality of consensus integer sub-sequences to obtain the plurality of integer sub-sequences having index; vi) removing the index from the plurality of integer sub-sequences having index to obtain a plurality of core sub-sequences of integers; vii) merging the core sub-sequences of integers into a string of integers; viii) converting the string of integers into a binary string; and ix) converting binary string into the output data, thereby obtaining the output data.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The 5-bit transcoding framework is according to Table 2.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The 5-bit transcoding framework is according to Table 2. R and Y are chosen based on: 1) being different from the nucleotide immediately in front of R or Y; and/or 2) the estimated GC content of the nucleotide sequence.

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The input data corresponds to a compressed file. The compressed file is compressed using the Lempel-Zic-Markov chain algorithm ("LZMA").

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The input data corresponds to two or more files. The data processing step further comprises: grouping the two or more files into a TAR file. The TAR file is further compressed using the Lempel-Zic-Markov chain algorithm ("LZMA").

In some embodiments, there is provided a computer implemented method for converting input data into a set of nucleotide sequences, the method comprises: i) a data processing step comprising converting the input data into a binary string; and ii) a nucleotide encoding step comprising converting the binary string using a 5-bit transcoding framework to obtain a set of nucleotide sequences. The nucleotide encoding step further comprises appending a pair of primer sequences to the 5' and 3' ends of each nucleotide sequence of the set of nucleotide sequences.

In some embodiments, there is provided a method for storing input data on nucleic acid comprises a) converting the input data into a set of nucleotide sequences, wherein the converting comprises i) a data processing step comprising converting the input data into a binary string; ii) a nucleotide encoding step comprising converting the binary string using a 5-bit transcoding framework to obtain the set of nucleotide sequences; and b) synthesizing a set of nucleic acids comprising the set of nucleotide sequences. The method further comprises attaching a pair of primers to the set of synthesized nucleic acids.

In some embodiments, there is provided a method for storing two or more sets of input data on nucleic acid comprises: a) separately converting the two or more sets of input data into two or more sets of corresponding nucleotide sequences according to any of the methods described herein; b) separately appending a pair of primer sequences to the 5' and 3' end of each set of the two or more sets of nucleotide sequences, wherein the pairs of primers for the two or more sets of corresponding nucleotide sequences are different from each other; and c) synthesizing two or more sets of nucleic acids comprising the two or more sets of corresponding nucleotide sequences, respectively.

In some embodiments, there is provided a method for storing two or more sets of input data on nucleic acid comprises: a) separately converting the two or more sets of input data into two or more sets of corresponding nucleotide sequences according to any of the methods described herein; b) separately appending a pair of primer sequences to the 5' and 3' end of each set of the two or more sets of nucleotide sequences, wherein the pairs of primers for the two or more sets of corresponding nucleotide sequences are different from each other; and c) synthesizing two or more sets of nucleic acids comprising the two or more sets of corresponding nucleotide sequences, respectively. Each pair of primers has a sequence that is different from any one of the two or more sets of corresponding nucleotide sequences or complementary sequences thereof.

In some embodiments, the set of synthesized nucleic acids has GC content ranging from 30% to 70%.

In some embodiments, there is provided a method for storing input data on nucleic acid comprises a) converting the input data into a set of nucleotide sequences, wherein the converting comprises i) a data processing step comprising converting the input data into a binary string; ii) a nucleotide encoding step comprising converting the binary string using a 5-bit transcoding framework to obtain the set of nucleotide sequences; and b) synthesizing a set of nucleic acids comprising the set of nucleotide sequences. The method further comprises storing the set of synthesized nucleic acids.

In some embodiments, the set of synthesized nucleic acids is stored by drying. In some embodiments, the set of synthesized nucleic acids is stored by lyophilization.

In some embodiments, the set of synthesized nucleic acids is immobilized on a carrier, which can be a microarray.

In some embodiments, there is provided a method for retrieving output data stored on nucleic acid comprises: a) obtaining a set of nucleotide sequences of a set of nucleic acids, b) converting the set of nucleotide sequences into the output data, wherein the converting comprises: i) a nucleotide decoding step comprising converting the set of nucleotide sequences into a binary string using a 5-bit transcoding framework; and ii) a data processing step comprising converting binary string into the output data, thereby obtaining the output data. The method further comprises amplifying the set of nucleic acids prior to retrieving the output data.

In some embodiments, there is provided a method for retrieving output data stored on nucleic acid comprises: a) obtaining a set of nucleotide sequences of a set of nucleic acids, b) converting the set of nucleotide sequences into the output data, wherein the converting comprises: i) a nucleotide decoding step comprising converting the set of nucleotide sequences into a binary string using a 5-bit transcoding framework; and ii) a data processing step comprising converting binary string into the output data, thereby obtaining the output data. The method further comprises sequencing the set of nucleic acids to generate a plurality of sequence reads. The plurality of sequence reads are paired, merged, and filtered to obtain the set of nucleotide sequences.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The nucleotide decoding step comprises converting the set of nucleotide sequences into a plurality of integer sub-sequences comprising integers ranging from 0-31.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The nucleotide decoding step comprises converting the set of nucleotide sequences into a plurality of integer sub-sequences comprising integers ranging from 0-31. The nucleotide decoding step further comprises applying error correction coding to the plurality of integer sub-sequences, thereby obtaining the plurality of integer sub-sequences having index.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The nucleotide decoding step comprises converting the set of nucleotide sequences into a plurality of integer sub-sequences comprising integers ranging from 0-31. The nucleotide decoding step further comprises applying error correction coding to the plurality of integer sub-sequences, thereby obtaining the plurality of integer sub-sequences having index. The step of applying error correction coding comprises: i) applying RS coding string correction to the plurality of integer sub-sequences to obtain a plurality of consensus integer sub-sequences; and ii) applying RS coding block correction to the plurality of consensus integer sub-sequences to obtain the plurality of integer sub-sequences having index.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The nucleotide decoding step comprises converting the set of nucleotide sequences into a plurality of integer sub-sequences comprising integers ranging from 0-31. The nucleotide decoding step further comprises applying error correction coding to the plurality of integer sub-sequences, thereby obtaining the plurality of integer sub-sequences having index. The nucleotide decoding step further comprises removing the index from the plurality of integer sub-sequences having index to obtain a plurality of core sub-sequences of integers.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The output data is stored in a compressed file. The data processing step further comprises decompressing the compressed file, for example, by through the LZMA algorithm.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The output data corresponds to a plurality of files. The method further comprises extracting the plurality of files from the output data through the TAR algorithm.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The nucleotide decoding step comprises converting the set of nucleotide sequences into a plurality of integer sub-sequences comprising integers ranging from 0-31. The nucleotide decoding step further comprises applying error correction coding to the plurality of integer sub-sequences, thereby obtaining the plurality of integer sub-sequences having index. The nucleotide decoding step further comprises removing the index from the plurality of integer sub-sequences having index to obtain a plurality of core sub-sequences of integers. The nucleotide decoding step further comprises merging the core sub-sequences of integers into a string of integers and converting the string of integers into a binary string.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The 5-bit transcoding framework is according to Table 2.

In some embodiments, there is provided a computer implemented method for converting a set of nucleotide sequences into an output data comprises: i) a nucleotide decoding step comprising converting the set of nucleotide sequences into a binary string using a 5-bit transcoding framework; and ii) a data processing step comprising converting binary string into the output data. The set of nucleic acids comprises primer sequences at the 3' and 5' ends and the method comprises removing the primer sequences before the nucleotide decoding step.

In some embodiments, there is provided there is provided a computer-enabled method for providing DNA-based data storage, the method comprising: converting a digital file into a binary string; converting the binary string using a 5-bit transcoding framework to obtain a string of integers; obtaining, from the string of integers, a plurality of sub-sequences of integers; and converting the plurality of sub-sequences of integers into a plurality of representations of DNA oligoes for DNA synthesis.

In some embodiments, converting the binary string using a 5-bit transcoding framework to obtain a string of integers comprises: dividing the binary string into a sequence of non-overlapping 5-bit binary strings; converting each 5-bit binary string into an integer ranging from 0 to 31 to obtain a string of integers. In some embodiments, the string of integers is further divided into a plurality of initial sub-sequence of integers having a predetermined length. In some embodiments, obtaining a plurality of sub-sequences of integers to be converted comprises: adding index information to each sub-sequence of the initial plurality of sub-sequences of integers; after adding the index information, adding redundancy data to the initial plurality of sub-sequences of integers to obtain the plurality of sub-sequences of integers. In some embodiments, the index information added to each sub-sequence of the initial plurality of sub-sequences comprises a string of integers, and wherein a length of the string of integers corresponding to the index information is based on a size of the digital file.

In some embodiments, the method comprises adding redundancy data to the plurality of sub-sequences of integers, which can comprise, for example, obtaining a subset of the initial plurality of sub-sequences of integers; selecting an empty matrix, wherein the number of columns of the empty matrix is larger than the number of sub-sequences in the subset, and wherein the number of rows of the empty matrix is larger than the number of integers in each sub-sequence of the subset; filling the empty matrix with the subset of the initial plurality of sub-sequences of integers and data corresponding to an error correction code; and obtaining the plurality of sub-sequences of integers based on the filled matrix. In some embodiments, the number of columns of the empty matrix is selected based on a type of the error correction code, a predetermined error tolerance value, a size of the subset, or a combination thereof. In some embodiments, the number of rows of the empty matrix is selected based on a type of the error correction code, a predetermined error tolerance value, a size of the subset, or a combination thereof.

In some embodiments, the error correction code is Reed-Solomon ("RS") code. In some embodiments, converting the plurality of sub-sequences of integers into a plurality of representations of DNA oligoes comprises converting an integer of the plurality of sub-sequences of integers into a representation of three nucleotides, wherein: a first of the three nucleotides is selected from A, T, G, and C, a second of the three nucleotides is selected from A, T, G, and C, and a third of the three nucleotides is selected from one of two options.

In some embodiments, the digital file is a compressed file corresponding to a group of one or more files or directories. In some embodiments, the digital file comprises a LZMA file corresponding to a group of one or more files or directories compressed using the Lempel-Ziv-Markov chain algorithm.

In some embodiments according to any one of embodiments described above, wherein the method further comprises: adding, to each oligo representation of the plurality of representations of DNA oligoes, data representing a pair of primers; and, after adding the information representing the pair of primers, causing performance of DNA synthesis based on the plurality of representations of DNA oligoes.

In some embodiments, the method further comprises: obtaining a second digital file; obtaining a second plurality of representations of DNA oligoes based on the second digital file; adding data representing a second pair of primers to each oligo representation of the second plurality of representations of DNA oligoes, wherein the second pair of primers is different from the first pair of primers; and performing DNA synthesis based on the plurality of representations of DNA oligoes and the second plurality of representations of DNA oligoes.

In some embodiments, there is provided a computer-enabled method for providing DNA-based data retrieval, the method comprising: obtaining a plurality of reads corresponding to a digital file; based on the plurality of reads, obtaining a plurality of sub-sequences of integers; converting the plurality of sub-sequences of integers into a string of integers; converting the string of integers into a binary string using a 5-bit framework; and obtaining, based on the binary string, a digital file. In some embodiments, obtaining a plurality of reads corresponding to a digital file comprises: identifying a primer pre-associated with the digital file. In some embodiments, obtaining a plurality of sub-sequences of integers comprises performing frequency-based error correction based on the plurality of reads. In some embodiments, converting the string of integers into a binary string using a 5-bit transcoding framework comprises: converting each integer of the string of integers into a 5-bit binary number.

In some embodiments, there is provided a non-transitory computer-readable storage medium storing one or more programs, the one or more programs comprising instructions, which when executed by one or more processors of an electronic device, cause the electronic device to: convert a digital file into a binary string; convert the binary string using a 5-bit transcoding framework to obtain a string of integers; obtain, from the string of integers, a plurality of sub-sequences of integers; and convert the plurality of sub-sequences of integers into a plurality of representations of DNA oligoes for DNA synthesis.

In some embodiments, there is provided a system for providing DNA-based data storage, the system comprising: one or more processors; a memory; and one or more programs, wherein the one or more programs are stored in the memory and configured to be executed by the one or more processors, the one or more programs including instructions for: converting a digital file into a binary string; converting the binary string using a 5-bit transcoding framework to obtain a string of integers; obtaining, from the string of integers, a plurality of sub-sequences of integers; and converting the plurality of sub-sequences of integers into a plurality of representations of DNA oligoes.

In some embodiments, there is provided a non-transitory computer-readable storage medium storing one or more programs, the one or more programs comprising instructions, which when executed by one or more processors of an electronic device, cause the electronic device to obtain a plurality of reads corresponding to a digital file; based on the plurality of reads, obtain a plurality of sub-sequences of integers; convert the plurality of sub-sequences of integers into a string of integers; convert the string of integers into a binary string using a 5-bit framework; and obtain, based on the binary string, a digital file.

In some embodiments, there is provided a system for providing DNA-based data storage, the system comprising: one or more processors; a memory; and one or more programs, wherein the one or more programs are stored in the memory and configured to be executed by the one or more processors, the one or more programs including instructions for: obtaining a plurality of reads corresponding to a digital file; based on the plurality of reads, obtaining a plurality of sub-sequences of integers; converting the plurality of sub-sequences of integers into a string of integers; converting the string of integers into a binary string using a 5-bit framework; and obtaining, based on the binary string, a digital file.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should be noted that a step of obtaining an element/value in the present disclosure can be viewed either as a step of reading such element/value in a memory unit of an electronic device or a step of receiving such element/value from another electronic device via communication means.

Exemplary Processes

FIG. 1 illustrates an exemplary process for providing DNA-based data storage and retrieval. In particular, exemplary steps 102-110 are directed to encoding digital data for storage, and exemplary steps 112-122 are directed to decoding the stored information for retrieval. Below, the exemplary steps in FIG. 1 are described in further detail, with reference to FIGS. 2-5.

1. Encoding

At step 102 ("Data Compression"), one or more files and/or directories are packed into a single file and then compressed into a compressed file. In some examples, the files and/or directories are packed into a TAR file (e.g., File.tar), which is then compressed into a LZMA file (e.g., File.tar.lzma) using the Lempel-Ziv-Markov Chain algorithm (i.e., LZMA algorithm). In some examples, one LZMA file operates as a single, undividable unit for data retrieval (e.g., during decoding). Thus, if multiple files and directories are intended to be stored together but retrieved randomly and independently, they should be grouped into multiple TAR files and compressed into multiple corresponding LZMA files at this step.

At step 104, a first round of data transcoding is carried out. First, each LZMA file is converted into a binary string. As an example, with reference to FIG. 2, a file named "File.tar.lzma" is converted into a binary string. The binary string is then converted into an integer string B ("0; 10; 25; . . . ; 4; 8; 31"). In the depicted example, the conversion from the binary string into the integer string B is achieved using a 5-bit transcoding framework. As shown, the binary string is divided into a sequence of non-overlapping 5-bit binary strings such as "00000" and "01010". Each of the 5-bit binary string is then converted into an integer to form the integer string B. One of ordinary skill in the art would recognize that, under this 5-bit transcoding framework, each integer in the integer string ranges from 0 (corresponding to "00000") to 31 (corresponding to "11111").

Figure 2:
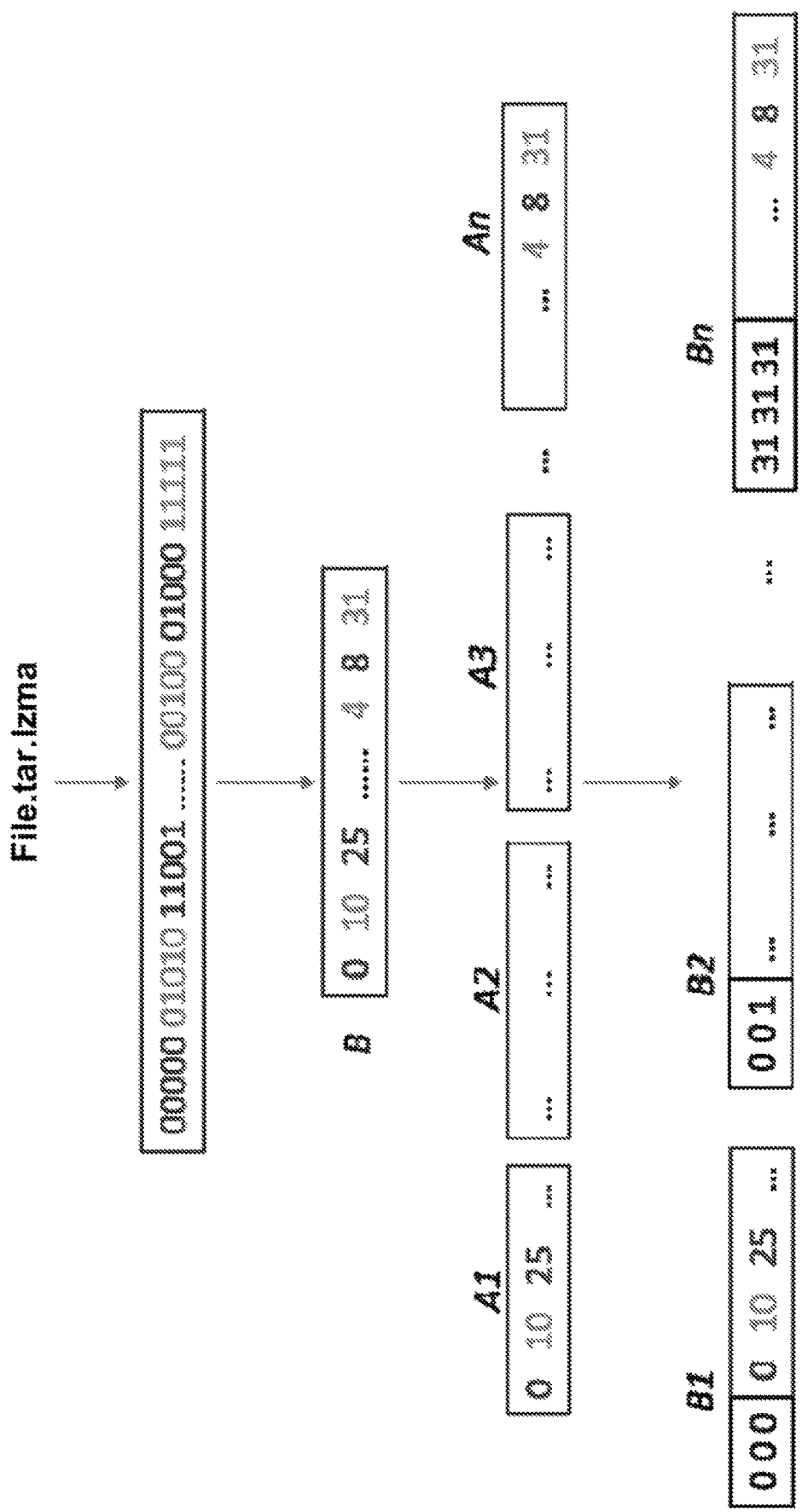
FIG. 2 illustrates an exemplary scenario for processing a compressed file for DNA-based data storage, according to some embodiments.

As shown in FIG. 2, the integer string B is then divided into a plurality of non-overlapping integer sub-sequences (e.g., [A1, A2, . . . , An]) using a length-fixed sliding window. In the depicted example in FIG. 2, each of the integer sub-sequences (e.g., A1) consists of 22 integers. Finally, index information is appended to the beginning of each sub-sequence to form a new plurality of integer sub-sequences having index (e.g., [B1, B2, . . . , Bn]). In the depicted example, the index information includes a sequence of 3 integers, each of which ranges from 0 to 31. The length of the index sequence can be selected based on various factors, such as the size of the compressed file and the throughput of DNA synthesis.

Figure 4:
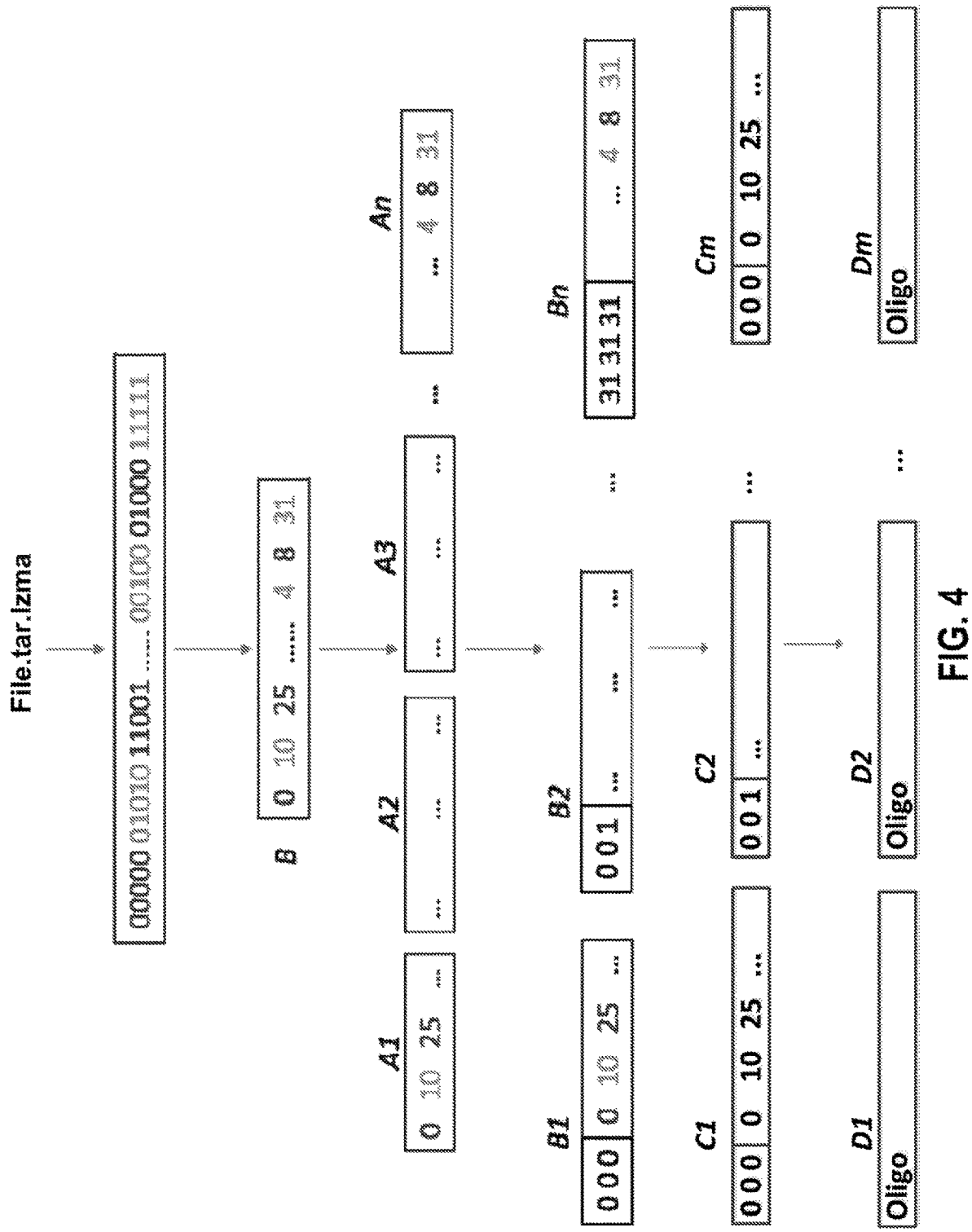
FIG. 4 illustrates an exemplary scenario for processing a compressed file for DNA-based data storage, according to some embodiments.

Turning back to FIG. 1, at step 106, the plurality of integer sub-sequences having index (e.g., [B1, B2, . . . , Bn] as shown in FIG. 2) is further transformed into a plurality of integer sub-sequences having index and redundancy (e.g., [C1, C2, . . . , Cm] as shown in FIG. 4). Various error correction coding algorithms, such as Reed-Solomon (RS) coding, fountain coding, and hamming coding, can be used to add redundancy data to the digital data to be stored. In a preferred embodiment, RS coding is used because of its robustness and ease of implementation.

FIGS. 3A-D illustrate an exemplary process for adding index and redundancy to digital content (e.g., as represented by a plurality of integer sub-sequences [A1, A2, . . . , An]) to obtain [C1, C2, . . . , Cm]. In particular, FIGS. 3A-D show how the first five integer sub-sequences (i.e. A1, A2, A3, A4, and A5) can be processed using RS coding to form [C1, C2, . . . , C31]. For the rest of the integer sub-sequences (i.e., A6, . . . An), every five continual integer sub-sequences are processed as a unit in a similar manner as shown in FIGS. 3A-D. In this example, five integer sub-sequences are processed via a 29×31 matrix together such that the parity for block correction is 26 (i.e., 31−5=26) and thus 13 (i.e., 26/2=13) oligoes among 31 could be lost but recovered according to the principle of RS coding.

Figure 3A:
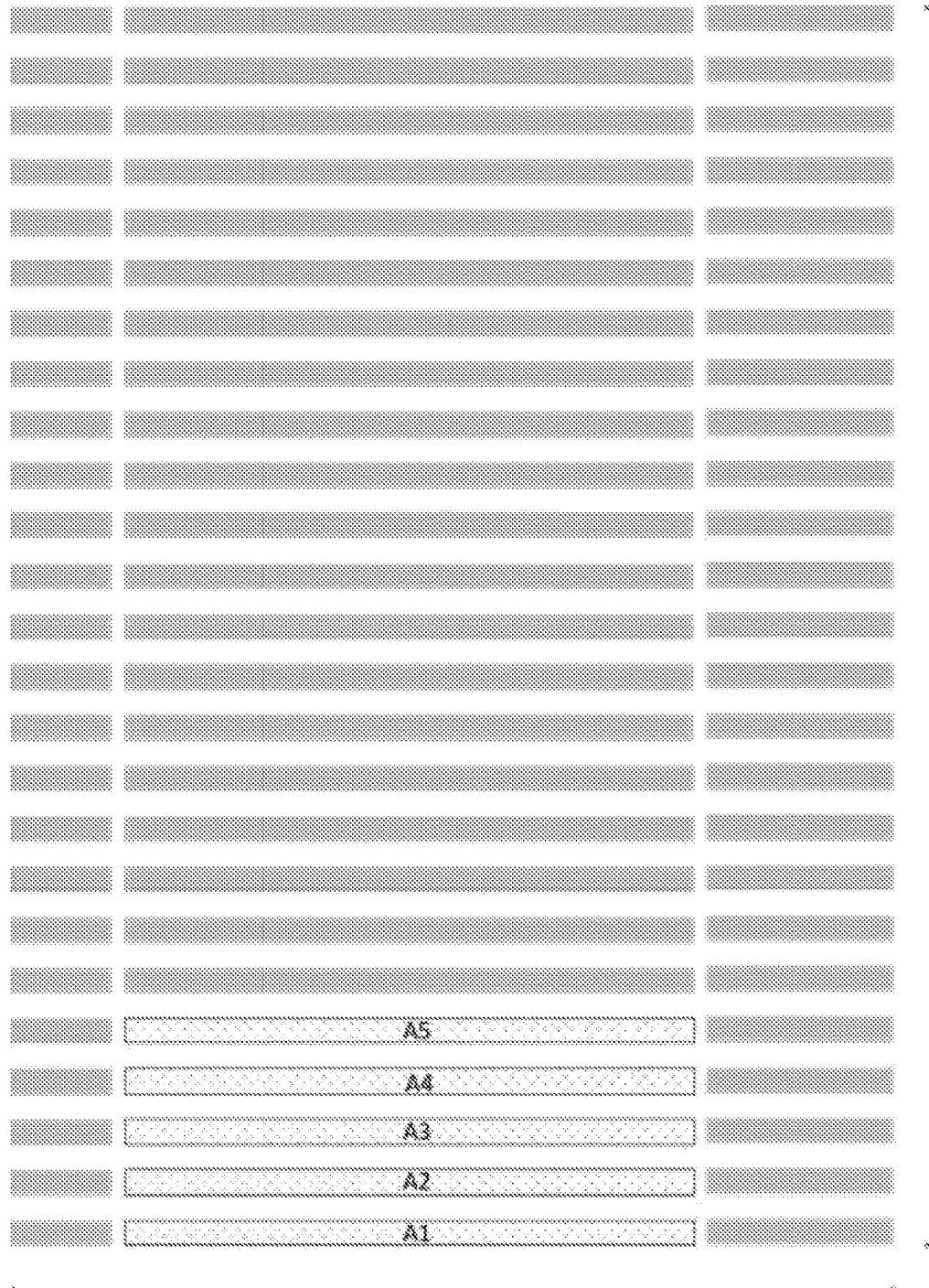
FIG. 3A illustrates an exemplary step for adding index and redundancy data to the digital content to be stored, according to some embodiments.

With reference to FIG. 3A, a 29-by-31 empty matrix is prepared. The first five integer strings A1, A2, A3, A4, A5 from [A1, A2, . . . , An] are filled into the matrix as shown to occupy a 22-by-5 submatrix as shown. This region is the core data block.

Figure 3B:
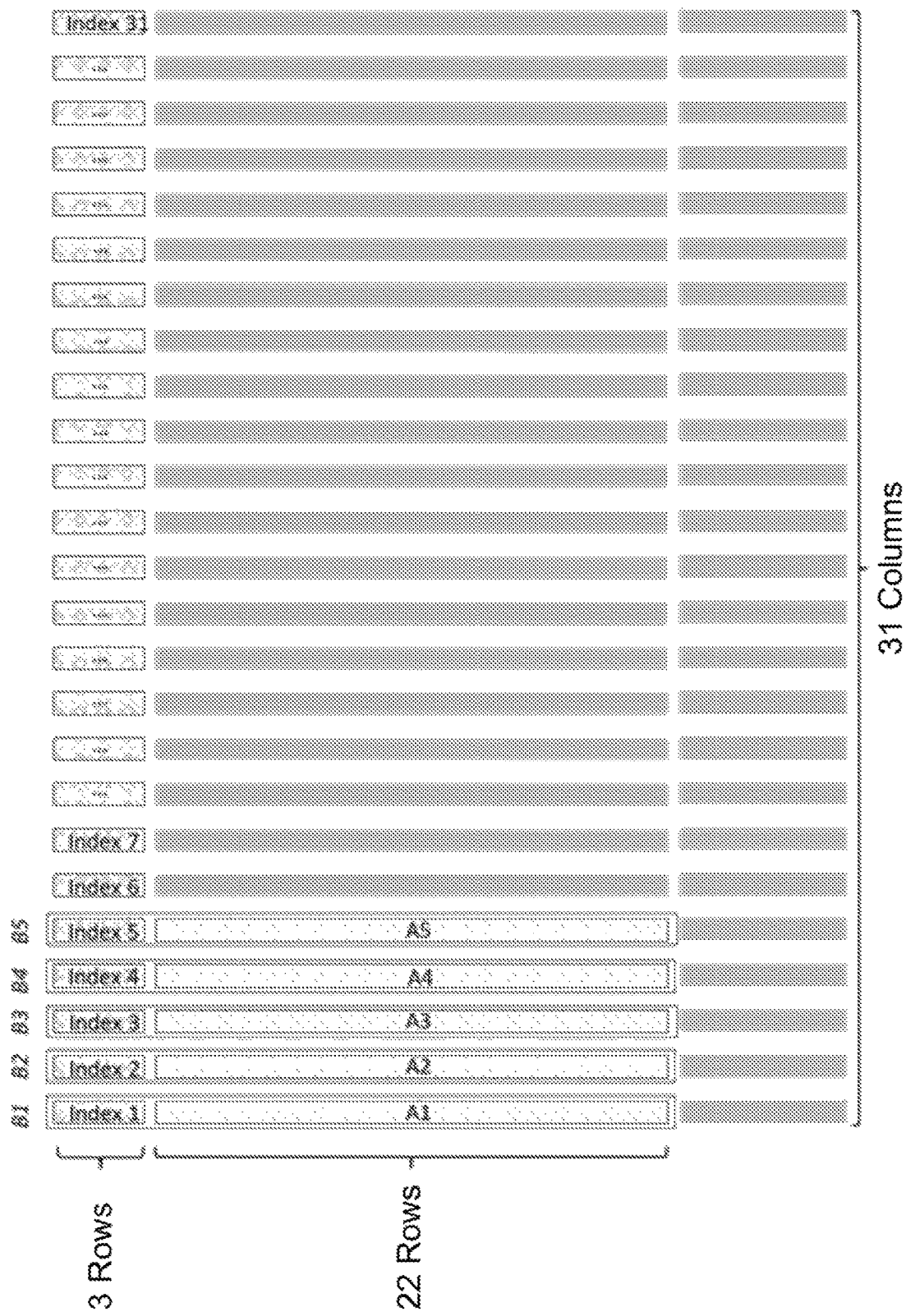
FIG. 3B depicts an exemplary step for adding index and redundancy data to the digital content to be stored, according to some embodiments.

Turning to FIG. 3B, an index sequence consisting of three integers ranging from 0 to 31 is appended to the beginning of each column as a unique index. The index strings can be sorted before appending. As shown, the indexes were sorted and assigned in an ascending order, such as 0-0-0, 0-0-1, 0-0-2, . . . , 0-0-31, 0-1-31, . . . . The indexed integer strings are labelled as B1, B2, B3, B4 and B5, respectively, in FIG. 3B.

Figure 3C:
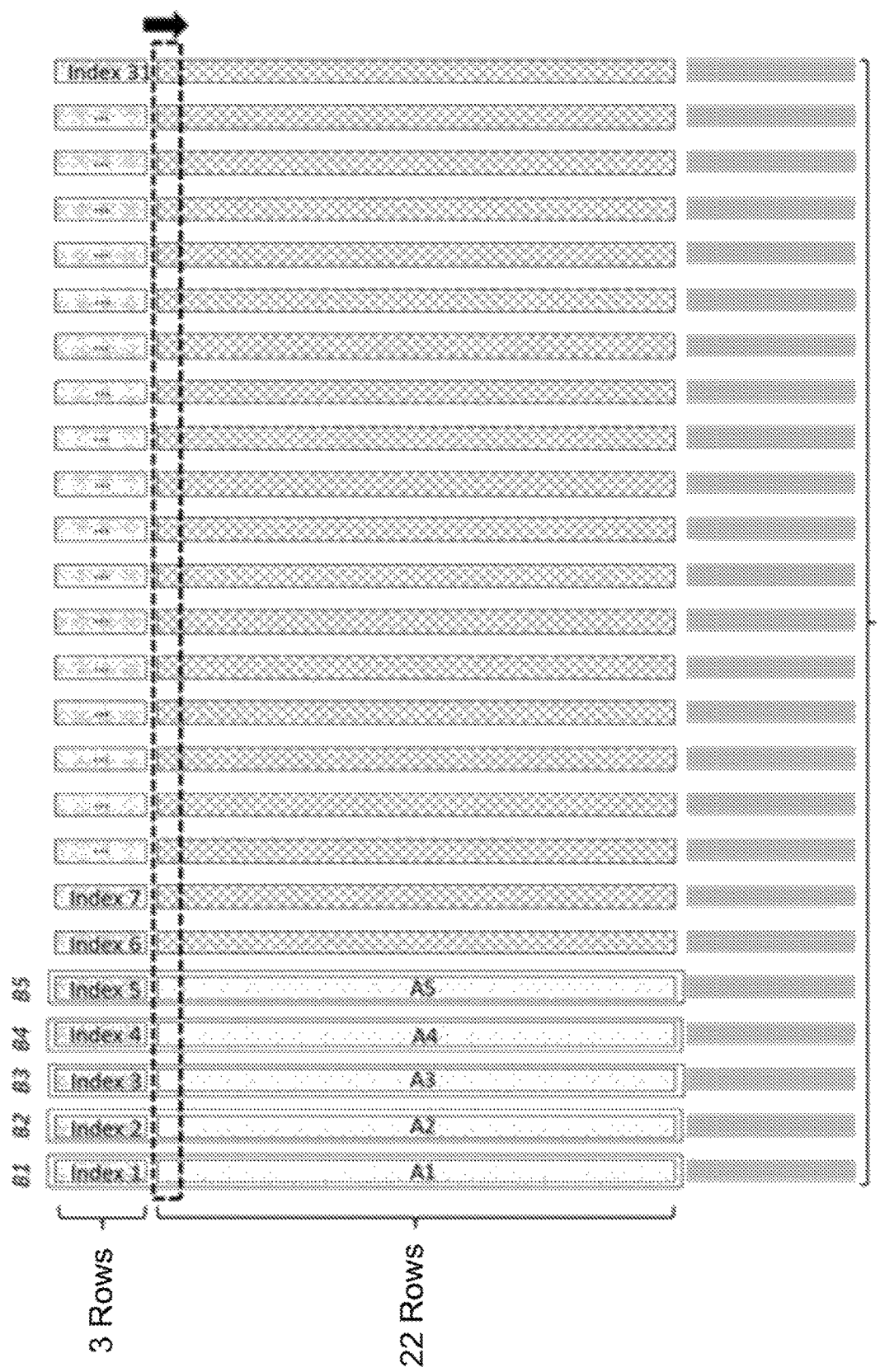
FIG. 3C depicts an exemplary step for adding index and redundancy data to the digital content to be stored, according to some embodiments.

With reference to FIG. 3C, RS coding is used to fill the blank region of each row occupied by core data block row by row. This step is referred to as "block correction" and helps to handle, for example, missing oligoes & indels (including insertions and deletions) during synthesis and sequencing and degeneration of long-term storage.

Figure 3D:
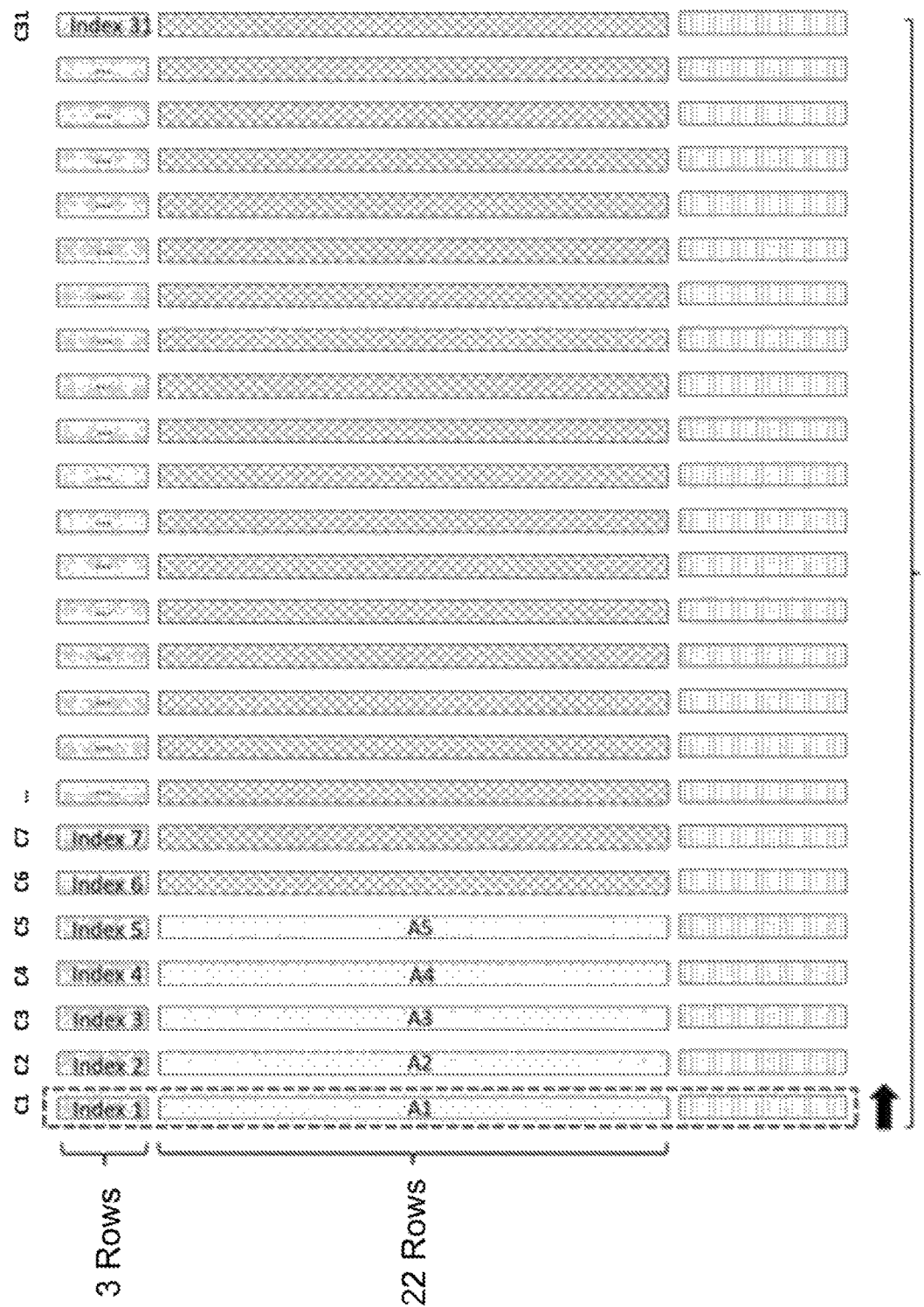
FIG. 3D depicts an exemplary step for adding index and redundancy data to the digital content to be stored, according to some embodiments.

Turing to FIG. 3D, RS coding is used to fill the blank region of each column of the entire matrix column by column. This step is referred to as "string correction" and helps to correct, for example, point mutations induced during synthesis, sequencing and long-term storage. As shown in FIG. 3D, the matrix now includes 31 integer strings [C1, C2, . . . , C31]. In other words, after block correction and string correction, the 5 integer sub-sequences A1-A5 are transformed into 31 integer sub-sequences C1-C31. Further, each of the A1-A5 contains 22 integers while each of the C1-C31 contains 29 integers (including 3 extra integers of index and 4 extra integers of parity of RS coding for error correction). It should be appreciated that the various dimensions as shown in FIGS. 3A-D are merely exemplary. The length of the index strings (3 in FIGS. 3A-D), the size of the matrix (e.g., 29×31 in FIGS. 3A-D), and the number of integer strings to be processed as a unit (e.g., 5 in FIGS. 3A-D) can be selected based on a number of factors, such as the type of error coding used, the desired error tolerance, and characteristics of the DNA synthesis platform.

As shown in FIG. 4, the plurality of integer sub-sequences having index, [B1, B2, . . . , Bn], is transformed into a plurality of integer sub-sequences with redundancy, [C1, C2, . . . , Cm], where m is bigger than n, through one round of string correction of RS coding and one round of block correction of RS coding in accordance with the techniques described with reference to FIGS. 3A-D. Further, each integer in the integer sub-sequences [C1, C2, . . . , Cm] ranges from 0 to 31.

In the depicted example in FIGS. 3A-D, the length of the initial integer sub-sequences such as A1 (22 in the depicted example) is calculated based on a number of factors. Specifically, the length of the integer strings having index and redundancy (denoted as L, 29 in the depicted example) is calculated by the oligo length of synthesis platform. The parity of both string (denoted as X, 4 in the depicted example) and block correction is determined by synthesis error rate of oligo, the error correction code used, and the desired error tolerance. The index length (denoted as Y, 3 in the depicted example) is determined by total encoded data size. Thus, the length of the initial integer strings (denoted as Z) is Z=L−X−Y.

Figure 5:
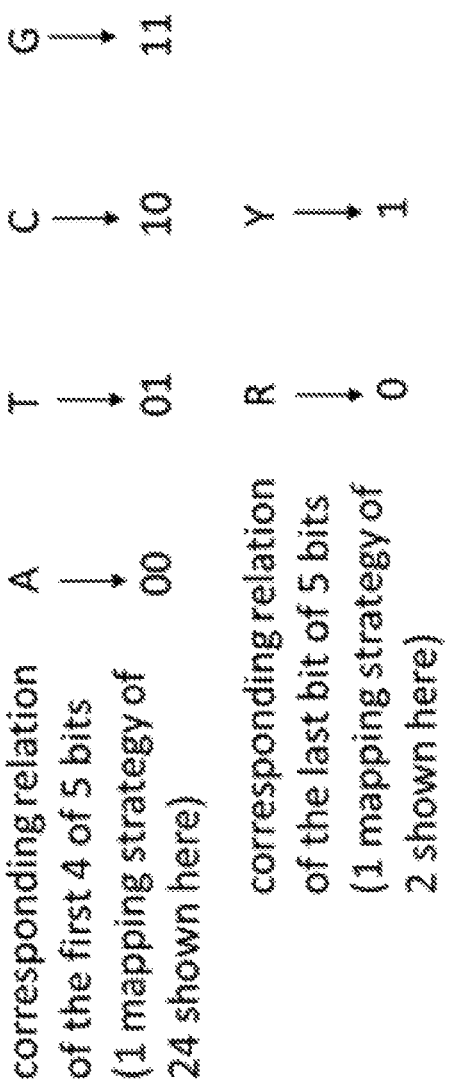
FIG. 5 illustrates an exemplary 5-bit transcoding framework, according to some embodiments.

Turning back to FIG. 1, at step 108, a second round of transcoding is carried out to transform the list of integer strings with redundancy (e.g., [C1, C2, . . . , Cm]) into a plurality of representations of DNA oligoes (e.g., [D1, D2, . . . , Dm]). Each representation of DNA oligo contains four bases A, T, G and C for synthesis. In particular, a "5-bit transcoding framework" can be used again. Here, each integer in the integer strings [C1, C2, . . . , Cm] ranges from 0 to 31 and as such can be uniquely mapped into one of 32 kinds of 3 nucleotides (e.g., 3-mers including NNY and NNR, where N stands for A, T, G, C; Y stands for C and T; and R stands for A and G). For example, as shown in FIG. 5, an integer 6 corresponds to a 5-bit binary string "00110" and can be translated to "AGR" under the particular strategy. In some examples, the 5-bit transcoding framework can provide direct conversion between an integer to a representation of DNA oligo, without any intermediary steps (e.g., converting the integer into a binary string first).

Accordingly, each of the 29 integers in each integer sub-sequence (e.g., C1) can be mapped into 3 nucleotides. After all of [C1, C2, . . . , Cm] are converted, Y is replaced with C or T, while R is replaced with A or G before DNA synthesis. This is done to make sure the $3^{rd}$ base is different from the $2^{nd}$ base of 3-mers and avoid 3 continually identical bases (e.g., AAA, GGG, TTT, CCC). Further, the GC percentage of each oligoes should be limited from 30% to 70% through the choice of Y and R. The replacement step both reduces the errors induced by oligo synthesis and is significant for the improvement of correction ratio of oligo synthesis.

According the principle of RS coding, the tolerable errors can include two (i.e., half of the parity of string correction, 4) mutations of each oligo and 13 (i.e., half of the parity of block correction, 26) missing oligoes (including completely missing oligoes or oligoes having indels) of the 31 oligoes from the same matrix in exemplary scenario illustrated in FIGS. 3A-D.

With reference to FIG. 1, at step 110, primer pairs are appended and DNA synthesis is performed. In some examples, a single compressed file (e.g., File.tar.lzma of FIG. 4) is transformed into a plurality of representations of DNA oligoes (e.g., [D1, D2, . . . , Dn] in FIG. 4) and the representations of the same pair of primer sequences are added at two terminal of each oligo corresponding to the compressed file. For multiple compressed files to be stored and synthesized at one time but need to be randomly accessible during subsequent reading and decoding, a unique pair of orthogonal primers is selected for and associated with each compressed file. For example, if there are 3 compressed files to be stored and synthesized at one time but need to be randomly accessible during subsequent reading and decoding, then 3 unique pairs of orthogonal primers are selected to be associated with the 3 compressed files, respectively. For each compressed file, the selected primer pair is appended to each oligo of the plurality of oligoes corresponding to the compressed file. Then all oligoes corresponding to the multiple compressed files could be pooled and synthesized together as storage media at one time.

To select primer pairs, a plurality of criteria can be used. For example, a primer pair can be chosen to avoid homodimer, heterodimer, hairpin structure and have enough specificity (e.g., have no binding site to the encoding nucleic acid sequences). In some examples, multiplexing PCR primer design standard is used.

2. Decoding

The decoding procedure is essentially the reverse process of encoding procedure. With reference to FIG. 1, at step 112, a pair of primers is used to perform PCR to amplify the list of oligoes (e.g., [D1, D2, . . . , Dn] in FIG. 4) of the corresponding compressed file (e.g., File.tar.lzma of FIG. 4). If multiple compressed files need to be read and decoded with a single run of NGS, all of their corresponding lists of oligoes should be amplified through PCR using all corresponding pairs of primers. This step is also called "NGS library preparation".

At step 114, pair-end next-generation sequencing and read pairing & merging are performed (e.g., by an Illumina sequencing system). Specifically, forward and reverse read from the same cluster are paired and merged into a single read, and all new reads with irregular length will be filtered (e.g., reads having indels). Further, according to primer sequences, all reads can be grouped for each compression file. In subsequent steps, the reads corresponding to the same compression file (i.e., reads sharing the same primers) would be analyzed together.

At step 116, reverse RS coding is performed. In some examples, a 29 by 31 zero matrix but not empty matrix would be utilized. Specifically, each read from a single compression file has the PCR primers removed at two terminals and is then transformed into an integer subsequence through string correction of RS coding with the aim to do error correction for mutations. Since one kind of oligo could have many copies of molecules during synthesis and be sequenced many times, many reads could originate from one oligo. Due to the error induced during both high throughput synthesis and sequencing, these reads may have variants, but the correct reads should dominate. Through the highest frequency-based correction at every location of integer sub-sequence, all integer sub-sequences sharing the identical index could be corrected and merged into a consensus integer sub-sequence. For instance, for a group of reads sharing the same index, each position of their consensus integer sub-sequence should be determined by the integer emerging most frequently at this position.

At step 118, the list of integer strings can be completely decoded through block correction of RS coding to recover the missing oligoes and oligoes with insertions and deletions. Since one kind of oligo could have many copies of molecules during synthesis and be sequenced many times, many reads could stands for one oligo. Due to the error induced during both high throughput synthesis and sequencing, these reads may have variants, but the correct reads matching well with originally designed oligoes still have advantage on the count. Through the highest frequency-based correction at every location of integer string, all integer strings sharing identical index could be corrected and merged into a consensus integer string between the string correction and block correction. Since oligoes with insertions and deletions have irregular length and would be deleted during error correction, thus the corresponding data completely equals to information lacking and need to be recovered. Based on the index information, the columns of the matrix are filled after highest frequency-based correction.

At step 120, transcoding is performed. Reads are sorted by index and then index is deleted from each integer sub-sequence. All integer sub-sequences can be then concatenated into a single integer string and then transferred into a binary string via the 5-bit transcoding framework.

At step 122, decompression is performed. Specifically, the system writes the binary string into a compression file, and then decompresses the compression file through LZMA algorithm and TAR algorithm in order. For the random access of multiple compression files, steps 116 through 122 should be performed for each of the compression files independently. A pool can store multiple compression files. Each compression file has its own PCR primer. During decoding, it is not necessary to sequence the entire pool. Rather, the corresponding PCR primer is used to amplify the oligoes of certain compression file and then sequence the amplified oligoes to decode this corresponding compression file but not the entire pool.

As discussed above, a 5-bit transcoding framework is leveraged. Specifically, every 5 continual bits from a binary string can be represented as an integer ranging from 0 to 31 and then 3 nucleotides [nt] (i.e., 3-mers). For instance, DNA oligo consists of four bases (e.g., A, T, G and C), thus 2-mers (i.e., NN) should have 16 kinds (e.g., AA, AT, AG, AC, TA, TT, TG, TC, GA, GT, GG, GC, CA, CT, CG and CC). Suppose degenerate base R and Y are concatenated after the 2-mers, the 3-mers (NNR/NNY) should consist of 32 kinds, which also matched well with 32 integers ranging from 0 to 31 and make binary string being transferred well into DNA sequence. During oligo synthesis, whether A or G is chosen to represent R and whether C or T is selected to replace Y are dependent on their front bases (i.e., 2nd base of 3-mers), in fact the system can make 2nd and 3rd base different and then keep GC balance at the same time. Given this precondition reaches, the accurate base will be randomly selected between candidate bases. In conclusion, the coding potential of this transcoding framework is 1.67 (i.e., 5 bit to 3nt).

Figure 7:
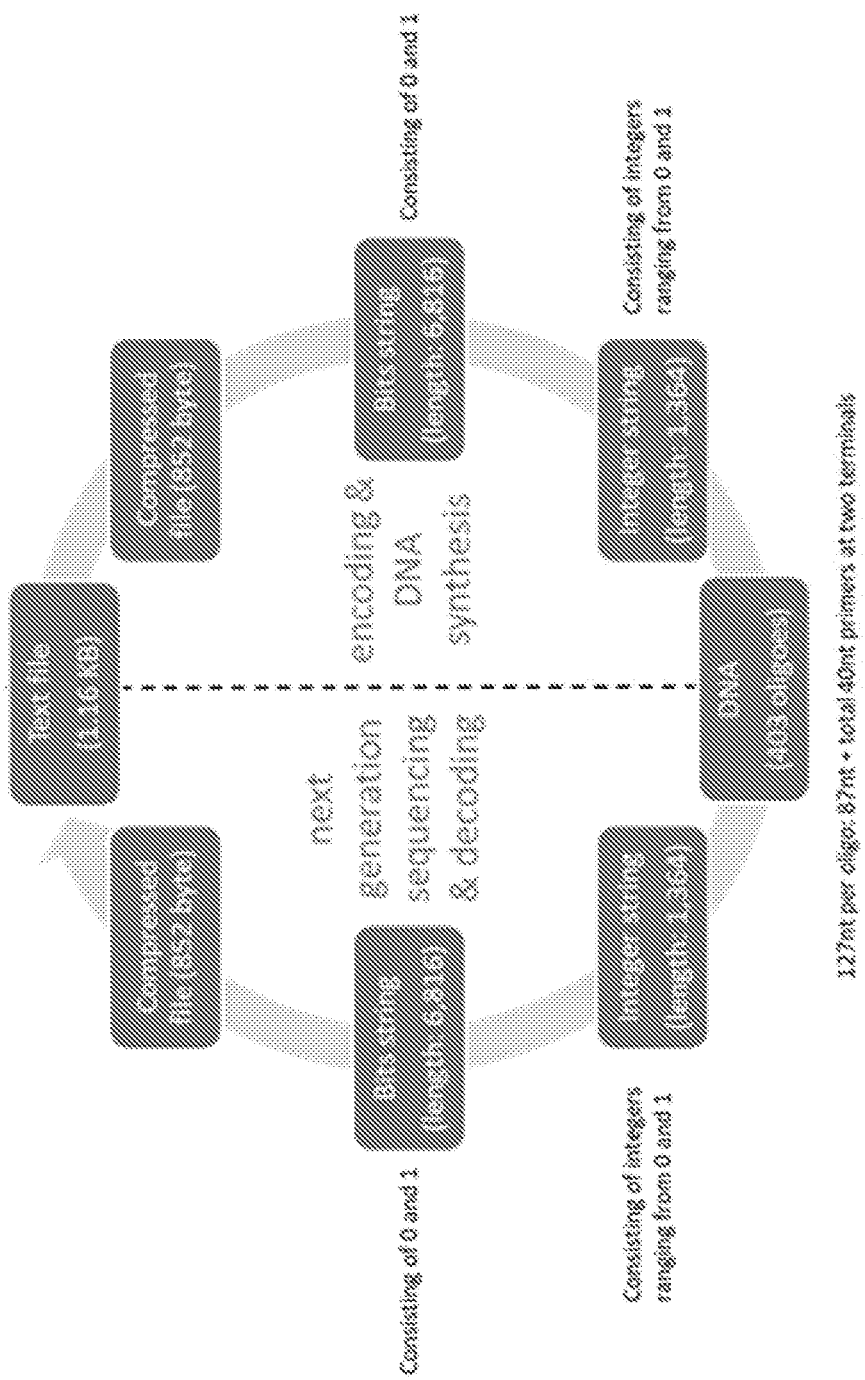
FIG. 7 illustrates an exemplary realization of DNA-based data storage and retrieval techniques, according to some embodiments.

FIG. 7 illustrates an exemplary realization of the DNA-based data storage and retrieval techniques. Here, a text file (data size: 1.16 kb) containing Chinese characters as shown in FIG. 6 is stored via DNA in accordance with the processes described herein.

During encoding, the text file is compressed into a single compression file and then stored using 403 oligoes with 87 nt length through the DNA storage framework. Meanwhile, in order to simulate of random access, 6 copies of this compression file are used and 6 pairs of primers are selected. Each pair of primers is added at two terminals of each of the 403 oligoes. The 6 pairs of primers (20 nt per each) were orthogonal, which means that any two of them have enough hamming distance, and share less similarity with any one of 403 oligoes. The Sequence Listing submitted herein in the ASCII text file includes SEQ ID NO.1-SEQ ID NO.403 and primer pairs PP NO.1-PP NO.6 as SEQ ID NOS. 404-415.

Synthesis of oligo pool is then performed. In total, 2418 (i.e., 403 multiplied by 6) oligoes were synthesized using the CustomArray platform developed by CustomArray, Inc. Each oligo is 127nt which includes total 40nt primers (20nt per terminal).

PCR amplification and NGS are then performed. 6 PCR reactions were done for all copies of compression file. After library preparation of 6 samples using TruSeq DNA PCR-free HT library preparation kit (96 indexes in plate format, 96 samples) and 6 library index, the pooled samples were sequenced together using MiSeq reagent kits V3 (150 cycle) due to the 127nt length of oligoes. The Q30 of NGS data is 94% (official standard >85%) and Cluster Density is 1,301 K/mm2 (official standard 1200-1400 K/mm2).

Lastly, decoding is performed. After independent decoding of each copy of compression file, all copies could be randomly and successfully retrieved and decompressed without any error.

Figure 8:
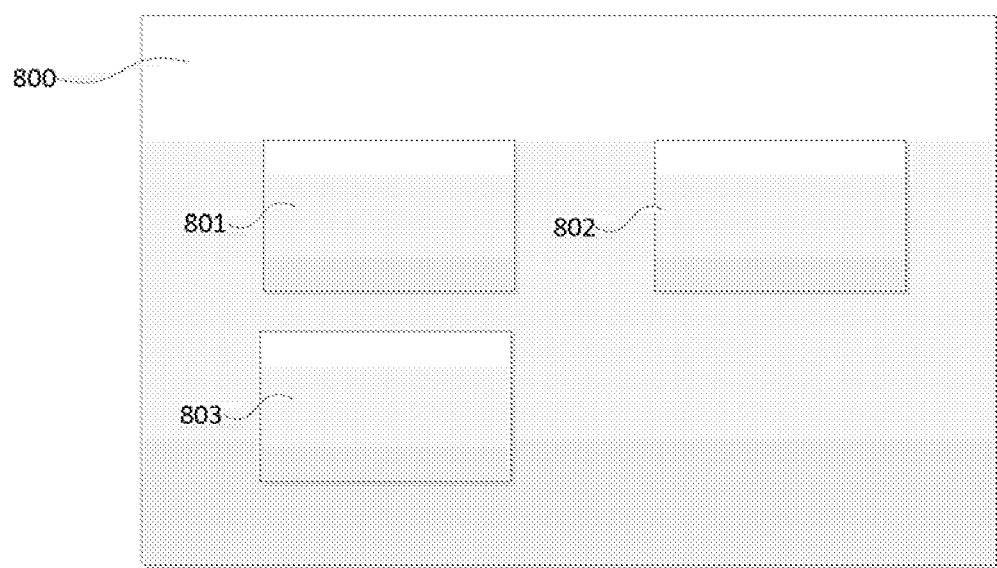
FIG. 8 depicts an exemplary electronic device in accordance with some embodiments.

FIG. 8 presents a device that can be used to perform one or several steps of methods disclosed herein. Such device referenced 800 comprises a computing unit (for example a CPU, for "Central Processing Unit"), referenced 801, and one or more memory units (for example a RAM ("Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 802. Computer programs are made of instructions that can be executed by the computing unit. Such device 800 can also comprise a dedicated unit, referenced 803, constituting an input-output interface to allow the device 800 to communicate with other devices. In particular, this dedicated unit 803 can be connected with an antenna (in order to perform communication without contacts), or with serial ports (to carry communications "contact"). It should be noted that the units can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 8. Such device 800 can be used in combination with a high throughput synthesis platform (e.g., CustomArray) and a DNA sequencer (e.g., MiSeq sequencer).

FIG. 9A depicts an exemplary method 900 for storing input data on nucleic acid. At block 902, the input data is converted into a set of nucleotide sequences. At block 904, the input data is converted into a binary string. At block 906, the binary string is converted using a 5-bit transcoding framework to obtain the set of nucleotide sequences. At block 908, a set of nucleic acids comprising the set of nucleotide sequences is synthesized.

FIG. 9B depicts an exemplary method 950 for retrieving output data stored on nucleic acid. At block 952, a set of nucleotide sequences of a set of nucleic acids is obtained. At block 954, the set of nucleotide sequences is converted into the output data. Specifically, at block 956, the set of nucleotide sequences is converted into a binary string using a 5-bit transcoding framework. At block 958, the binary string is converted into the output data.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A method for storing input data on nucleic acid molecules, the method comprising:
   a) converting the input data into a set of nucleotide sequences, wherein the converting comprises
      i) a data processing step comprising converting the input data into a binary string and dividing the binary string into a sequence of non-overlapping 5-bit binary strings;
      ii) a nucleotide encoding step comprising converting the sequence of non-overlapping 5-bit binary strings into the set of nucleotide sequences using a 5-bit transcoding framework to convert each 5-bit binary string into a corresponding 3-mer nucleotide sequence, wherein each corresponding 3-mer nucleotide sequence comprises:
      a first base and a second base selected from A, T, C, and G; and
      a third base selected from R and Y, wherein:
         R is selected from any two of A, T, C, and G;
         Y is selected from the corresponding other two of A, T, C, and G;
         R and Y are chosen so that they are different from the second base immediately in front of R or Y; and
         R and Y are chosen based on a GC content of the set of nucleotide sequences; and
   b) synthesizing a set of nucleic acid molecules corresponding to the set of nucleotide sequences generated by converting the input data.

2. The method of claim 1, wherein the nucleotide encoding step further comprises converting each 5-bit binary string of the sequence of non-overlapping 5-bit binary strings into an integer ranging from 0 to 31 to obtain a string of integers.

3. The method of claim 2, wherein the nucleotide encoding step further comprises dividing the string of integers into a plurality of initial sub-sequence of integers having a predetermined length.

4. The method of claim 3, wherein the length of each of the plurality of initial sub-sequence of integers is determined based on an oligo length of a selected synthesis platform, a desired error tolerance, a size of the input data, a selected error correction code, or a combination thereof.

5. The method of claim 3, wherein the nucleotide encoding step further comprises adding index information to each of the plurality of the initial sub-sequences of integers to obtain a plurality of integer sub-sequences having indexes.

6. The method of claim 5, wherein the index information added to each of the plurality of the initial sub-sequences of integers comprises a sequence of integers, wherein the length of the sequence of integers is based on the size of the input data.

7. The method of claim 5, wherein the nucleotide encoding step further comprises, after adding the index information, adding redundancy data to the plurality of integer sub-sequences having indexes, thereby obtaining a plurality of integer sub-sequences having redundancy.

8. The method of claim 7, wherein adding redundancy data to the plurality of integer sub-sequences having indexes comprises:

creating an empty matrix, wherein the number of columns in the empty matrix is larger than the size of the plurality of integer sub-sequences having indexes, and wherein the number of rows of the empty matrix is larger than the number of integers in each of the plurality integer sub-sequences having indexes;

filling the empty matrix with the plurality of integer sub-sequences having indexes and data generated by applying an error correction coding; and obtaining the plurality of sub-sequences having redundancy based on the filled matrix.

9. The method of claim 8, wherein the number of columns of the empty matrix is determined based on an oligo length of a selected synthesis platform, the type of the error correction code, a predetermined error tolerance value, a size of the plurality of integer sub-sequences having index, or a combination thereof.

10. The method of claim 8, wherein the number of rows of the empty matrix is determined based on an oligo length of a selected synthesis platform, a type of the error correction code, a predetermined error tolerance value, a size of the plurality of integer sub-sequences having indexes, or a combination thereof.

11. The method of claim 8, wherein the error correction coding is Reed-Solomon ("RS") coding.

12. The method of claim 11, wherein the data generated by applying an error correction coding is generated by applying string correction of the RS coding and/or block correction of the RS coding.

13. The method of claim 1, wherein the input data corresponds to a compressed file.

14. The method of claim 1, wherein the input data corresponds to two or more files.

15. The method of claim 1, wherein the input data corresponds to a text file.

16. The method of claim 1, wherein the data processing step further comprises compressing the input data to obtain a compressed file and converting the compressed file into a binary string.

* * * * *